United States Patent
Kashima

(10) Patent No.: US 9,671,264 B2
(45) Date of Patent: Jun. 6, 2017

(54) ULTRASONIC FLOW SWITCH

(71) Applicant: Keyence Corporation, Osaka (JP)

(72) Inventor: Hiroshi Kashima, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/134,404

(22) Filed: Apr. 21, 2016

(65) Prior Publication Data

US 2016/0334252 A1 Nov. 17, 2016

(30) Foreign Application Priority Data

May 14, 2015 (JP) ................................. 2015-099221

(51) Int. Cl.
  *G01F 1/66* (2006.01)
  *G01F 15/14* (2006.01)
  *G01F 15/18* (2006.01)

(52) U.S. Cl.
  CPC .............. *G01F 1/662* (2013.01); *G01F 1/667* (2013.01); *G01F 15/14* (2013.01); *G01F 15/18* (2013.01)

(58) Field of Classification Search
  CPC ....................................................... G01F 1/66
  USPC ......................................... 73/861.27–861.29
  See application file for complete search history.

(56) References Cited

U.S. PATENT DOCUMENTS

| 4,162,630 | A | * | 7/1979 | Johnson | G01P 5/245 73/861.27 |
|---|---|---|---|---|---|
| 4,271,708 | A | * | 6/1981 | Kohno | G01F 1/667 73/861.28 |
| 5,905,207 | A | * | 5/1999 | Schalk | G01F 1/662 73/861.28 |
| 6,457,371 | B1 | * | 10/2002 | Feller | G01F 1/667 73/861.27 |
| 7,775,124 | B2 | * | 8/2010 | Optiz | G01F 1/667 73/861.27 |
| 2007/0220995 | A1 | * | 9/2007 | Kishiro | G01F 1/662 73/861.28 |
| 2016/0334251 | A1 | | 11/2016 | Otsu et al. | |
| 2016/0334254 | A1 | | 11/2016 | Ishikawa et al. | |

FOREIGN PATENT DOCUMENTS

JP      2001-356032 A      12/2001

* cited by examiner

*Primary Examiner* — Jewel V Thompson
(74) *Attorney, Agent, or Firm* — Kilyk & Bowersox, P.L.L.C.

(57) ABSTRACT

Provided is an ultrasonic flow switch which can be stably mounted on pipes. A casing part which integrally or independently holds the ultrasonic wave elements is mounted on an outer surface of the pipe by a clamp part. An acoustic couplant which is formed of a soft elastic body is pressed to an outer surface of the pipe such that at least one of the first and second ultrasonic wave elements is acoustically coupled to the pipe. A collapsing amount of the acoustic couplant at a portion where the collapsing amount of the acoustic couplant caused by the pipe is the largest is restricted by a collapsing amount restricting part.

20 Claims, 38 Drawing Sheets

ULTRASONIC FLOW SWITCH

CROSS-REFERENCE TO RELATED APPLICATIONS

The present application claims foreign priority based on Japanese Patent Application No. 2015-099221, filed May 14, 2015, the contents of which is incorporated herein by reference.

BACKGROUND OF THE INVENTION

1. Field of the Invention

The present invention relates to an ultrasonic flow switch which is operable based on an amount of a fluid which flows in a pipe.

2. Description of Related Art

A flow rate meter is used for accurately measuring a value of a flow rate of a fluid which flows in a pipe. For example, JP-A-2001-356032 discloses an ultrasonic flow rate meter having a sensor. The sensor can measure an amount of a fluid which flows in a pipe using an ultrasonic wave. In the sensor, two sleigh-like blades which project downward are formed. A sheet-like silicone gel is arranged between two blades. The sensor is fixed to an outer peripheral surface of a pipe by being fastened by a fastening band such that bottom sides of two blades are brought into contact with the pipe.

A sheet-shaped silicone gel prevents reflection of an ultrasonic wave between the sensor and the pipe. When the sensor is fixed to the pipe, the sheet-shaped silicone gel is collapsed in conformity with a shape of the pipe. A residual portion of an outer peripheral surface of the pipe is filled with an overflowed portion of the sheet-shaped silicone gel, so that a contact area between the sensor and the pipe is increased. Accordingly, the sensor and the pipe are joined to each other.

JP-A-2001-356032 describes that "it is sufficient to fasten a fastening band to an extent that bottom sides of sleigh-like blades are always brought into contact with a pipe so that uniformity and reproducibility of installation of the sensor are enhanced". Further, JP-A-2001-356032 describes that "the sensor can be stably fixed to a pipe, regardless of a position where the sensor is mounted, such as an upper side or a lower side of a horizontal part, a vertical part or an inclined part of the pipe, and can be stably fixed to pipes with almost all pipe diameters except pipe diameters equal to or less than a distance between the two sleigh-like blades".

However, in an actual installation of the sensor, when the sensor is fixed to the pipe having a diameter larger than the distance between two sleigh-like blades, the degree that a sheet-shaped silicone gel is collapsed differs depending on a size of the pipe.

It is not always possible to acquire uniformity when joining the sensor and the pipe and hence, it is difficult to measure a flow rate with high reproducibility. Further, when the sensor part is fastened excessively strongly by the band to bring the bottom sides of sleigh-like blades into contact with the pipe, a sheet-shaped silicone gel may be damaged.

On the other hand, as in the case of controlling an operation state of a facility in a plant, there may be a case where an accurate value of a flow rate of a fluid which flows in a pipe is unnecessary and it is sufficient to detect whether or not the fluid flows in the pipe at a flow rate of a fixed value or more. In such a case, a flow rate switch which outputs an ON/OFF signal can be used instead of a flow rate meter. The flow switch is mounted on pipes having various outer diameters in a plant, for example. Accordingly, it is desirable that the flow switch can be stably mounted on pipes having various sizes without impairing uniformity of performance of the flow switch.

SUMMARY OF THE INVENTION

It is an object of the present invention to provide an ultrasonic flow switch which can be stably mounted on pipes having various sizes without impairing uniformity of performance of the flow switch.

(1) An ultrasonic flow switch according to the present invention outputs an ON/OFF signal based on a flow rate of a fluid which flows in a pipe, the ultrasonic flow switch including: a first ultrasonic wave element which performs, out of transmission of an ultrasonic wave to the fluid which flows in the pipe and reception of the ultrasonic wave from the fluid which flows in the pipe, at least the transmission of the ultrasonic wave; a second ultrasonic wave element which performs, out of transmission of an ultrasonic wave to the fluid which flows in the pipe and reception of the ultrasonic wave from the fluid which flows in the pipe, at least the reception of the ultrasonic wave; a calculation part which calculates a flow rate of the fluid in the pipe based on an output signal from at least one of the first and second ultrasonic wave elements; an output part which outputs the ON/OFF signal based on the flow rate calculated by the calculator and a preset flow rate threshold value; an element holder which integrally or independently holds the first and second ultrasonic wave elements; a mounting member which holds the element holder and is detachably mounted on an outer surface of the pipe; and an acoustic contact medium which is formed of a soft elastic body and is arranged between at least one of the first and second ultrasonic wave elements and the pipe, wherein the acoustic contact medium is pressed to the outer surface of the pipe such that the at least one ultrasonic wave element is acoustically coupled to the pipe in a state where the mounting member is mounted on the outer surface of the pipe and the element holder is held by the mounting member, and the ultrasonic flow switch further includes a collapsing amount restricting part which restricts a collapsing amount of the acoustic contact medium at a portion where the collapsing amount of the acoustic contact medium caused by the pipe is the largest.

In this ultrasonic flow switch, an ultrasonic wave is transmitted to a fluid which flows in the pipe by the first ultrasonic wave element, and the ultrasonic wave is received from the fluid which flows in the pipe by the second ultrasonic wave element. A flow rate of the fluid in the pipe is calculated based on an output signal of at least one of the first and second ultrasonic wave elements. An ON/OFF signal is outputted based on the calculated flow rate and a preset flow rate threshold value.

The first and second ultrasonic wave elements are integrally or independently held by the element holder. The element holder is mounted on the outer surface of the pipe by the mounting member. The acoustic contact medium formed of a soft elastic body is arranged between at least one of the first and second ultrasonic wave elements and the pipe.

When the mounting member is mounted on the outer surface of the pipe and the element holder is held by the mounting member, the acoustic contact medium is pressed to the outer surface of the pipe such that at least one of the ultrasonic wave elements is acoustically coupled to the pipe. Here, a collapsing amount of the acoustic contact medium at a portion where the collapsing amount of the acoustic contact medium caused by the pipe is the largest is restricted by the collapsing amount restricting part.

With such a configuration, even when the element holder is mounted on the pipe having a relatively large outer diameter, the acoustic contact medium is pressed to the pipe such that at least one of the ultrasonic wave elements and the pipe are reliably coupled to each other acoustically. On the other hand, even when the element holder is mounted on the pipe having a relatively small outer diameter, a maximum collapsing amount of the acoustic contact medium is reliably restricted and hence, it is possible to prevent the acoustic contact medium from being damaged due to an excessive collapse caused by the pipe.

In these cases, regardless of the outer diameter of the pipe and the operator, a maximum collapsing amount of the acoustic contact medium is restricted to a fixed value and, at the same time, the acoustic contact medium has a fixed thickness at a portion thereof having a minimum thickness. Accordingly, acoustic coupling between at least one of the ultrasonic wave elements and the pipe can be determined uniformly. As a result, the ultrasonic flow switch can be stably mounted on the pipes having various sizes without impairing uniformity of the performance of the ultrasonic flow switch.

(2) The soft elastic body may include polymer rubber or a gel-like substance. In this case, by selecting a material having high acoustic impedance, the difference in acoustic impedance between the soft elastic body and a pipe member having higher acoustic impedance is reduced. With such a configuration, the reflection of an ultrasonic wave between the acoustic contact medium and the pipe can be further reduced. As a result, transmission efficiency of an ultrasonic wave by the first ultrasonic wave element or reception efficiency of an ultrasonic wave by the second ultrasonic wave element can be enhanced.

(3) The collapsing amount restricting part may restrict the collapsing amount of the acoustic contact medium caused by the pipe to 10% or more and 50% or less of a thickness of the acoustic contact medium in a state where the acoustic contact medium is not brought into contact with the outer surface of the pipe.

In this case, the acoustic contact medium is more sufficiently brought into close contact with the pipe. With such a configuration, transmission efficiency of an ultrasonic wave by the first ultrasonic wave element or reception efficiency of an ultrasonic wave by the second ultrasonic wave element can be enhanced. Further, by restricting the collapsing amount of the acoustic contact medium caused by the pipe to 50% or less of the thickness of the acoustic contact medium in the state where the acoustic contact medium is not brought into contact with the outer surface of the pipe, it is possible to prevent the acoustic contact medium from being damaged by an excessively larger collapse of the acoustic contact medium.

(4) The collapsing amount restricting part may be provided between the element holder and the pipe, and may restrict the collapsing amount of the acoustic contact medium by restricting a distance between the outer surface of the pipe and a portion of the element holder. In this case, the collapsing amount of the acoustic contact medium can be restricted with a simple configuration.

(5) The collapsing amount restricting part may be detachably or integrally mounted on the element holder, and may restrict a collapsing amount of the acoustic contact medium by being brought into contact with the outer surface of the pipe. In this case, an operator can handle the collapsing amount restricting part together with the element holder and hence, handling of the ultrasonic flow switch is enhanced. Further, efficiency of operation for mounting the ultrasonic flow switch is enhanced.

(6) The collapsing amount restricting part may include a screw member mounted on the element holder, and the screw member may be configured to restrict the collapsing amount of the acoustic contact medium by being brought into contact with the outer surface of the pipe.

In this case, a projecting amount of the screw member with respect to the element holder is changed by operating the screw member. Accordingly, it is possible to adjust the projecting amount of the screw member while restricting the collapsing amount of the acoustic contact medium.

(7) The collapsing amount restricting part may be arranged between the element holder and the outer surface of the pipe, and may be configured to restrict a collapsing amount of the acoustic contact medium by being brought into contact with the element holder and the outer surface of the pipe.

In this case, the collapsing amount restricting part can be arranged at a desired position between the element holder and the outer surface of the pipe. Accordingly, the degree of freedom in the arrangement of the collapsing amount restricting part can be enhanced.

(8) The collapsing amount restricting part may be provided between the element holder and the mounting member, and may restrict the collapsing amount of the acoustic contact medium by restricting a distance between a portion of the element holder and a portion of the mounting member. In this case, the collapsing amount of the acoustic contact medium can be restricted with a simple configuration.

(9) The collapsing amount restricting part may be detachably or integrally mounted on one of the element holder and the mounting member, and may restrict the collapsing amount of the acoustic contact medium by being brought into contact with the other of the element holder and the mounting member. In this case, an operator can handle the collapsing amount restricting part together with one of the element holder and the mounting member and hence, the handling of the ultrasonic flow switch is enhanced. Further, efficiency of operation for mounting the ultrasonic flow switch is enhanced.

(10) The collapsing amount restricting part may be integrally mounted on the mounting member. In this case, it is not necessary to prepare the collapsing amount restricting part additionally and hence, the number of parts of the ultrasonic flow switch can be reduced.

(11) The collapsing amount restricting part may be arranged between the element holder and the mounting member, and may restrict the collapsing amount of the acoustic contact medium by being brought into contact with the element holder and the mounting member.

In this case, the collapsing amount restricting part can be arranged at a desired position between the element holder and the mounting member. Accordingly, the degree of freedom in the arrangement of the collapsing amount restricting part can be enhanced.

(12) The collapsing amount restricting part may be mounted on the acoustic contact medium, and may restrict the collapsing amount of the acoustic contact medium by restricting a distance between the outer surface of the pipe and a portion of the element holder. In this case, an operator can handle the collapsing amount restricting part together with the acoustic contact medium and hence, the handling of the ultrasonic flow switch is enhanced. Further, efficiency of operation for mounting the ultrasonic flow switch is enhanced.

(13) The acoustic contact medium may be detachably or integrally mounted on the element holder.

In this case, the operator can handle the acoustic contact medium together with the element holder and hence, the handling of the ultrasonic flow switch is enhanced. Further, efficiency of operation for mounting the ultrasonic flow switch is enhanced.

(14) The ultrasonic flow switch may further include a medium holding member which holds the acoustic contact medium in the element holder.

In this case, the mounting of the acoustic contact medium on the element holder and the removal of the acoustic contact medium from the element holder are facilitated. Accordingly, the operator can easily perform an operation for exchanging the acoustic contact medium. As a result, a maintenance cost of the ultrasonic flow switch can be reduced.

(15) The acoustic contact medium may be bonded to the element holder by an adhesive member. In this case, the acoustic contact medium can be integrally mounted on the element holder with a simple configuration.

(16) The ultrasonic flow switch may further include a fixing member which fixes the element holder to the mounting member, and the mounting member and the element holder may be configured such that an operation for mounting the mounting member on the pipe and an operation for fixing the element holder on the mounting member by the fixing member are performed from a common direction.

In this case, the operator can efficiently perform the operation of mounting the mounting member on the pipe and the operation of fixing the element holder to the mounting member by the fixing member from the common direction.

(17) The ultrasonic flow switch may further include a display part which displays the flow rate calculated by the calculator and the threshold value, wherein the display part may be provided on the element holder such that the display part is viewable from the common direction.

In this case, a user can easily observe the display part from the common direction. The user can know a flow rate or a threshold value in numerical terms.

(18) The ultrasonic flow switch may further include a connecting part to which a connecting line for transmitting the ON/OFF signal outputted from an output part is connectable, wherein the connecting part may be provided to the element holder such that the connecting line is connectable to the connecting part from the common direction. In this case, the connecting line can be easily connected to the connecting part without causing interference with the pipe.

(19) The first and second ultrasonic wave elements may acquire electric power through the connecting part. In this case, the ultrasonic flow switch is not required to have a power source for supplying electric power to the first and second ultrasonic wave elements. With such a configuration, the ultrasonic flow switch can be miniaturized.

According to the present invention, an ultrasonic flow switch can be stably mounted on pipes having various sizes.

DETAILED DESCRIPTION OF PREFERRED EMBODIMENTS

[1] Schematic Configuration of Ultrasonic Flow Switch

Figure 1:
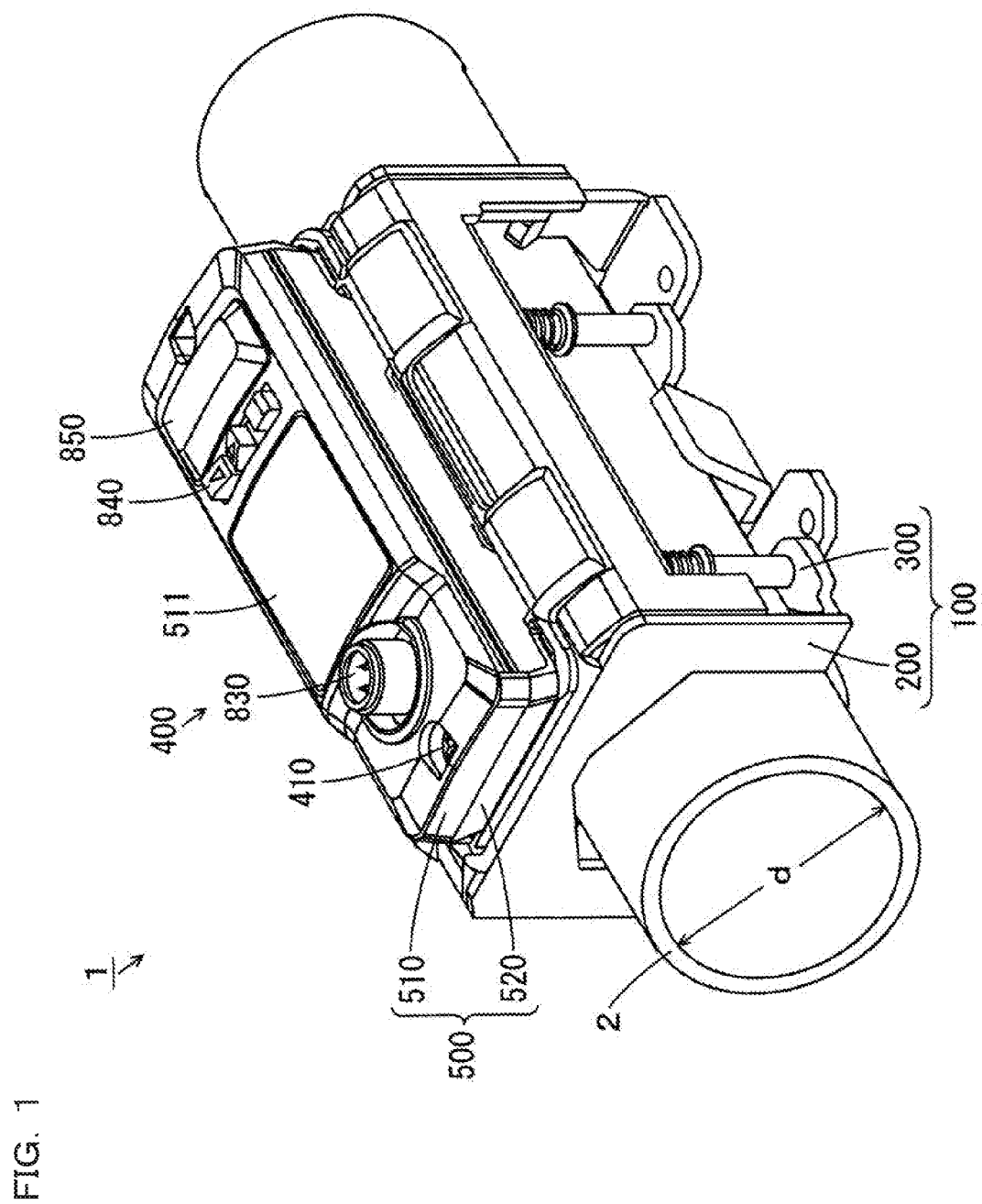
FIG. 1 is a perspective view showing an external appearance of a flow switch according to one embodiment of the present invention.
Figure 2:
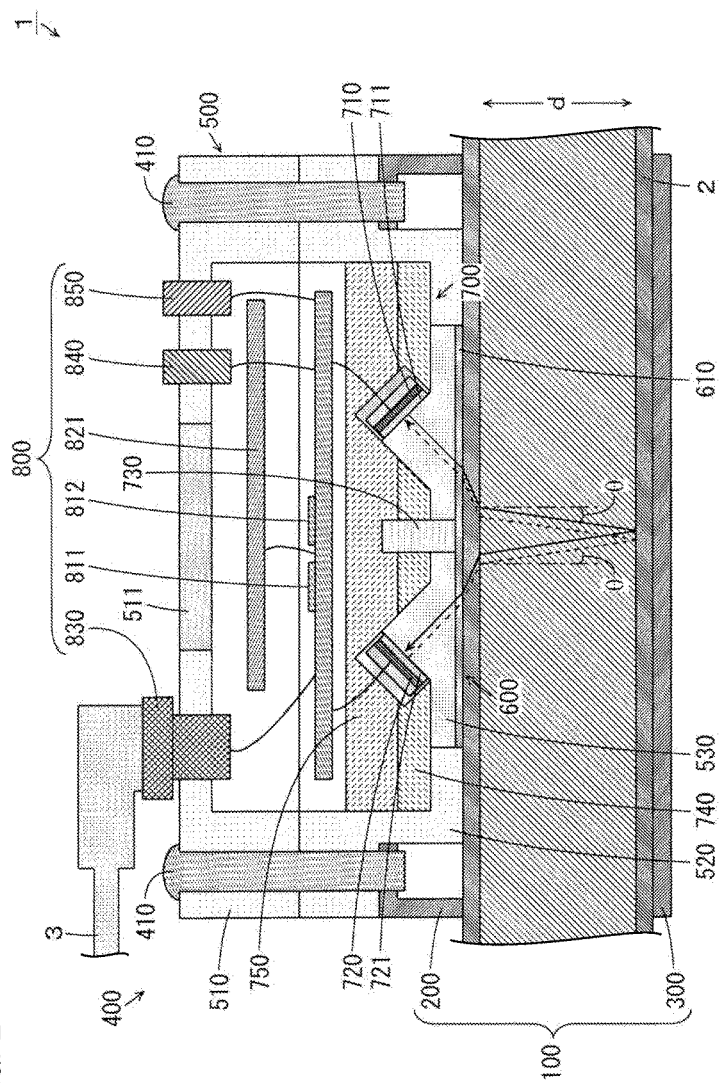
FIG. 2 is a schematic transverse cross-sectional view showing the internal configuration of the flow switch shown in FIG. 1.

Hereinafter, an ultrasonic flow switch (hereinafter referred to as "flow switch" in short) according to one embodiment of the present invention is described with reference to drawings. FIG. 1 is a perspective view showing an external appearance of a flow switch according to one embodiment of the present invention. FIG. 2 is a schematic transverse cross-sectional view showing the internal configuration of a flow switch 1 shown in FIG. 1. As shown in FIG. 1, the flow switch 1 is formed of a clamp part 100 and a sensor part 400.

The clamp part 100 includes an upper clamp member 200 and a lower clamp member 300. The clamp part 100 is arranged such that a pipe 2 is sandwiched by the upper clamp member 200 and the lower clamp member 300. With such a configuration, the clamp part 100 is mounted on an outer peripheral surface of a pipe 2. In the example shown in FIGS. 1 and 2, an inner diameter of the pipe 2 is indicated by "d". In this embodiment, the sensor part 400 is fixed to the upper clamp member 200 of the clamp part 100 by two sensor fixing screws 410.

As shown in FIG. 2, the sensor part 400 includes a casing part 500, a joining part 600, an ultrasonic wave control mechanism 700 and an electronic circuit part 800. The casing part 500 includes an upper casing part 510, a lower casing part 520 and a path member 530. The upper casing part 510 has a window part 511 formed of a transparent member on an upper surface thereof. The upper casing part 510 is mounted on an upper portion of the lower casing part 520, and the path member 530 is mounted on a lower portion of the lower casing part 520. With such a configuration, a space into which a liquid such as water or oil cannot intrude is formed inside the casing part 500.

The joining part 600 includes an acoustic couplant 610 in a solid form and a holding member 620 described later (see FIGS. 14 and 20). The acoustic couplant 610 is arranged between the path member 530 of the casing part 500 and the pipe 2. The holding member 620 holds the acoustic couplant 610 on the lower casing part 520 of the casing part 500.

An ultrasonic wave control mechanism 700 is housed inside the casing part 500. The ultrasonic wave control mechanism 700 includes two ultrasonic wave elements 710, 720, an ultrasonic wave shield plate 730, and two filling members 740, 750. The ultrasonic wave element 710 is arranged so as to form a predetermined angle with respect to the pipe 2, and is bonded to the path member 530 by an acoustic bonding agent 711. In the same manner, the ultrasonic wave element 720 is arranged so as to form a predetermined angle with respect to the pipe 2, and is bonded to the path member 530 by an acoustic bonding agent 721.

The ultrasonic wave shield plate 730 is arranged between the ultrasonic wave elements 710, 720 such that the ultrasonic wave shield plate 730 penetrates the path member 530. The filling members 740, 750 are formed of members different from each other. The filling member 740 is arranged so as to surround the periphery of the ultrasonic wave elements 710, 720. The filling member 750 is arranged above the filling member 740. The details of the ultrasonic wave shield plate 730 and the filling members 740, 750 will be described later.

In the above-mentioned arrangement, an ultrasonic wave transmitted from the ultrasonic wave element 710 is incident on a fluid in the pipe 2 at an incident angle θ through the path member 530 and the acoustic couplant 610. The ultrasonic wave which passes through the fluid is reflected on an inner surface of the pipe 2 at a reflection angle θ, passes through the acoustic couplant 610 and the path member 530, and is received by the ultrasonic wave element 720.

In the same manner, an ultrasonic wave transmitted from the ultrasonic wave element 720 is incident on a fluid in the pipe 2 at an incident angle θ through the path member 530 and the acoustic couplant 610. The ultrasonic wave which passes through the fluid is reflected on the inner surface of the pipe 2 at a reflection angle θ, passes through the acoustic couplant 610 and the path member 530, and is received by the ultrasonic wave element 710.

The electronic circuit part 800 includes a control part 811, a storage part 812, a display part 821, a connecting part 830, an operating part 840 and a display lamp 850. The control part 811, the storage part 812 and the display part 821 are housed inside the casing part 500. The connecting part 830, the operating part 840 and the display lamp 850 are mounted on an upper surface of the upper casing part 510 of the casing part 500.

Various data and programs for operating the flow switch 1 are stored in the storage part 812. The control part 811 controls operations of the ultrasonic wave elements 710, 720, the display part 821 and the display lamp 850 based on data and programs stored in the storage part 812. The control part 811 is connected to an external device (not shown) through the connecting part 830 and a cable 3.

In this embodiment, the control part 811 measures a time difference Δt. The time difference Δt is a difference between time elapsed from transmission of an ultrasonic wave from the ultrasonic wave element 710 to reception of the ultrasonic wave by the ultrasonic wave element 720 and time elapsed from transmission of an ultrasonic wave from the ultrasonic wave element 720 to reception of the ultrasonic wave by the ultrasonic wave element 710. The control part 811 calculates a speed $V_f$ of a fluid which flows in the pipe 2 based on the measured time difference Δt by the following equation (1), and calculates a flow rate Q of the fluid which flows in the pipe 2 by the following equation (2).

[Equation 1]

$$V_f = \frac{V_s^2}{4d\tan\theta}\Delta t \quad (1)$$

[Equation 2]

$$Q = \frac{1}{K} \cdot \frac{\pi d V_s^2}{16\tan\theta}\Delta t \quad (2)$$

In the above equations, d is an inner diameter of the pipe 2, θ is an incident angle of an ultrasonic wave, and $V_s$ is a speed of the ultrasonic wave. K is a flow rate correction coefficient employed for converting a speed of a fluid having predetermined distribution within a cross section of the pipe 2 into an average speed. The incident angle θ, the speed $V_s$ and the flow rate correction coefficient K are known. A user operates the operating part 840 so that the inner diameter d of the pipe 2 is stored in the storage part 812. Further, the user operates the operating part 840 so that a threshold value of a flow rate is stored in the storage part 812.

The control part 811 compares the flow rate Q calculated by the equation (2) with a threshold value stored in the storage part 812, and outputs an ON/OFF signal based on a comparison result. The ON/OFF signal is a signal for switching an ON state and an OFF state of an external device connected to the connecting part 830. The display lamp 850 is turned on such that an ON state and an OFF state of the external device can be distinguished.

The display part 821 is arranged at a position close to the window part 511 of the upper casing part 510. The display part 821 can display various information such as a speed $V_f$ of a fluid calculated by the equation (1), a flow rate Q calculated by the equation (2) or a threshold value stored in the storage part 812.

[2] Clamp Part (1) Upper Clamp Member

Figure 3:
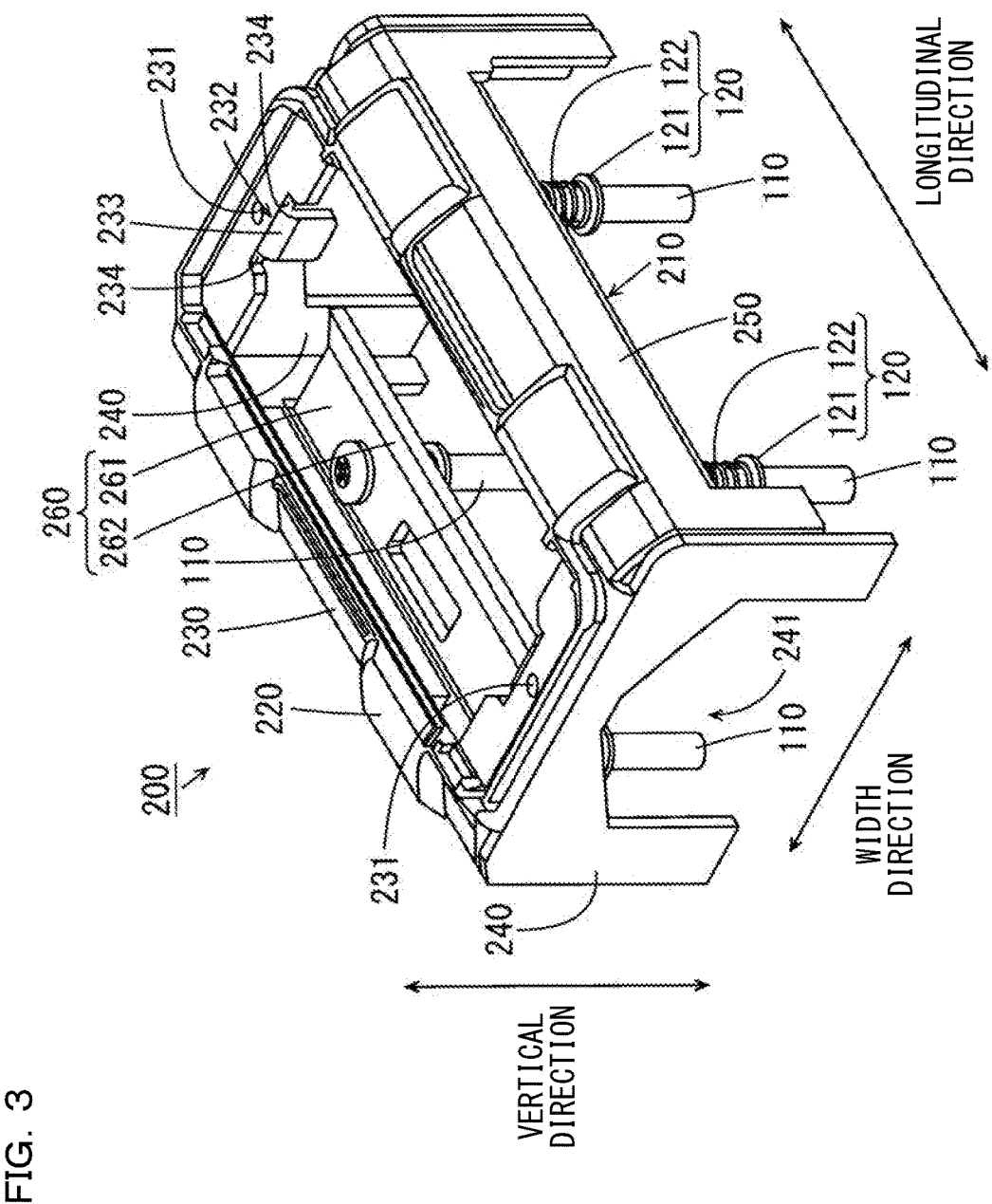
FIG. 3 is a perspective view of an upper clamp member.
Figure 4A:
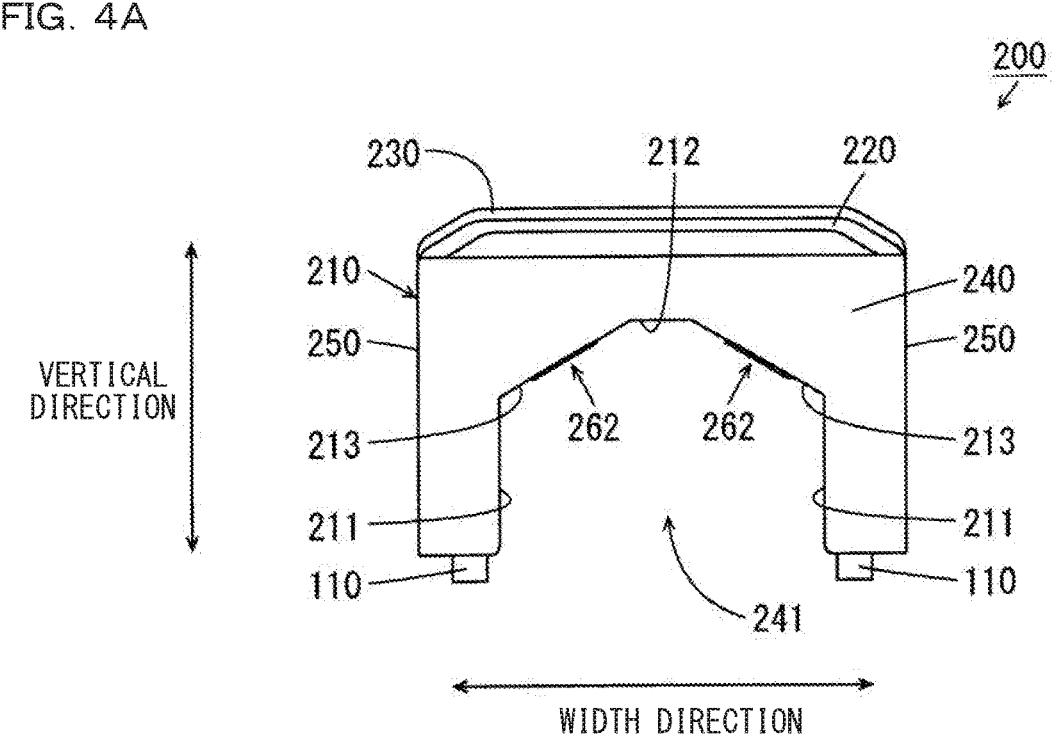
FIGS. 4A and 4B are an end face view and a longitudinal cross-sectional view of the upper clamp member.
Figure 4B:
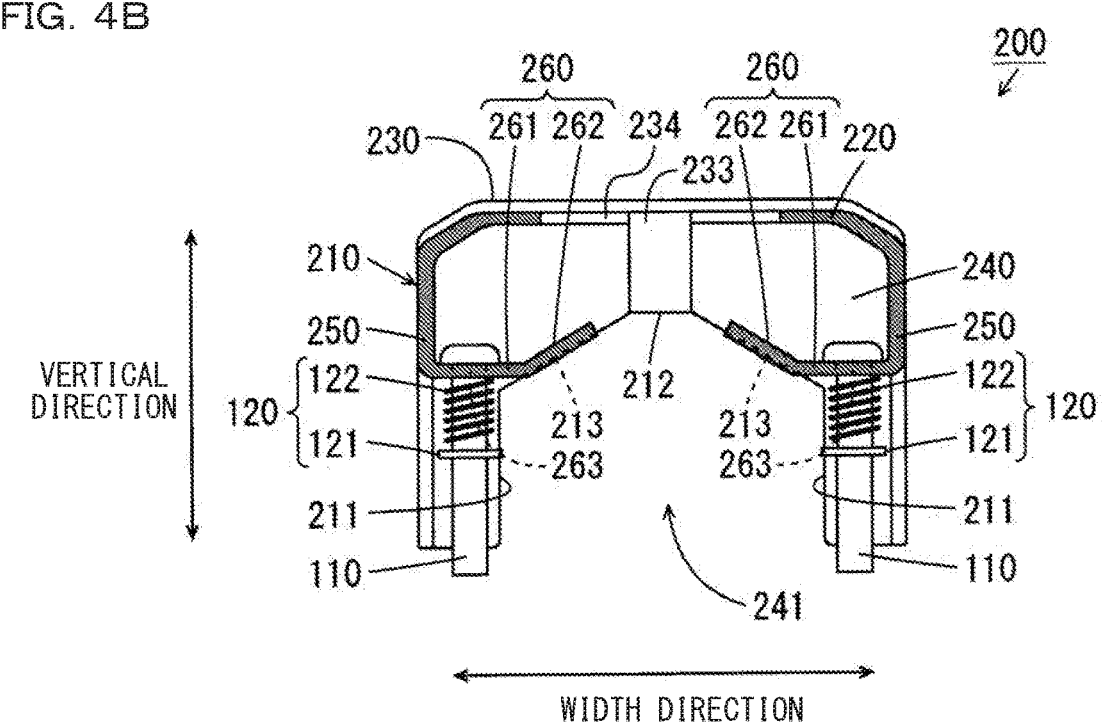
Figure 5A:
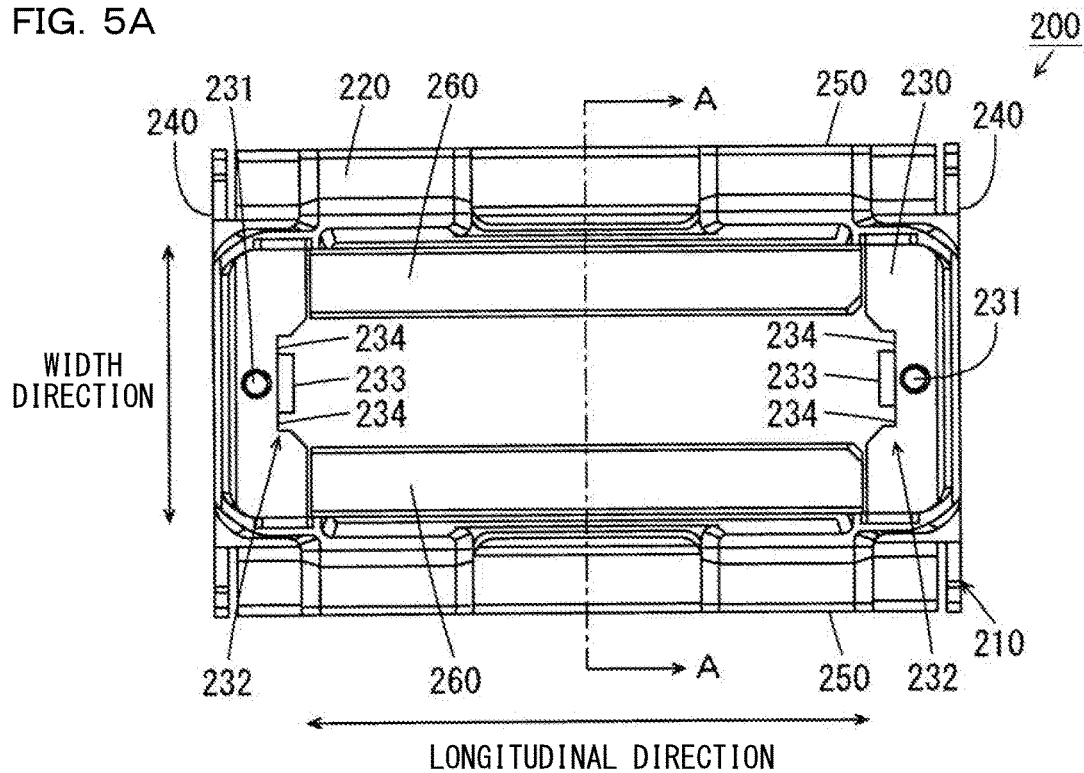
FIGS. 5A and 5B are plan views of the upper clamp member.
Figure 5B:
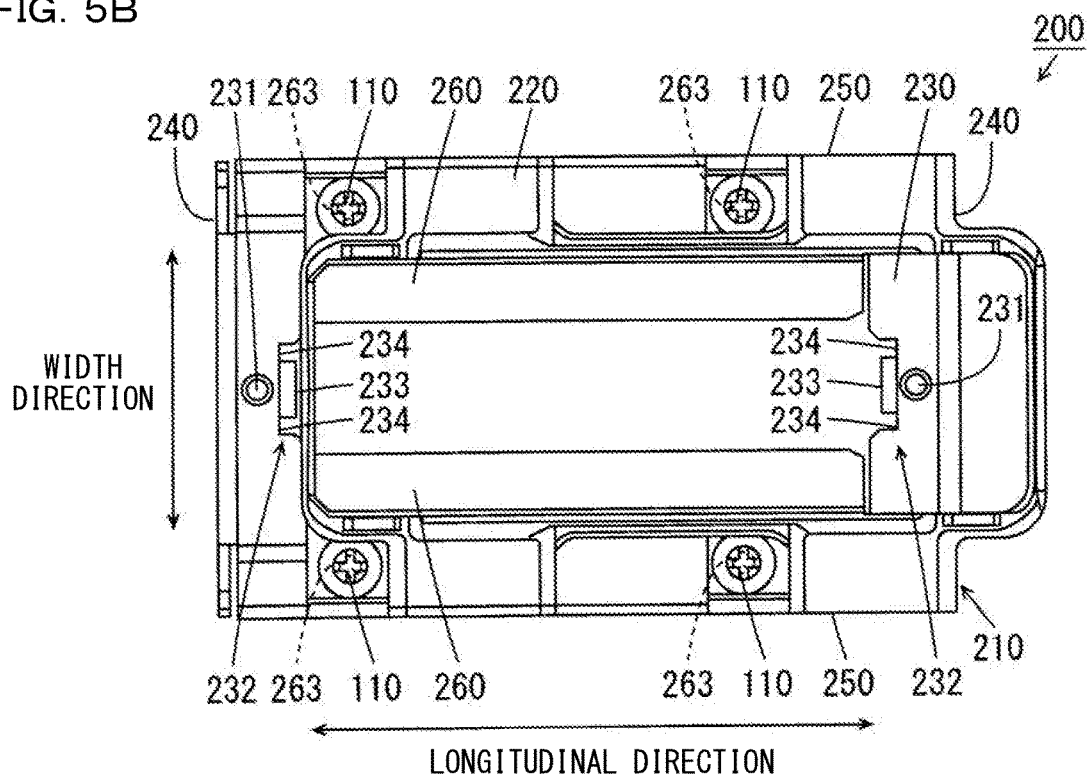
Figure 6A:
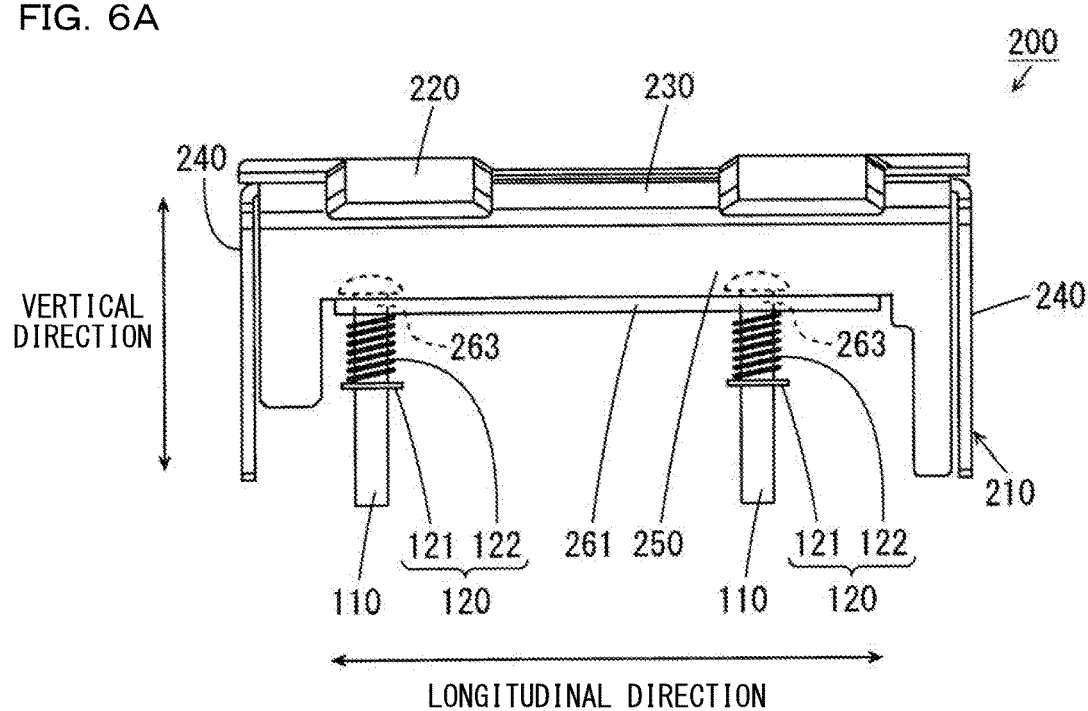
FIGS. 6A and 6B are side views of the upper clamp member.
Figure 6B:
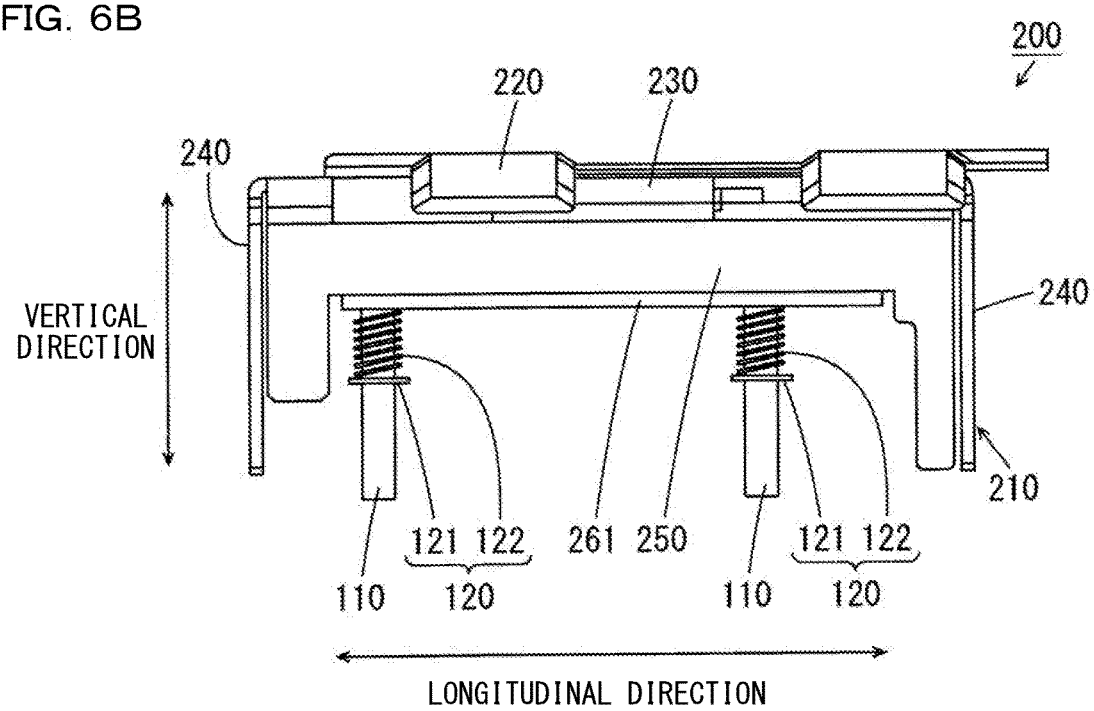

FIG. 3 is a perspective view of the upper clamp member 200. FIGS. 4A and 4B are an end face view and a longitudinal cross-sectional view of the upper clamp member 200. FIGS. 5A and 5B are plan views of the upper clamp member 200. FIGS. 6A and 6B are side views of the upper clamp member 200. FIG. 4B is a cross-sectional view of the upper clamp member 200 taken along line A-A in FIG. 5A. Hereinafter, the configuration of the upper clamp member 200 will be described with reference to FIGS. 3 to 6B.

As shown in FIG. 3, the upper clamp member 200 is formed of a fixed part 210 and a movable part 220. The fixed part 210 is fixed to the pipe 2 shown in FIG. 1. The movable part 220 is disposed movably with respect to the fixed part 210. In this embodiment, the movable part 220 is slidably movable with respect to the fixed part 210.

FIGS. 5A and 6A show the upper clamp member 200 in a state where the movable part 220 is not slid, and FIGS. 5B and 6B show the upper clamp member 200 in a state where the movable part 220 is slid. The position of the movable part 220 in FIGS. 5B and 6B is referred to as "first position", and the position of the movable part 220 shown in FIGS. 5A and 6A is referred to as "second position".

The fixed part 210 includes an upper surface part 230, two end surface parts 240, two side surface parts 250 and two contact parts 260. In this embodiment, the upper surface part 230, two end surface parts 240, two side surface parts 250 and two contact parts 260 are integrally formed by using a material having high rigidity such as metal.

The upper surface part 230 has a rectangular frame shape extending in one direction in a plan view. Hereinafter, the longitudinal direction of the upper surface part 230 as viewed in a plan view is referred to as the longitudinal direction of the flow switch 1, the width direction of the upper surface part 230 as viewed in a plan view is referred to as the width direction of the flow switch 1, and the direction orthogonal to the longitudinal direction and the width direction is referred to as the vertical direction of the flow switch 1. In a state where the flow switch 1 is mounted on the pipe 2, the longitudinal direction of the flow switch 1 coincides with the axial direction of the pipe 2 (the direction in which the pipe 2 extends), the width direction of the flow switch 1 substantially coincides with the circumferential direction of the pipe 2, and the vertical direction of the flow switch 1 coincides with the radial direction of the pipe 2.

As shown in FIGS. 3, 5A and 5B, a threaded hole 231 which penetrates the upper surface part 230 in the vertical direction is formed in each of both end portions of the upper surface part 230 in the longitudinal direction. Sensor fixing screws 410 shown in FIG. 2 are threadedly engaged with the respective threaded holes 231. A notched part 232 is formed in an inner peripheral surface of each of both end portions of the upper surface part 230 in the longitudinal direction. Projecting parts 233 which project downward are formed in the respective notched parts 232. With such a configuration, two recesses 234 are formed on inner peripheral surfaces of both end portions of the upper surface part 230 in the longitudinal direction such that the recesses 234 sandwich the projecting part 233.

As shown in FIGS. 3, 6A and 6B, two end surface parts 240 respectively extend downward from both end portions of the upper surface part 230 in the longitudinal direction. As shown in FIG. 4A, a notched part 241 which has a polygonal shape and opened downward is formed in each end surface part 240. With such a configuration, a plurality of cut surfaces appear on a cut opening of the end surface part 240 in the notched part 241. In this embodiment, two vertical cut surfaces 211, one horizontal cut surface 212 and two inclined cut surfaces 213 appear on each end surface part 240.

Two vertical cut surfaces 211 extend vertically upward from a lower portion of the end surface part 240. A distance in the width direction between two vertical cut surfaces 211 is larger than an outer diameter of the pipe 2. The horizontal cut surface 212 extends horizontally in the width direction between and above two vertical cut surfaces 211. A length of the horizontal cut surface 212 in the width direction is smaller than an outer diameter of the pipe 2. One inclined cut surface 213 extends in an inclined manner from an upper portion of one vertical cut surface 211 to one end portion of the horizontal cut surface 212. The other inclined cut surface 213 extends in an inclined manner from an upper portion of the other vertical cut surface 211 to the other end portion of the horizontal cut surface 212.

As shown in FIGS. 3, 4A and 4B, two side surface parts 250 respectively extend downward from both end portions of the upper surface part 230 in the width direction. As shown in FIG. 4B, two contact parts 260 are formed respectively corresponding to two side surface parts 250. Each contact part 260 includes a horizontal part 261 and an inclined part 262. The horizontal part 261 is bent from a lower end portion of the side surface part 250 which corresponds to the horizontal part 261 and extends horizontally inwardly. The inclined part 262 extends obliquely in the upward and inward direction so as to be inclined from an end portion of the horizontal part 261.

Inclination angles of one and the other inclined parts 262 are respectively set substantially equal to inclination angles of one and the other inclined cut surfaces 213 of the end surface part 240. In a state where the upper clamp member 200 is not mounted on the pipe 2, lower surfaces of one and the other inclined parts 262 project in the slightly downward and inward direction from one and the other inclined cut surfaces 213 of the end surface parts 240. With such a configuration, it is possible to bring the lower surfaces of one and the other inclined parts 262 into contact with an outer peripheral surface of the pipe 2.

As shown in FIGS. 4B, 6A and 6B, a plurality of through holes 263 are formed in each horizontal part 261 such that the through holes 263 penetrate the horizontal part 261 in the vertical direction. In this embodiment, in each horizontal part 261, two through holes 263 are formed side by side in the longitudinal direction with a predetermined distance therebetween. A plurality of clamp fixing screws 110 are passed through the plurality of through holes 263 formed in the horizontal part 261 from above, respectively.

In this embodiment, as shown in FIGS. 5B and 6B, the plurality of through holes 263 are viewable from above by sliding the movable part 220 to the first position. In this state, the plurality of clamp fixing screws 110 are passed through the plurality of through holes 263, respectively. In a state where the movable part 220 is at the first position, the sensor part 400 cannot be mounted on the upper clamp member 200. Accordingly, in mounting the sensor part 400 shown in FIG. 1 on the upper clamp member 200, the movable part 220 is returned to the second position as shown in FIGS. 5A and 6A.

Each clamp fixing screw 110 is provided with a posture maintaining mechanism 120. Each posture maintaining mechanism 120 includes an annular member 121 and a spring member 122. The annular member 121 is fixed to a substantially center portion of the clamp fixing screw 110 in the vertical direction in a state where the clamp fixing screw 110 is passed through the through hole 263 formed in the horizontal part 261. The spring member 122 has a spiral shape, and an outer diameter of the spring member 122 is smaller than an outer diameter of the annular member 121. The spring member 122 is arranged between the horizontal part 261 and the annular member 121 so as to urge the horizontal part 261 and the annular member 121.

With such a configuration, even in the case where the upper clamp member 200 is arranged such that the longitudinal direction or the width direction of the upper clamp member 200 is directed in the vertical direction, the plurality of clamp fixing screws 110 are held substantially perpendicular to the horizontal part 261 by the posture maintaining mechanism 120. Accordingly, even in the case where the upper clamp member 200 is mounted on the pipe 2 extending in the vertical direction, the plurality of clamp fixing screws 110 can be easily threadedly engaged with a plurality of threaded holes, to be described later, which are formed in the lower clamp member 300.

(2) Lower Clamp Member

Figure 7:
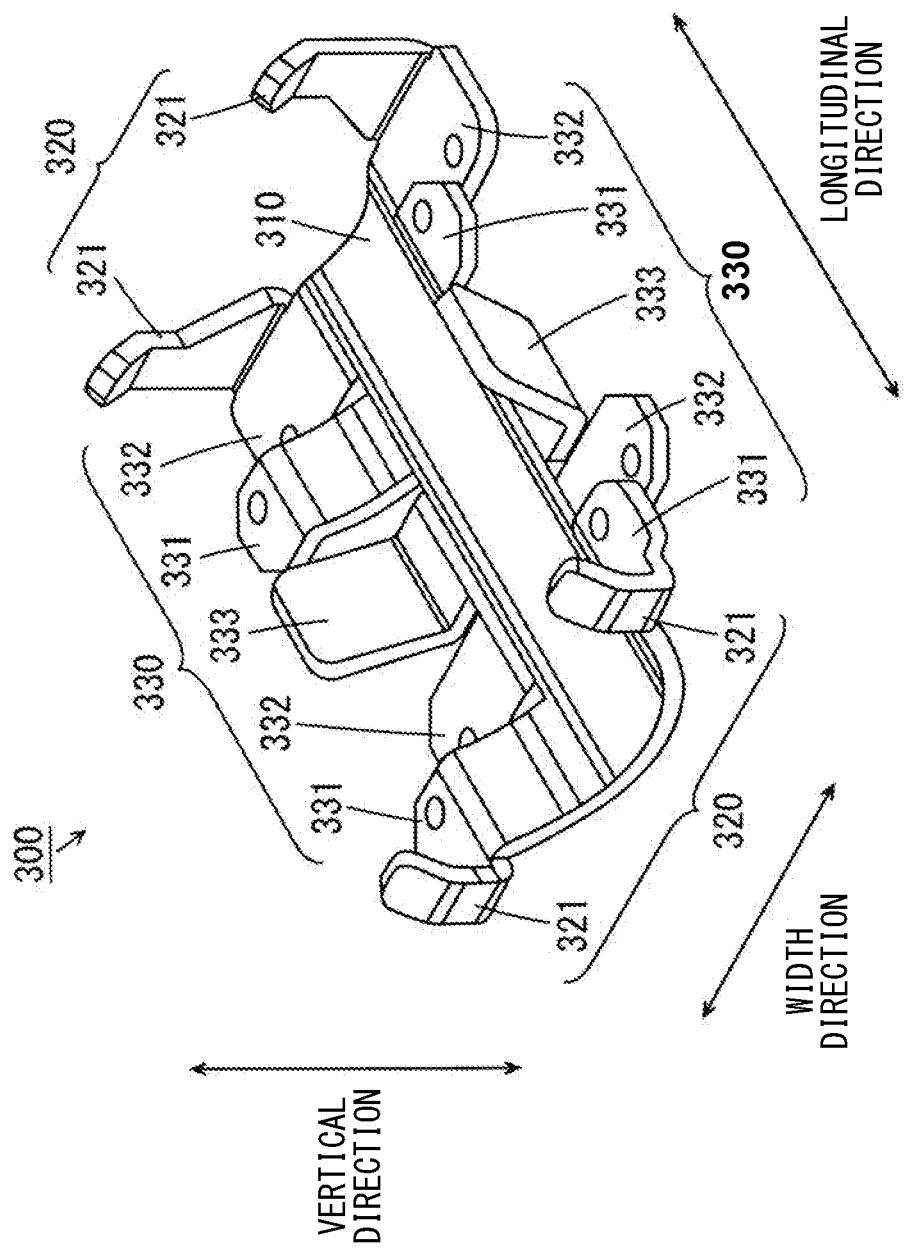
FIG. 7 is a perspective view of a lower clamp member.
Figure 8:
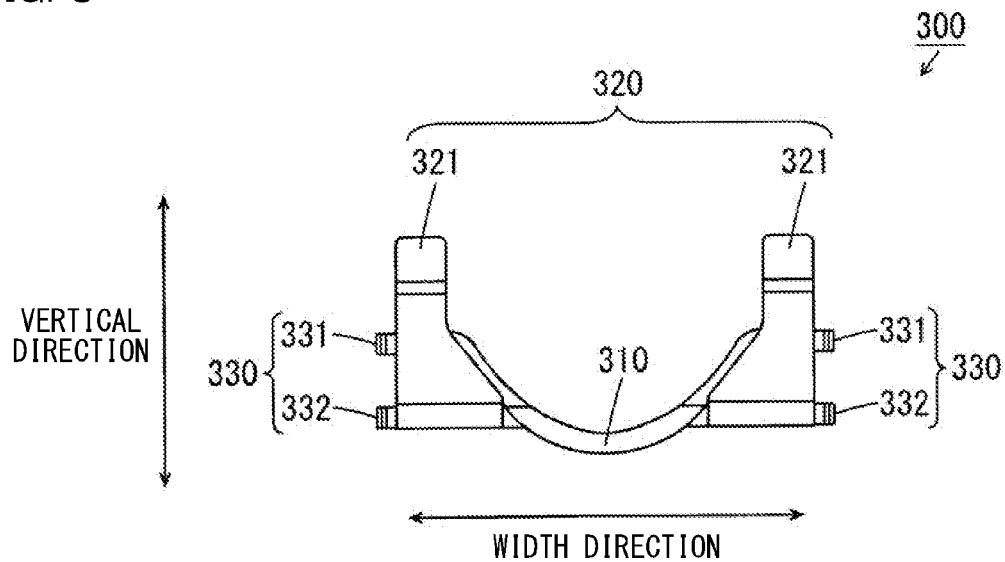
FIG. 8 is an end face view of the lower clamp member.
Figure 9:
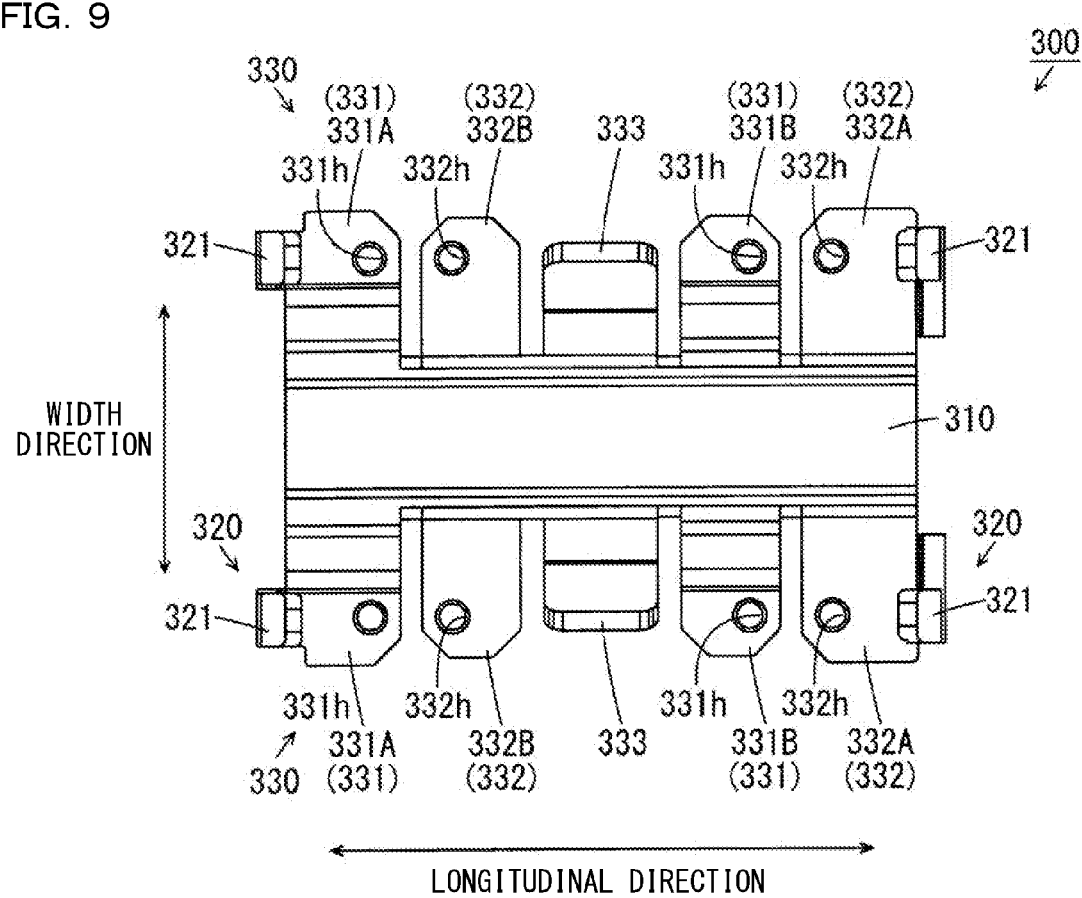
FIG. 9 is a plan view of the lower clamp member.
Figure 10:
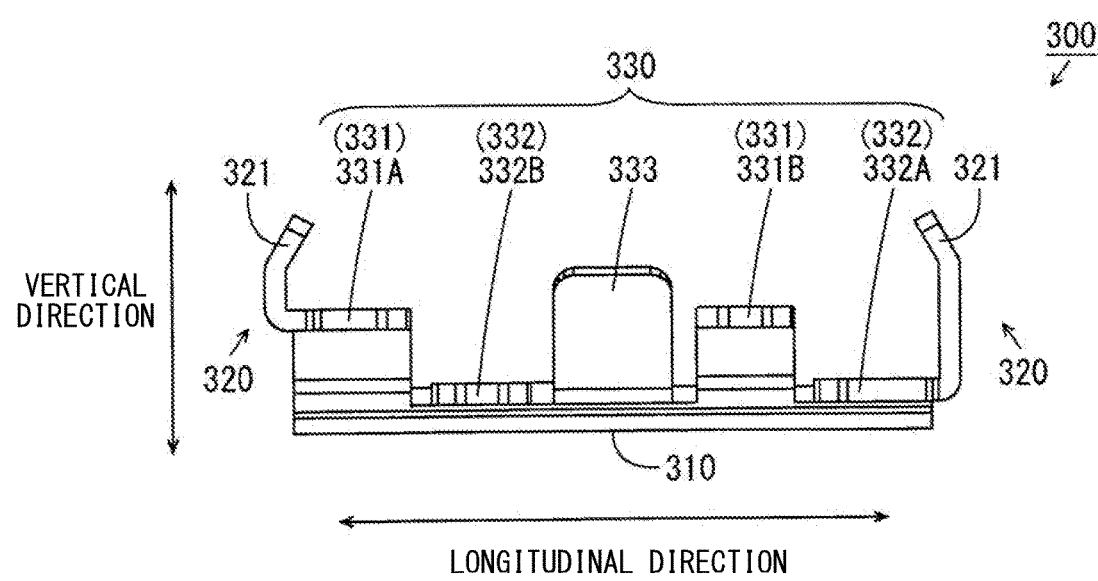
FIG. 10 is a side view of the lower clamp member.

FIG. 7 is a perspective view of the lower clamp member 300. FIG. 8 is an end face view of the lower clamp member 300. FIG. 9 is a plan view of the lower clamp member 300. FIG. 10 is a side view of the lower clamp member 300. Hereinafter, the configuration of the lower clamp member 300 will be described with reference to FIGS. 7 to 10.

As shown in FIG. 7, the lower clamp member 300 includes a bottom surface part 310, two end surface parts 320 and two side surface parts 330. In this embodiment, the bottom surface part 310, two end surface parts 320 and two side surface parts 330 are integrally formed by a material having high rigidity such as metal.

As shown in FIGS. 7 and 8, the bottom surface part 310 has a curved shape extending in the longitudinal direction. A curvature of an upper surface of the bottom surface part 310 is larger than a curvature of an outer peripheral surface of the pipe 2. Accordingly, the outer peripheral surface of the pipe 2 shown in FIG. 1 can be brought into contact with a curved upper surface of the bottom surface part 310. As shown in FIGS. 7 and 9, two side surface parts 330 are formed on both end portions of the bottom surface part 310 in the width direction, respectively. Each side surface part 330 includes two projecting pieces 331, two projecting pieces 332 and one inclined piece 333.

In FIGS. 9 and 10, two projecting pieces 331 formed on each side surface part 330 are referred to as "projecting piece 331A" and "projecting piece 331B", respectively, and two projecting pieces 332 are referred to as "projecting piece 332A" and "projecting piece 332B", respectively. As shown in FIGS. 9 and 10, the projecting piece 331A, the projecting piece 332B, the inclined piece 333, the projecting piece 331B and the projecting piece 332A are arranged side by side in this order in the longitudinal direction on each side surface part 330.

As shown in FIGS. 7 to 10, each end surface part 320 includes two projecting pieces 321. Two projecting pieces 321 formed on one end surface part 320 are formed in an upwardly projecting manner from one end portions of two projecting pieces 331A in the longitudinal direction, respectively. Two projecting pieces 321 formed on the other end surface part 320 are formed in an upwardly projecting manner from the other end portions of two projecting pieces 332A in the longitudinal direction, respectively.

As shown in FIG. 9, the projecting pieces 331A, 331B formed on each side surface part 330 project horizontally outward from both end portions of the bottom surface part 310 in the width direction. The projecting pieces 332A, 332B formed on each side surface part 330 project horizontally outward from both end portions of the bottom surface part 310 in the width direction. The inclined piece 333 formed on each side surface part 330 projects in an inclined manner outwardly and upwardly from both end portions of the bottom surface part 310 in the width direction.

As shown in FIG. 10, the projecting pieces 331A, 331B are positioned at heights substantially equal to each other. The projecting pieces 332A, 332B are positioned below the projecting pieces 331A, 331B and at heights substantially equal to each other. As shown in FIG. 9, a threaded hole 331$h$ is formed in each of the projecting pieces 331A, 331B such that the threaded holes 331$h$ penetrate the projecting pieces 331A, 331B in the vertical direction. A threaded hole 332$h$ is formed in each of the projecting pieces 332A, 332B such that the threaded holes 332$h$ penetrate the projecting pieces 332A, 332B in the vertical direction.

A distance between the threaded holes 331$h$ formed in the projecting pieces 331A, 331B on each side surface part 330 is set equal to a distance between two through holes 263 formed in one horizontal part 261 of the upper clamp member 200 shown in FIG. 6A. A distance between the threaded holes 332h formed in the projecting pieces 332A, 332B on each side surface part 330 is set equal to a distance between two through holes 263 formed in one horizontal part 261 of the upper clamp member 200 shown in FIG. 6A.

Hereinafter, as shown in FIGS. 9 and 10, the direction of the lower clamp member 300 when the projecting piece 331A is positioned at one end in the longitudinal direction and the projecting piece 332A is positioned at the other end in the longitudinal direction is referred to as a first direction. On the other hand, in contrast to FIGS. 9 and 10, the direction of the lower clamp member 300 when the projecting piece 331A is positioned at the other end in the longitudinal direction and the projecting piece 332A is positioned at one end in the longitudinal direction is referred to as a second direction. An operator can arrange the direction of the lower clamp member 300 in either the first direction or the second direction by rotating the lower clamp member 300 about an axis parallel to the vertical direction by 180 degrees.

With such a configuration, when the pipe 2 is clamped by the upper clamp member 200 and the lower clamp member 300 in a state where the lower clamp member 300 is arranged in the first direction, the plurality of clamp fixing screws 110 shown in FIG. 6A are threadedly engaged with the plurality of threaded holes 331h, respectively. On the other hand, when the pipe 2 is clamped by the upper clamp member 200 and the lower clamp member 300 in a state where the lower clamp member 300 is arranged in the second direction, the plurality of clamp fixing screws 110 shown in FIG. 6A are threadedly engaged with the plurality of threaded holes 332h, respectively.

The projecting pieces 331 and the projecting pieces 332 are positioned at different heights. That is, a distance in the vertical direction from the through hole 263 shown in FIG. 6A to the threaded hole 331h and a distance in the vertical direction from the through hole 263 shown in FIG. 6A to the threaded hole 332h differ from each other. Accordingly, by properly selecting the direction in which the lower clamp member 300 is arranged between the first direction and the second direction depending on an outer diameter of the pipe 2, the lower clamp member 300 can be more easily and properly mounted on the pipe 2.

[3] Sensor Part

Figure 11:
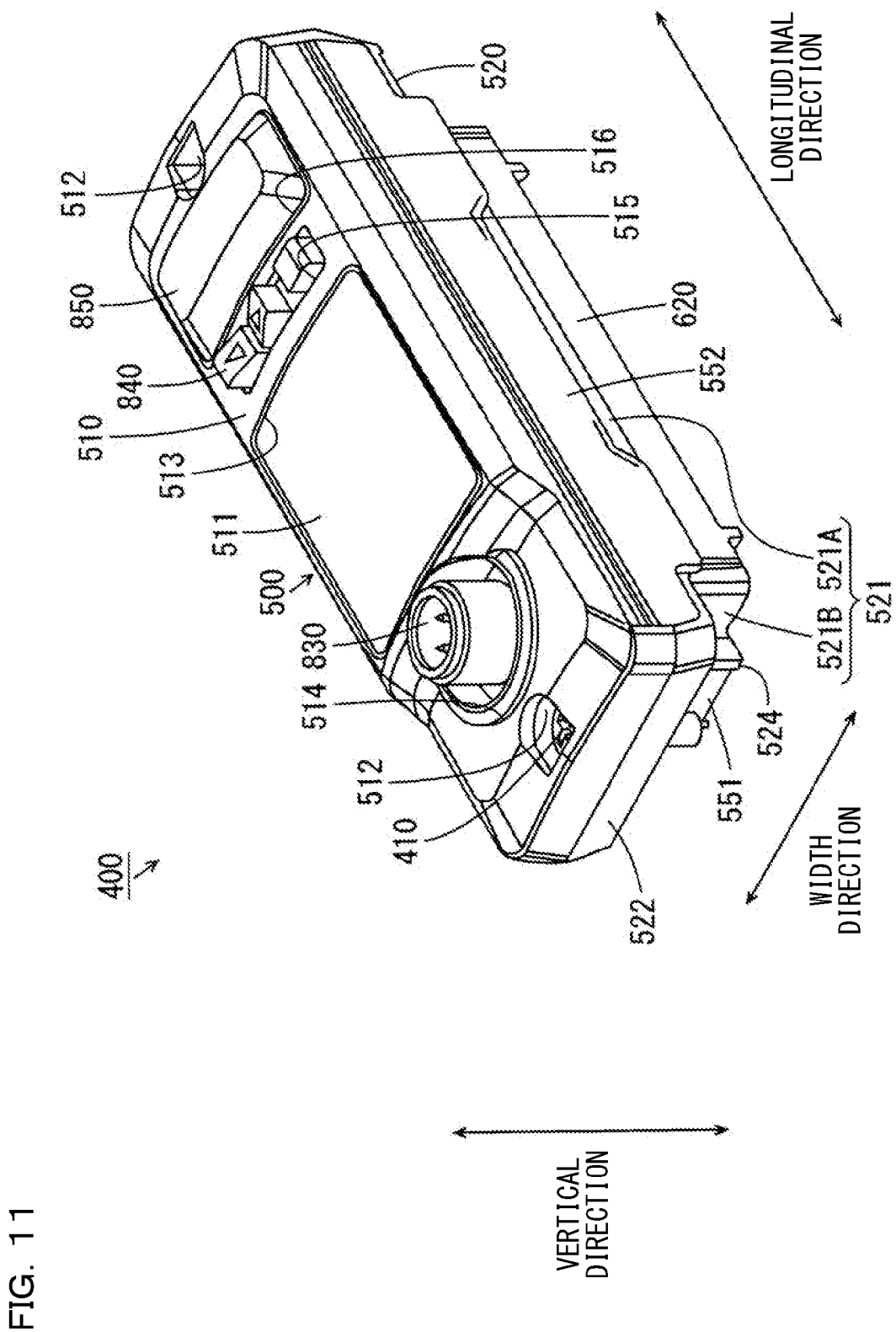
FIG. 11 is a perspective view of a sensor part.
Figure 12:
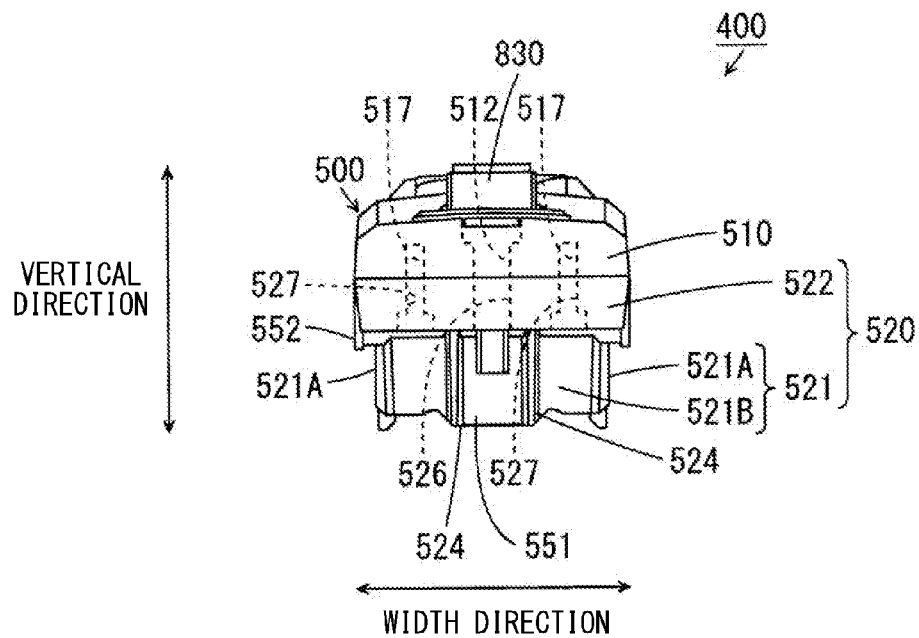
FIG. 12 is an end face view of the sensor part.
Figure 13:
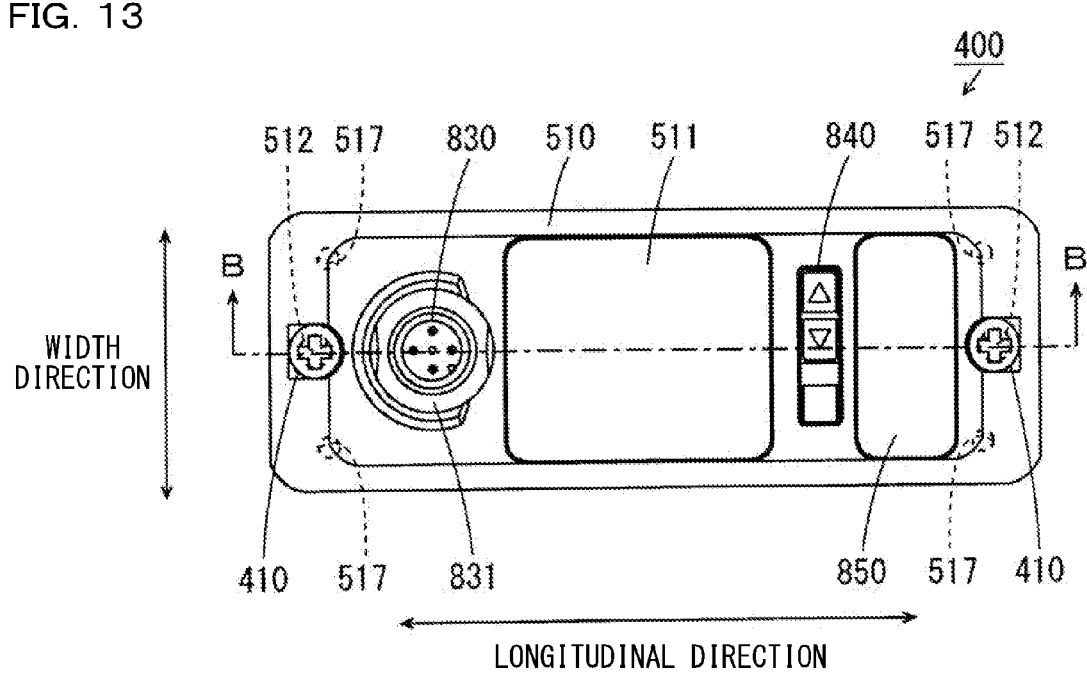
FIG. 13 is a plan view of the sensor part.
Figure 15:
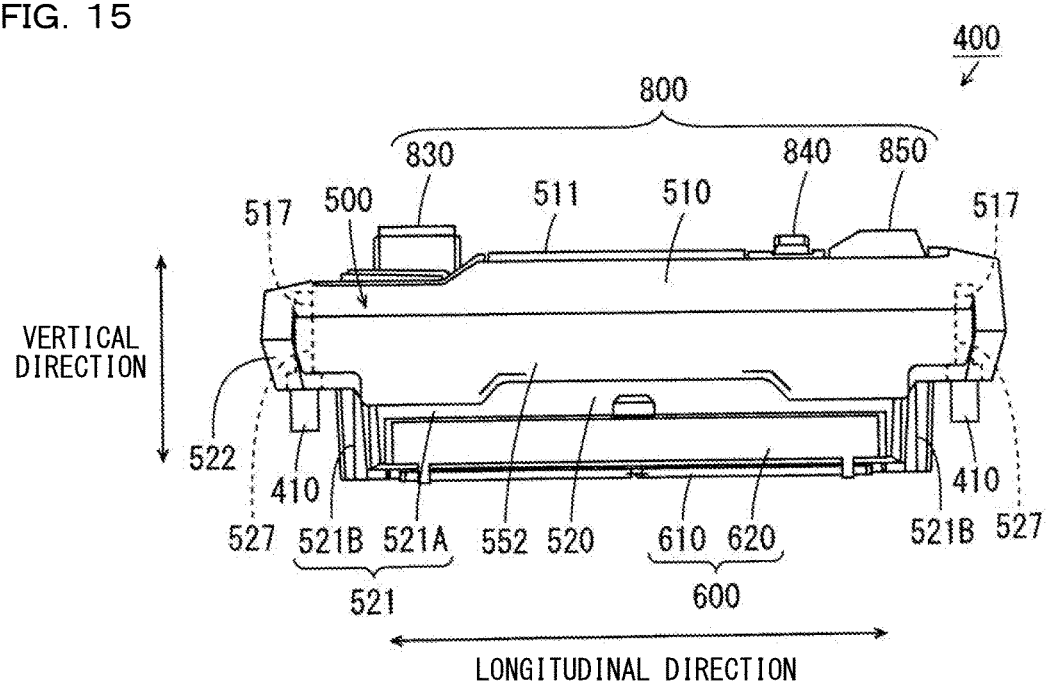
FIG. 15 is a side view of the sensor part.
Figure 16:
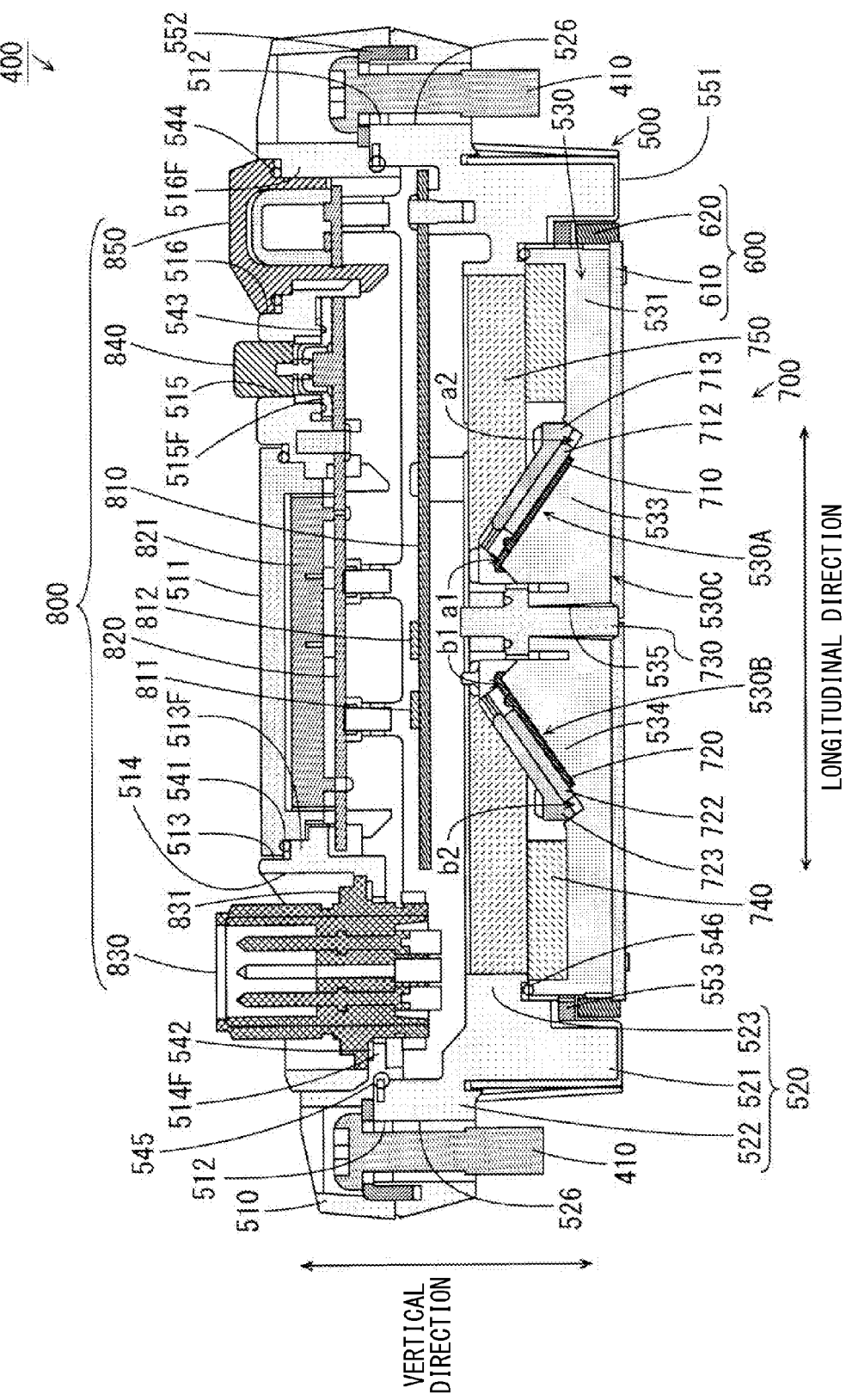
FIG. 16 is a cross-sectional view of the sensor part taken along line B-B in FIG. 13.

As described above, the sensor part 400 includes the casing part 500, the joining part 600, the ultrasonic wave control mechanism 700, and the electronic circuit part 800. FIG. 11 is a perspective view of the sensor part 400. FIG. 12 is an end face view of the sensor part 400. FIG. 13 is a plan view of the sensor part 400. FIG. 14 is a bottom view of the sensor part 400. FIG. 15 is a side view of the sensor part 400. FIG. 16 is a cross-sectional view of the sensor part 400 taken along line B-B in FIG. 13.

Figure 17:
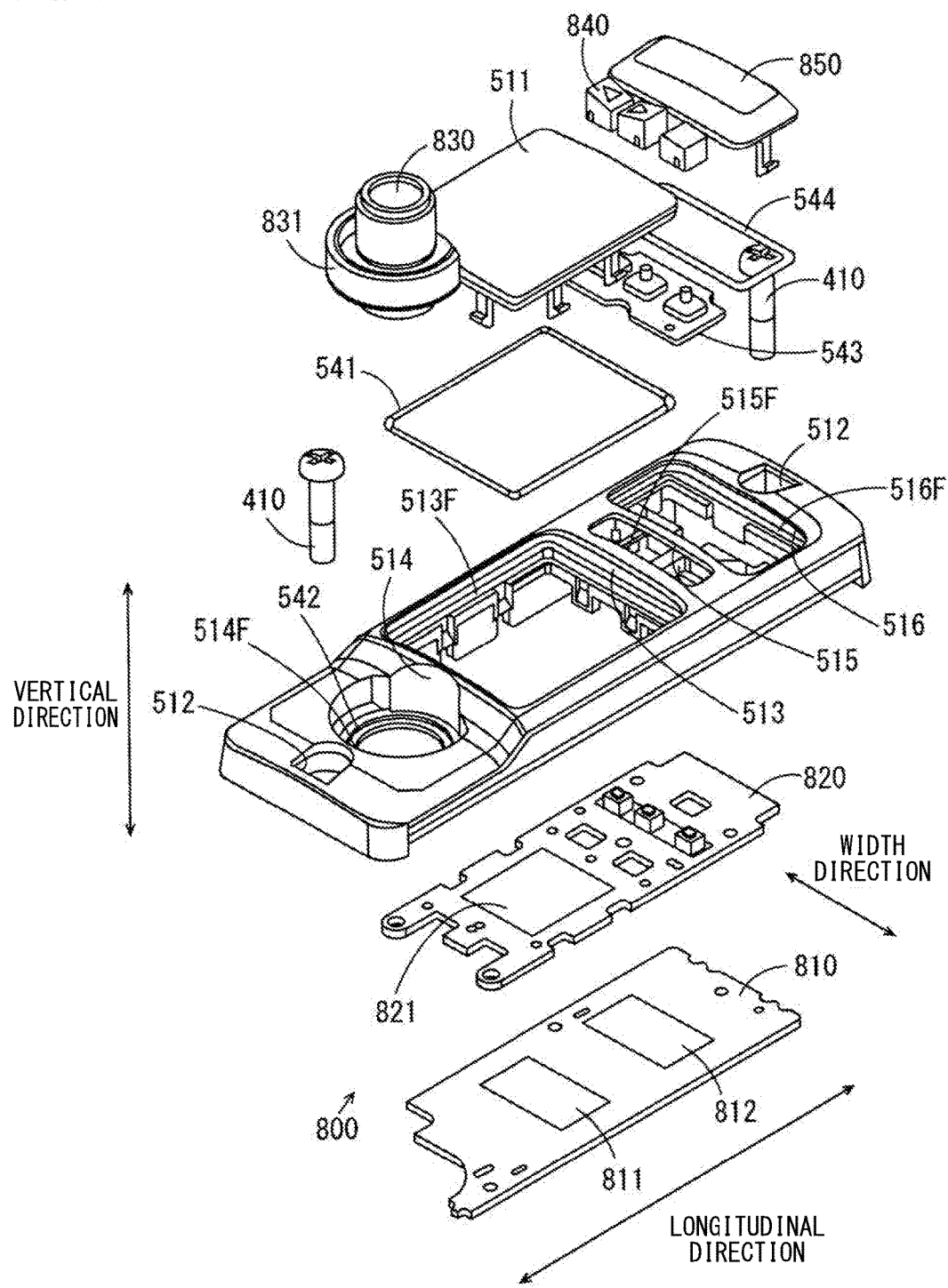
FIG. 17 is a perspective view of an upper casing part and an electronic circuit part of a casing part.
Figure 18:
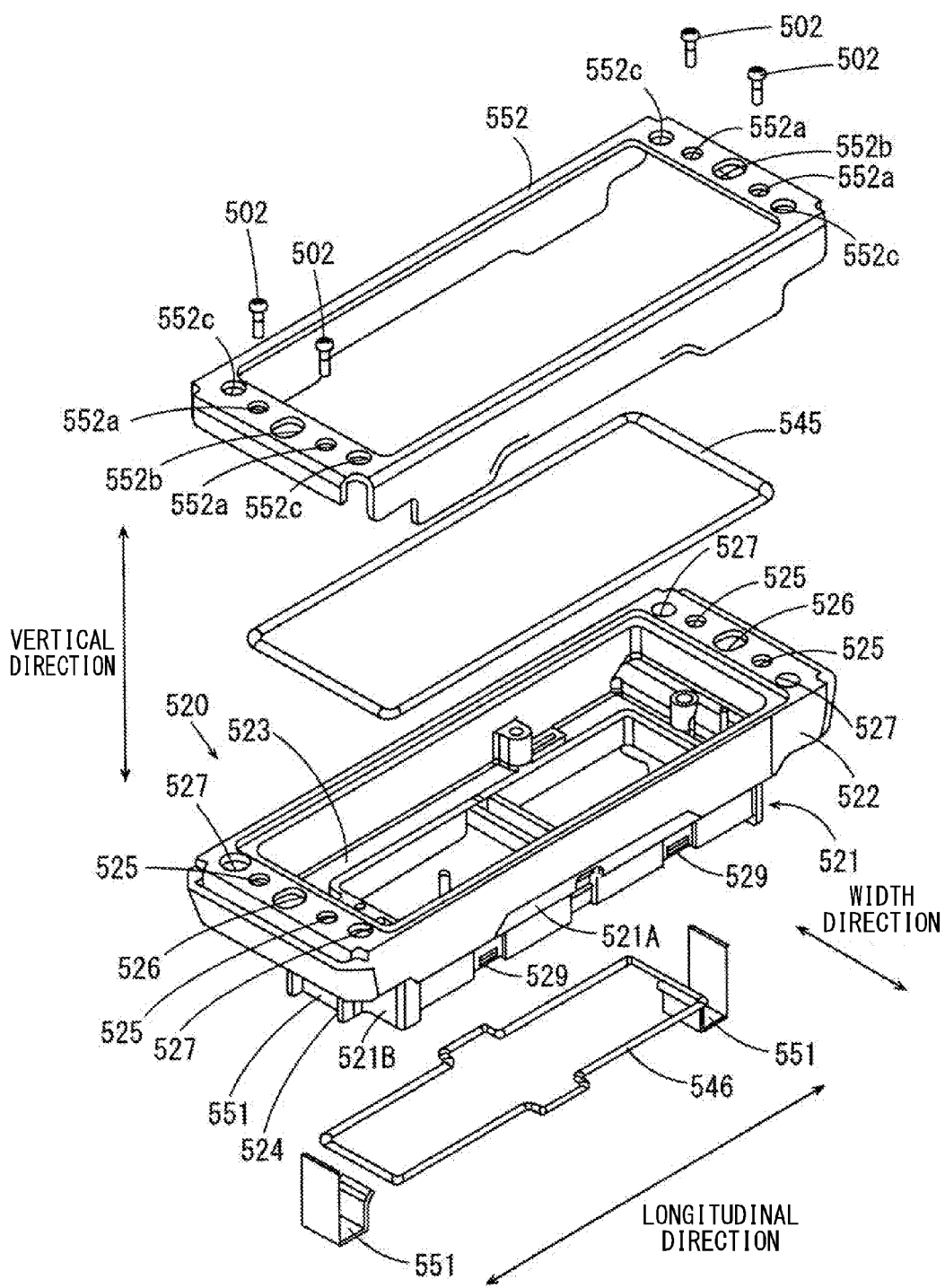
FIG. 18 is a perspective view of a lower casing part.
Figure 19:
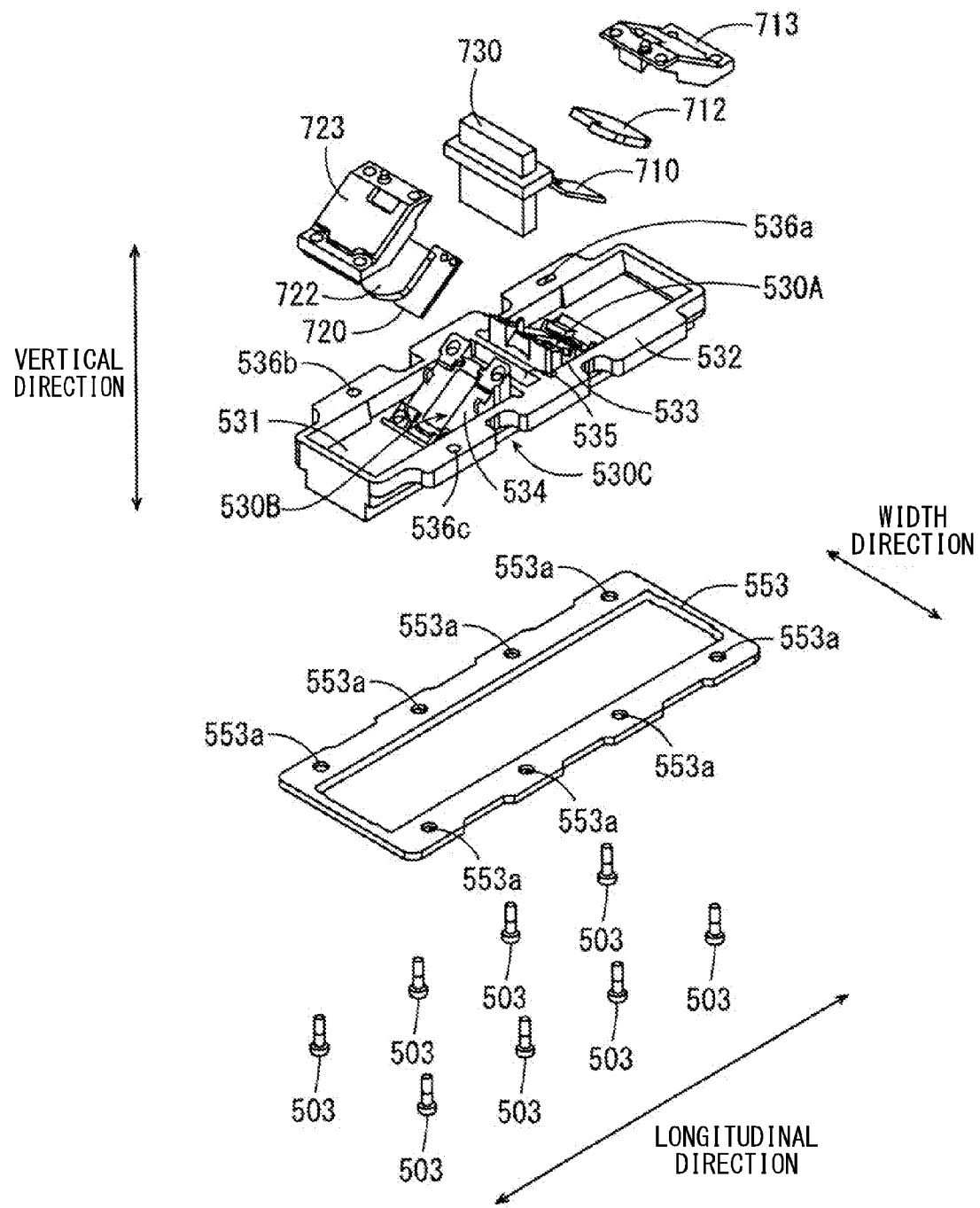
FIG. 19 is a perspective view of a path member and an ultrasonic wave control mechanism.

The casing part 500 is configured to include a plurality of seal members, a plurality of reinforcing members and a plurality of screw members in addition to the upper casing part 510, the lower casing part 520 and the path member 530. FIG. 17 is a perspective view of the upper casing part 510 and the electronic circuit part 800 of the casing part 500. FIG. 18 is a perspective view of the lower casing part 520. FIG. 19 is the perspective view of the path member 530 and the ultrasonic wave control mechanism 700. FIG. 20 is a perspective view of the joining part 600. Hereinafter, configurations of the parts of the sensor part 400 will be described with reference to FIGS. 11 to 20.

(1) Casing Part (a) Upper Casing Part

The upper casing part 510 is formed of resin, for example. As shown in FIGS. 11, 16 and 17, the upper casing part 510 has a substantially rectangular shape extending in the longitudinal direction as viewed in a plan view. Two screw openings 512 are formed in the upper casing part 510 such that the screw openings 512 penetrate the upper casing part 510 in the vertical direction. Two screw openings 512 are arranged at both end portions of the upper casing part 510 in the longitudinal direction. Each screw opening 512 includes a counterbore which allows a screw head of the sensor fixing screw 410 inserted from above to be embedded in and to engage with the upper casing part 510. Two sensor fixing screws 410 are rotatably fixed inside two screw openings 512, respectively.

As shown in FIGS. 12, 13 and 15, two bottomed threaded holes 517 which extend in the vertical direction are formed on respective lower surfaces of both end portions of the upper casing part 510 in the longitudinal direction. Each threaded hole 517 is arranged at a substantially center portion of the upper casing part 510 in the width direction. As shown in FIGS. 12 and 13, two threaded holes 517 are arranged side by side in the width direction with the screw opening 512 interposed therebetween.

Further, as shown in FIGS. 11, 16 and 17, a display part opening 513, a connecting part opening 514, an operating part opening 515 and a lamp opening 516 are formed in the upper casing part 510 such that these openings penetrate the upper casing part 510 in the vertical direction. The display part opening 513 is arranged at a substantially center portion of the upper casing part 510 in the longitudinal direction. The connecting part opening 514 is arranged between one screw opening 512 and the display part opening 513. The operating part opening 515 and the lamp opening 516 are arranged side by side in the longitudinal direction between the other screw opening 512 and the display part opening 513.

The display part opening 513 has a substantially rectangular shape. A display part flange 513F which projects inwardly is formed on an inner peripheral surface of the display part opening 513. A display part seal member 541 is arranged between an upper surface of the display part flange 513F and an edge portion of a lower surface of the window part 511. In this state, the window part 511 is fitted into the display part opening 513 from above.

The connecting part opening 514 has a substantially circular shape. A connecting part flange 514F which projects inwardly is formed on an inner peripheral surface of the connecting part opening 514. The connecting part 830 of the electronic circuit part 800 has an outer peripheral surface having a substantially circular cylindrical shape. A flange part 831 which projects outwardly is formed on an outer peripheral surface of the connecting part opening 514. A connecting part seal member 542 is arranged between an upper surface of the connecting part flange 514F and a lower surface of the flange part 831 of the connecting part 830. In this state, the connecting part 830 is fitted into the connecting part opening 514 from above.

The operating part opening 515 has a substantially rectangular shape. An operating part flange 515F which projects inwardly is formed on an inner peripheral surface of the operating part opening 515. An operating part seal member 543 is arranged between an upper surface of the operating part flange 515F and a lower surface of the operating part 840 of the electronic circuit part 800. In this state, the operating part 840 is fitted into the operating part opening 515 from above.

The lamp opening 516 has a substantially rectangular shape. A lamp flange 516F which projects inwardly is formed on an inner peripheral surface of the lamp opening 516. A lamp seal member 544 is arranged between an upper surface of the lamp flange 516F and an edge portion of a lower surface of the display lamp 850 of the electronic circuit part 800. In this state, the display lamp 850 is fitted into the lamp opening 516 from above.

(b) Lower Casing Part

The lower casing part 520 is formed of resin, for example. As shown in FIGS. 16 and 18, the lower casing part 520 includes a fitting part 521, an outer flange part 522 and an inner flange part 523. As shown in FIGS. 12 and 14, the fitting part 521 has two fitting side surface parts 521A and two fitting end surface parts 521B. Two fitting side surface parts 521A are side surface parts located at both ends of the fitting part 521 in the width direction, respectively. Two fitting end surface parts 521B are end surface parts located at both ends of the fitting part 521 in the longitudinal direction, respectively. An upper portion and a lower portion of the fitting part 521 are opened.

An outer peripheral surface of each fitting side surface part 521A has a shape which allows the outer peripheral surface to be fitted in an inner peripheral surface of the upper surface part 230 of the upper clamp member 200 in the width direction in FIG. 5A. As shown in FIG. 18, a plurality of hook-shaped latching portions 529 for mounting the joining part 600 on the casing part 500 are formed on a lower portion of each fitting side surface part 521A. Each fitting end surface part 521B has two protrusions 524 arranged side by side in the width direction. The two protrusions 524 extend in the vertical direction and project outward in the longitudinal direction. The plurality of protrusions 524 are respectively fitted in a plurality of recesses 234 formed on the upper surface part 230 shown in FIG. 5A.

In this embodiment, a lower end surface of the fitting end surface part 521B projects more downward than a lower end surface of the fitting side surface parts 521A. Accordingly, when the flow switch 1 is mounted on the pipe 2, the lower end surface of each fitting end surface part 521B is brought into contact with the pipe 2. Accordingly, as shown in FIGS. 11, 12, 14 and 18, a pipe contact surface reinforcing metal plate 551 is mounted on each fitting end surface part 521B for reinforcing the lower end surface of the fitting end surface part 521B.

Each pipe contact surface reinforcing metal plate 551 has a J-shaped cross section. Each pipe contact surface reinforcing metal plate 551 is arranged such that the pipe contact surface reinforcing metal plate 551 passes between two protrusions 524 formed on the outer peripheral surface of the fitting end surface part 521B, is routed around a lower end surface of the fitting end surface part 521B, and reaches an inner peripheral surface of the fitting end surface part 521B.

As shown in FIGS. 11, 12, 14 to 16 and 18, an outer flange part 522 projects outwardly from an upper portion of the fitting part 521. Two threaded holes 525, a screw opening 526 and two screw openings 527 are formed on each of upper surfaces of both end portions of the outer flange part 522 in the longitudinal direction. Each screw opening 526 is arranged at a substantially center portion of the outer flange part 522 in the width direction. As shown in FIGS. 12 and 16, the plurality of screw openings 526 penetrate the outer flange part 522 in the vertical direction and respectively communicate with the plurality of screw openings 512 formed in the upper casing part 510.

As shown in FIG. 18, two threaded holes 525 are arranged side by side in the width direction with the screw opening 526 interposed therebetween. The plurality of threaded holes 525 are formed on an upper end surface of the outer flange part 522 and have a bottomed shape extending in the vertical direction.

Two screw openings 527 are arranged side by side in the width direction with two threaded holes 525 and the screw opening 526 interposed therebetween. As shown in FIGS. 12 and 15, the plurality of screw openings 527 penetrate the outer flange part 522 in the vertical direction and respectively communicate with the plurality of threaded holes 517 formed in the upper casing part 510. Each screw opening 527 includes a counterbore which allows a screw head of a later-described casing fixing screw 501 inserted from below to be embedded in and to engage with the outer flange part 522.

As shown in FIGS. 11, 15, 16 and 18, a lower casing part reinforcing metal plate 552 is mounted on the outer flange part 522 for reinforcing an upper end surface of the outer flange part 522. The lower casing part reinforcing metal plate 552 is arranged so as to cover the upper end surface of the outer flange part 522 and side surface parts of the outer flange part 522 on both ends in the width direction.

As shown in FIG. 18, two screw openings 552a, a screw opening 552b and two screw openings 552c are formed in each of end portions of the lower casing part reinforcing metal plate 552 in the longitudinal direction such that these screw openings penetrate the lower casing part reinforcing metal plate 552 in the vertical direction. A plurality of screw openings 552a are arranged so as to overlap with a plurality of threaded holes 525 formed in the outer flange part 522, respectively. A plurality of screw openings 552b are arranged so as to overlap with a plurality of screw openings 526 formed in the outer flange part 522, respectively. A plurality of screw openings 552c are arranged so as to overlap with a plurality of screw openings 527 formed in the outer flange part 522, respectively.

A plurality of metal plate fixing screws 502 are passed through a plurality of screw openings 552a formed in the lower casing part reinforcing metal plates 552 from above, respectively. In this state, the respective metal plate fixing screws 502 are threadedly engaged with the corresponding threaded holes 525 formed in the outer flange part 522. With such a configuration, the lower casing part reinforcing metal plate 552 is mounted on the outer flange part 522.

As shown in FIGS. 16 and 18, an inter-casing seal member 545 is arranged on an inner edge of an upper end surface of the outer flange part 522. Next, the upper casing part 510 is arranged on the outer flange part 522 from above. Thereafter, as shown in FIG. 14, a plurality of casing fixing screws 501 are passed through a plurality of screw openings 512, respectively.

In this state, the respective casing fixing screws 501 pass through the screw openings 552c formed in the lower casing part reinforcing metal plate 552 and are threadedly engaged with the corresponding threaded holes 517. With such a configuration, the upper casing part 510 is mounted on the lower casing part 520. As shown in FIGS. 11, 12, 15 and 16, distal ends of the sensor fixing screws 410 which are passed through the respective screw openings 512 formed in the upper casing part 510 pass through the screw openings 526 and project downward from the outer flange part 522.

As shown in FIGS. 16 and 18, the inner flange part 523 projects inwardly from an inner peripheral surface of the fitting part 521. As shown in FIG. 14, a plurality of (three in this embodiment) positioning projections 523a, 523b, 523c which projects downward are formed on an outer edge of a lower surface of the inner flange part 523. Two positioning projections 523a, 523b are arranged on one end portion of the inner flange part 523 in the width direction such that two positioning projections 523a, 523b are arranged side by side in the longitudinal direction. One positioning projection 523c is arranged on the other end portion of the inner flange part 523 in the width direction.

A plurality of bottomed threaded holes 528 are formed in an outer edge of a lower surface of the inner flange part 523 such that the threaded holes 528 extend in the vertical direction. Out of the plurality of threaded holes 528, half of the threaded holes 528 are arranged side by side in the longitudinal direction on one end portion of the inner flange part 523 in the width direction. Remaining half of the threaded holes 528 are arranged side by side in the longitudinal direction on the other end portion of the inner flange part 523 in the width direction. A casing inter-path seal member 546 is arranged on an inner edge of a lower surface of the inner flange part 523. The path member 530 is mounted on a lower surface of the inner flange part 523. The details of this configuration will be described later.

(c) Path Member

The path member 530 is formed of a non-metal material having high rigidity and high acoustic transmissivity. Further, the path member 530 may preferably be formed of a material having high environmental resistance. In this embodiment, the path member 530 is formed of a PPS (polyphenylene sulfide) resin or an ULTEM (registered trademark) resin.

As shown in FIGS. 16 and 19, the path member 530 includes a bottom surface part 531 and an outer flange part 532. The bottom surface part 531 has a substantially rectangular shape extending in the longitudinal direction as viewed in a plan view. A lower surface of the bottom surface part 531 has a planar shape. A lower surface of the bottom surface part 531 is referred to as a pipe joining surface 530C.

Two projecting structures 533, 534 which project upwardly are formed on an upper surface of the bottom surface part 531 such that two projecting structures 533, 534 are arranged side by side in the longitudinal direction. Further, a shield plate opening 535 is formed in the bottom surface part 531. The shield plate opening 535 extends in the width direction of the bottom surface part 531, and penetrates the bottom surface part 531 in the vertical direction between the projecting structures 533, 534. An ultrasonic wave shield plate 730 of the ultrasonic wave control mechanism 700 is fitted in the shield plate opening 535.

With such a configuration, it is possible to prevent the occurrence of a phenomenon where an ultrasonic wave moves toward the ultrasonic wave element 720 from the ultrasonic wave element 710 without propagating through a fluid which flows in the pipe 2. In the same manner, it is possible to prevent the occurrence of a phenomenon in which an ultrasonic wave moves toward the ultrasonic wave element 710 from the ultrasonic wave element 720 without propagating through a fluid which flows in the pipe 2. Accordingly, a flow rate of a fluid in the pipe 2 can be calculated more accurately.

The projecting structure 533 has an inclined surface directed obliquely toward an upper outer side in the longitudinal direction. The projecting structure 534 has an inclined surface directed obliquely toward an upper outer side in the longitudinal direction. The inclined surfaces of the projecting structures 533, 534 are referred to as element joining surfaces 530A, 530B, respectively.

To be more specific, the element joining surface 530A has an end portion a1 located closest to the element joining surface 530B in the longitudinal direction, and an end portion a2 located farthest from the element joining surface 530B in the longitudinal direction. The element joining surface 530A is inclined such that the end portion a2 is located closer to the pipe than the end portion a1. The element joining surface 530B has an end portion b1 located closest to the element joining surface 530A in the longitudinal direction, and an end portion b2 located farthest from the element joining surface 530A in the longitudinal direction. The element joining surface 530B is inclined such that the end portion b2 is located closer to the pipe than the end portion b1.

The ultrasonic wave element 710 of the ultrasonic wave control mechanism 700 is bonded to the element joining surface 530A. The ultrasonic wave element 720 of the ultrasonic wave control mechanism 700 is bonded to the element joining surface 530B. In this case, the ultrasonic wave element 710 is arranged so as to transmit an ultrasonic wave to a fluid in the pipe 2 in a state where the ultrasonic wave element 710 is inclined with respect to the pipe 2. The ultrasonic wave element 720 is arranged so as to receive the ultrasonic wave which propagates the fluid in the pipe 2 in a state where the ultrasonic wave element 720 is inclined with respect to the pipe 2. With such a configuration, the transmission of an ultrasonic wave to a fluid in the pipe 2 and the reception of the ultrasonic wave which propagates through the fluid in the pipe 2 can be efficiently performed.

As described above, the ultrasonic wave elements 710, 720 can be supported by the common path member 530. Accordingly, a cost for parts, a manufacturing cost and an assembling cost can be further reduced. Further, assembling steps of the flow switch 1 can be further simplified. Still further, the flow switch 1 can be miniaturized.

Outer flange parts 532 project outward from upper portions of both end portions of the bottom surface part 531 in the width direction. A plurality of (three in this embodiment) positioning openings 536a, 536b, 536c are formed in the outer flange parts 532 such that these positioning openings 536a, 536b, 536c penetrate the outer flange part 532 in the vertical direction. Two positioning openings 536a, 536b are arranged on one end portion of the outer flange part 532 in the width direction such that these positioning openings 536a, 536b are arranged side by side in the longitudinal direction. One positioning opening 536c is arranged on the other end portion of the outer flange part 532 in the width direction. The plurality of positioning openings 536a to 536c respectively correspond to a plurality of positioning projections 523a to 523c formed on the inner flange part 523 (FIG. 14).

A path fixing metal plate 553 having a rectangular frame shape is arranged below the path member 530. A bottom surface part 531 of the path member 530 is fitted on an inner peripheral surface of the path fixing metal plate 553. A lower surface of the outer flange part 532 of the path member 530 is brought into contact with upper surfaces of both end portions of the path fixing metal plates 553 in the width direction.

A plurality of screw openings 553a are formed in both end portions of the path fixing metal plate 553 in the width direction such that these screw openings 553a penetrate both end portions in the vertical direction. Out of the plurality of screw openings 553a, half of the screw openings 553a are arranged on one end portion of the path fixing metal plate 553 in the width direction such that these screw openings 553a are arranged side by side in the longitudinal direction. Remaining half of the screw openings 553a are arranged on the other end portion of the path fixing metal plate 553 in the width direction such that these screw openings 553a are arranged side by side in the longitudinal direction. The plurality of screw openings 553a respectively correspond to a plurality of threaded holes 528 formed in the inner flange part 523 (FIG. 14).

Figure 14:
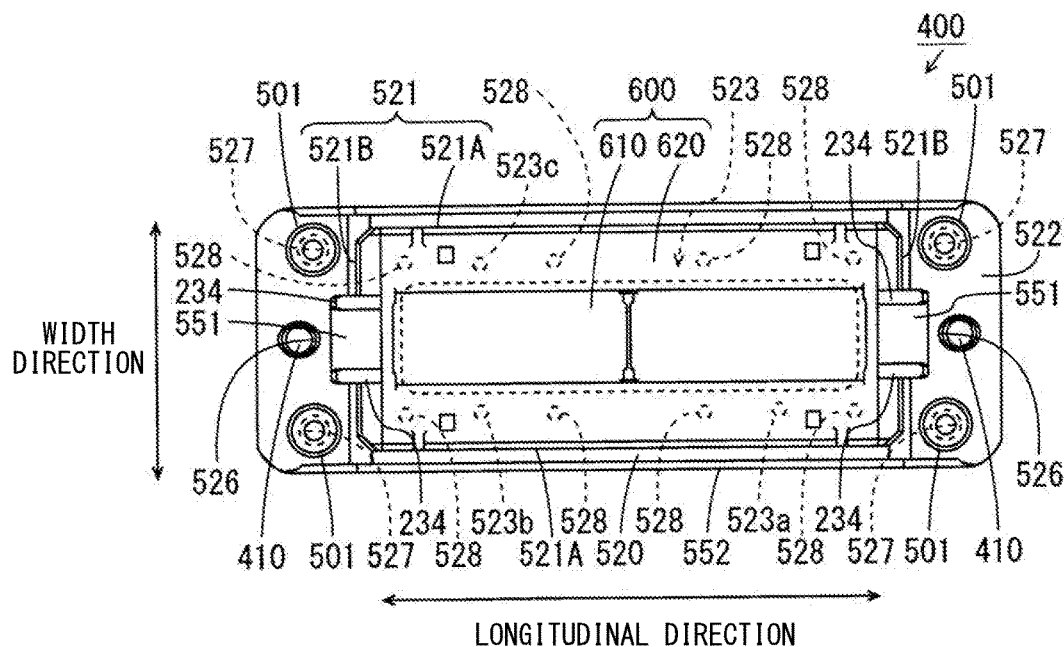
FIG. 14 is a bottom view of the sensor part.

The plurality of positioning projections 523a to 523c formed on the inner flange part 523 shown in FIG. 14 are respectively fitted in the positioning openings 536a to 536c formed in the path member 530 from above. In this case, a casing inter-path seal member 546 (FIG. 18) is arranged between a lower surface of the inner flange part 523 and an upper surface of the outer flange part 532 of the path member 530.

A plurality of metal plate fixing screws 503 are respectively passed through the plurality of screw openings 553a formed in the path fixing metal plate 553 from below. In this state, the respective metal plate fixing screws 503 are threadedly engaged with the corresponding threaded holes 528 formed in the inner flange part 523. With such a configuration, the path member 530 and the path fixing metal plate 553 are mounted on the lower casing part 520.

In the above-mentioned configuration, a positioning mechanism is formed of the plurality of positioning projections 523a to 523c formed on the inner flange part 523 and the positioning openings 536a to 536c formed in the path member 530. With such a configuration, in the longitudinal direction, the path member 530 cannot be mounted on the lower casing part 520 in the direction opposite to the normal direction. Accordingly, the path member 530 can be easily mounted on the lower casing part 520 in the normal direction in the longitudinal direction.

The casing part 500 having a hollow space inside thereof is completed by performing the above-mentioned mounting operation. The joining portions of the plurality of members in the casing part 500 are provided with the display part seal member 541, the connecting part seal member 542, the operating part seal member 543, the lamp seal member 544, the inter-casing seal member 545 and the casing inter-path seal member 546. Accordingly, it is possible to prevent a liquid such as water or oil from intruding into the space formed inside the casing part 500.

(2) Joining Part

Figure 20:
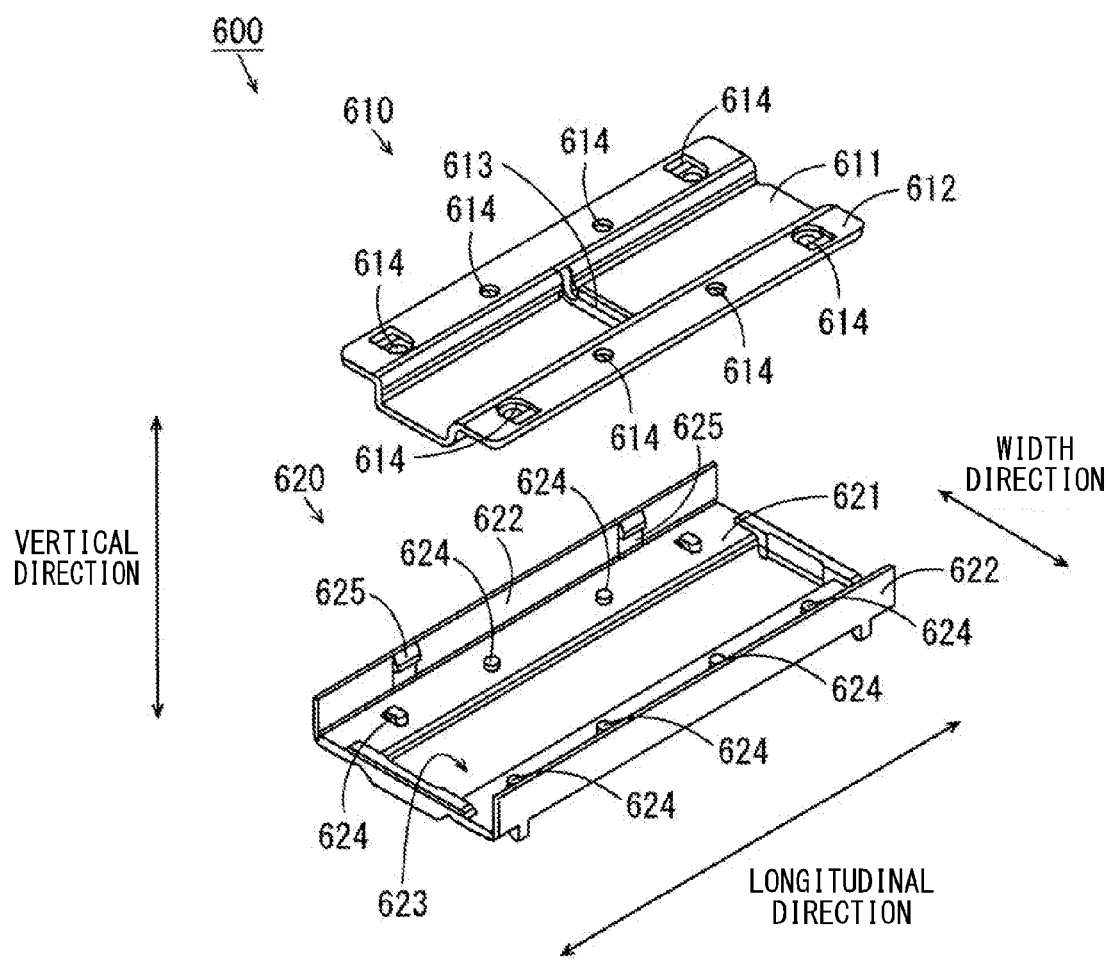
FIG. 20 is a perspective view of a joining part.

As shown in FIGS. 14 and 20, the joining part 600 includes the acoustic couplant 610 and the holding member 620. The acoustic couplant 610 is formed of a soft elastic material such as a high molecular rubber or a gel like substance.

It is preferable that the acoustic couplant 610 have an acoustic impedance value between an acoustic impedance value of the path member 530 shown in FIG. 16 and an acoustic impedance value of the pipe 2. With such a configuration, the reflection of an ultrasonic wave between the acoustic couplant 610 and the pipe 2 as well as between the acoustic couplant 610 and the path member 530 can be further reduced. As a result, transmission efficiency and reception efficiency of an ultrasonic wave by the ultrasonic wave elements 710, 720 can be enhanced.

The acoustic couplant 610 includes a bottom surface part 611 and outer flange parts 612. The bottom surface part 611 has a substantially rectangular shape extending in the longitudinal direction as viewed in a plan view. A slit 613 extending in the width direction is formed in a substantially center portion of the bottom surface part 621 in the longitudinal direction.

The outer flange parts 612 project outward from upper portions of both end portions of the bottom surface part 611 in the width direction. A plurality of positioning openings 614 are formed in the outer flange parts 612 such that the positioning openings 614 penetrate the outer flange parts 612 in the vertical direction. Out of the plurality of positioning openings 614, half of the positioning openings 614 are arranged on one end portion of the outer flange part 612 in the width direction such that the positioning openings 614 are arranged side by side in the longitudinal direction. Remaining half of the positioning openings 614 are arranged on the other end portion of the outer flange part 612 in the width direction such that the positioning openings 614 are arranged side by side in the longitudinal direction.

The holding member 620 is formed of resin, for example. The holding member 620 includes a bottom surface part 621 and two side surface parts 622. The bottom surface part 621 has a substantially rectangular shape extending in the longitudinal direction as viewed in a plan view. A couplant opening 623 extending in the longitudinal direction is formed in a center portion of the bottom surface part 621 in the width direction.

A plurality of positioning projections 624 which project upward are formed on the bottom surface part 621. Out of the plurality of positioning projections 624, half of the positioning projections 624 are arranged on one end portion of the bottom surface part 621 in the width direction such that these positioning projections 624 are arranged side by side in the longitudinal direction. Remaining half of the positioning projections 624 are arranged on the other end portion of the bottom surface part 621 in the width direction such that these positioning projections 624 are arranged side by side in the longitudinal direction. The plurality of positioning projections 624 respectively correspond to the plurality of positioning openings 614 formed in the acoustic couplant 610.

Two side surface parts 622 are formed in an upwardly extending manner from both end portions of the bottom surface part 621 in the width direction, respectively. A plurality of hook-shaped latching portions 625 are formed on an inner surface of each side surface part 622. The plurality of latching portions 625 formed on two side surface parts 622 respectively correspond to a plurality of latching portions 529 formed on the lower casing part 520 (see FIG. 18).

The plurality of positioning projections 624 formed on the bottom surface part 621 are respectively fitted in the positioning openings 614 formed in the bottom surface part 611 from below. Further, the bottom surface part 611 is fitted in the couplant opening 623 formed in the bottom surface part 621 from above. With such a configuration, the acoustic couplant 610 is fixed to the holding member 620 thus completing the joining part 600. In this state, the plurality of latching portions 625 formed on two side surface parts 622 and the plurality of latching portions 529 formed on the lower casing part 520 (see FIG. 18) are joined to each other, respectively. Accordingly, the joining part 600 is mounted on the casing part 500.

With such a configuration, the acoustic couplant 610 is held on the lower casing part 520 by the holding member 620. An upper surface of the bottom surface part 611 of the acoustic couplant 610 is brought into close contact with a pipe joining surface 530C of the path member 530 (FIG. 16). A lower surface of the bottom surface part 611 of the acoustic couplant 610 projects more downward than a lower surface of the bottom surface part 621 of the holding member 620. The operator can handle the acoustic couplant 610 together with the casing part 500 and hence, handling of the flow switch 1 is enhanced. Further, efficiency of a mounting operation of the flow switch 1 can be enhanced.

(3) Ultrasonic Wave Control Mechanism

The ultrasonic wave control mechanism 700 is housed inside the casing part 500. As shown in FIG. 16, the ultrasonic wave control mechanism 700 includes two ultrasonic wave elements 710, 720, the ultrasonic wave shield plate 730, and two filling members 740, 750. Two ultrasonic wave elements 710, 720 each have a planar shape.

The ultrasonic wave control mechanism 700 also includes the acoustic bonding agent 711 which corresponds to the ultrasonic wave element 710 (FIG. 2), an element-rear-side acoustic wave blocking member 712 and an element fixing member 713. The ultrasonic wave control mechanism 700 further includes the acoustic bonding agent 721 which corresponds to the ultrasonic wave element 720 (FIG. 2), an element-rear-side acoustic wave blocking member 722 and an element fixing member 723. In this embodiment, the acoustic bonding agents 711, 721 are made of grease in which minute fillers are dispersed. The element-rear-side acoustic wave blocking members 712, 722 are made of foamed rubber. The element-rear-side acoustic wave blocking members 712, 722 may be made of a porous material, for example.

One surface of the ultrasonic wave element 710 is bonded to an element joining surface 530A of the path member 530 by the acoustic bonding agent 711 (FIG. 16). The element-rear-side acoustic wave blocking member 712 is mounted on the other surface of the ultrasonic wave element 710. The ultrasonic wave element 710 is fixed to the path member 530 by the element fixing member 713 in such a state. The element fixing member 713 is disposed such that the element fixing member 713 does not block a boundary between one surface of the ultrasonic wave element 710 and the element joining surface 530A.

In the same manner, one surface of the ultrasonic wave element 720 is bonded to an element joining surface 530B of the path member 530 by the acoustic bonding agent 721 (FIG. 16). The element-rear-side acoustic wave blocking member 722 is mounted on the other surface of the ultrasonic wave element 720. The ultrasonic wave element 720 is fixed to the path member 530 by the element fixing member 723 in such a state. The element fixing member 723 is disposed such that the element fixing member 723 does not block a boundary between one surface of the ultrasonic wave element 720 and the element joining surface 530B.

With such a configuration, the ultrasonic wave elements 710, 720 are respectively fixed to the path member 530 by the element fixing members 713, 723. In this case, the ultrasonic wave elements 710, 720 do not require an adhesive agent for fixing the ultrasonic wave elements 710, 720 to the path member 530. That is, an adhesive agent is not disposed between one surface of the ultrasonic wave element 710 and the element joining surface 530A and between one surface of the ultrasonic wave element 720 and the element joining surface 530B. Accordingly, a loss of an ultrasonic wave is prevented. As a result, transmission efficiency and reception efficiency of an ultrasonic wave by the ultrasonic wave elements 710, 720 can be enhanced.

Further, an ultrasonic wave can be efficiently picked up from one surface of the ultrasonic wave element 710 by the acoustic bonding agent 711, and the ultrasonic wave is transmitted in the path member 530 from the element joining surface 530A. In the same manner, an ultrasonic wave can be efficiently picked up from one surface of the ultrasonic wave element 720 by the acoustic bonding agent 721, and the ultrasonic wave is transmitted in the path member 530 from the element joining surface 530B.

As described above, the acoustic bonding agents 711, 721 are formed such that minute fillers are dispersed in grease. In this case, acoustic impedance of the acoustic bonding agent 711, 721 has a value close to acoustic impedance of the element joining surface 530A, 530B of the path member 530. With such a configuration, the reflection of an ultrasonic wave between the ultrasonic wave element 710 and the element joining surface 530A is reduced and, at the same time, the reflection of an ultrasonic wave between the ultrasonic wave element 720 and the element joining surface 530B is reduced. As a result, transmission efficiency and reception efficiency of an ultrasonic wave by the ultrasonic wave elements 710, 720 can be enhanced. The acoustic bonding agents 711, 721 may be configured such that minute fillers are dispersed in an adhesive agent.

Further, the element-rear-side acoustic wave blocking members 712, 722 are mounted on the other surface of the ultrasonic wave element 710 and the other surface of the ultrasonic wave element 720, respectively. In this case, ultrasonic waves picked up from the other surface of the ultrasonic wave element 710 and the other surface of the ultrasonic wave element 720 are blocked. Accordingly, a loss of ultrasonic waves generated by the ultrasonic wave elements 710, 720 can be reduced and hence, intensities of ultrasonic waves picked up from one surface of the ultrasonic wave element 710 and one surface of the ultrasonic wave element 720 can be increased.

The ultrasonic wave shield plate 730 is formed of a material similar to a material for forming the element-rear-side acoustic wave blocking members 712, 722. As described above, the ultrasonic wave shield plate 730 is fitted in the shield plate opening 535 formed in the path member 530. In this case, the transmission of an ultrasonic wave between the ultrasonic wave elements 710, 720 in the path member 530 is shielded. Accordingly, it is possible to prevent the occurrence of a phenomenon that an ultrasonic wave transmitted from the ultrasonic wave element 710 passes through the inside of the path member 530, and is directly received by the ultrasonic wave element 720. In the same manner, it is possible to prevent the occurrence of a phenomenon that an ultrasonic wave transmitted from the ultrasonic wave element 720 passes through the inside of the path member 530, and is directly received by the ultrasonic wave element 710.

The filling member 740 has a characteristic impedance of a value close to characteristic impedance of the path member 530, and is formed of a material having a significant characteristic of attenuating (dispersing) an ultrasonic wave. For example, the filling member 740 is formed of a material into which a plurality of members having different characteristic impedance values are dispersed. In this embodiment, the filling member 740 is formed of silicon in which aluminum oxide is dispersed as a filling material.

The filling member 740 is arranged so as to partially cover the peripheries of the ultrasonic wave elements 710, 720. In this case, an ultrasonic wave which is transmitted to the surrounding from the ultrasonic wave elements 710, 720 without propagating in a fluid which flows in the pipe 2 is attenuated by the filling member 740. Accordingly, it is possible to prevent the occurrence of a phenomenon that an ultrasonic wave transmitted to the surrounding from the ultrasonic wave element 710 is received by the ultrasonic wave element 720 as a stray signal. In the same manner, it is possible to prevent the occurrence of a phenomenon that an ultrasonic wave transmitted to the surrounding from the ultrasonic wave element 720 is received by the ultrasonic wave element 710 as a stray signal.

The filling member 750 is formed of a heat insulating material. The filling member 750 is arranged above the filling member 740 and below a control board 810 of the electronic circuit part 800, to be described later. With such an arrangement, even when a fluid of low temperature flows in the pipe 2, heat (cold heat) radiated to the control board 810 from the pipe 2 is blocked by the filling member 750. Accordingly, it is possible to protect the control board 810 from dew condensation. Further, it is not necessary to fill the control board 810 with resin or the like to prevent the dew condensation and hence, the sensor part 400 can be easily assembled or disassembled.

According to the above-mentioned configuration, an ultrasonic wave transmitted from the ultrasonic wave element 710 is inputted to the element joining surface 530A, passes through the inside of the path member 530 and outputted from the pipe joining surface 530C. The ultrasonic wave outputted from the pipe joining surface 530C is incident on a fluid in the pipe 2 through the acoustic couplant 610, is reflected on an inner surface of the pipe 2 and, thereafter, is inputted to the pipe joining surface 530C through the acoustic couplant 610 again. The ultrasonic wave inputted to the pipe joining surface 530C passes through the inside of the path member 530 and outputted from the element joining surface 530B, and is received by the ultrasonic wave element 720.

In the same manner, an ultrasonic wave transmitted from the ultrasonic wave element 720 is inputted to the element joining surface 530B, passes through the inside of the path member 530 and outputted from the pipe joining surface 530C. The ultrasonic wave outputted from the pipe joining surface 530C is incident on a fluid in the pipe 2 through the acoustic couplant 610, is reflected on an inner surface of the pipe 2 and, thereafter, is inputted to the pipe joining surface 530C through the acoustic couplant 610 again. The ultrasonic wave inputted to the pipe joining surface 530C passes through the inside of the path member 530 and outputted from the element joining surface 530A, and is received by the ultrasonic wave element 710.

(4) Electronic Circuit Part

As shown in FIGS. 16 and 17, the electronic circuit part 800 includes the control board 810, a display board 820, the connecting part 830, the operating part 840 and a display lamp 850. The control part 811 includes a CPU (central processing unit), for example. The storage part 812 includes a volatile memory or a hard disk, for example. The control part 811 and the storage part 812 are mounted on the control board 810. The display part 821 includes a segment display, for example. The display part 821 may include a dot matrix display. The display part 821 is mounted on the display board 820.

The control board 810 is arranged above the ultrasonic wave elements 710, 720 so as to be close to the ultrasonic wave elements 710, 720. With such a configuration, it is possible to make connecting lines which connect the ultrasonic wave elements 710, 720 and the control board 810 shortest. With such a configuration, it is possible to suppress noises radiated from the ultrasonic wave elements 710, 720.

The operating part 840 includes a plurality of operating buttons. The display lamp 850 includes a plurality of light emitting elements. Each light emitting element is formed of an LED (light emitting diode), for example. The operating part 840 and the display lamp 850 are connected to the display board 820, and the display board 820 is connected to the control board 810. The control board 810 is connected to an external device (not shown) through the connecting part 830 and the cable 3.

The control board 810, the display board 820 and the ultrasonic wave elements 710, 720 acquire electric power from a power source of an external device through the cable 3. In this case, the casing part 500 is not required to have a power source for supplying electric power to the control board 810, the display board 820 and the ultrasonic wave elements 710, 720. With such a configuration, the flow switch 1 can be miniaturized.

The display board 820 is arranged at a position close to the window part 511 of the upper casing part 510. With such a configuration, a user can view the display part 821 from the window part 511 of the upper casing part 510. The display part 821 can display various information such as a speed $V_f$ of a fluid calculated by the equation (1), a flow rate $Q$ calculated by the equation (2) or a threshold value stored in the memory of the control part 811.

The display lamp 850 is turned on such that an ON state and an OFF state of an external device can be distinguished. For example, the display lamp 850 may be turned on when an external device is in an ON state, and may be turned off when the external device is in an OFF state. Alternatively, the display lamp 850 may be turned off when an external device is in an ON state, and may be turned on when the external device is in an OFF state. With such a configuration, a user can easily distinguish an ON state and an OFF state of the external device.

In this embodiment, the display lamp 850 includes a light emitting element which emits green light and a light emitting element which emits red light. The display lamp 850 is turned on with green light when an external device is in an ON state, and the display lamp 850 is turned on with red light when the external device is in an OFF state. Alternatively, the display lamp 850 may be turned on with red light when an external device is in an ON state, and the display lamp 850 may be turned on with green light when the external device is in an OFF state.

[4] Mounting of Flow Switch (1) Mounting of Clamp Part on Pipe

Figure 21:
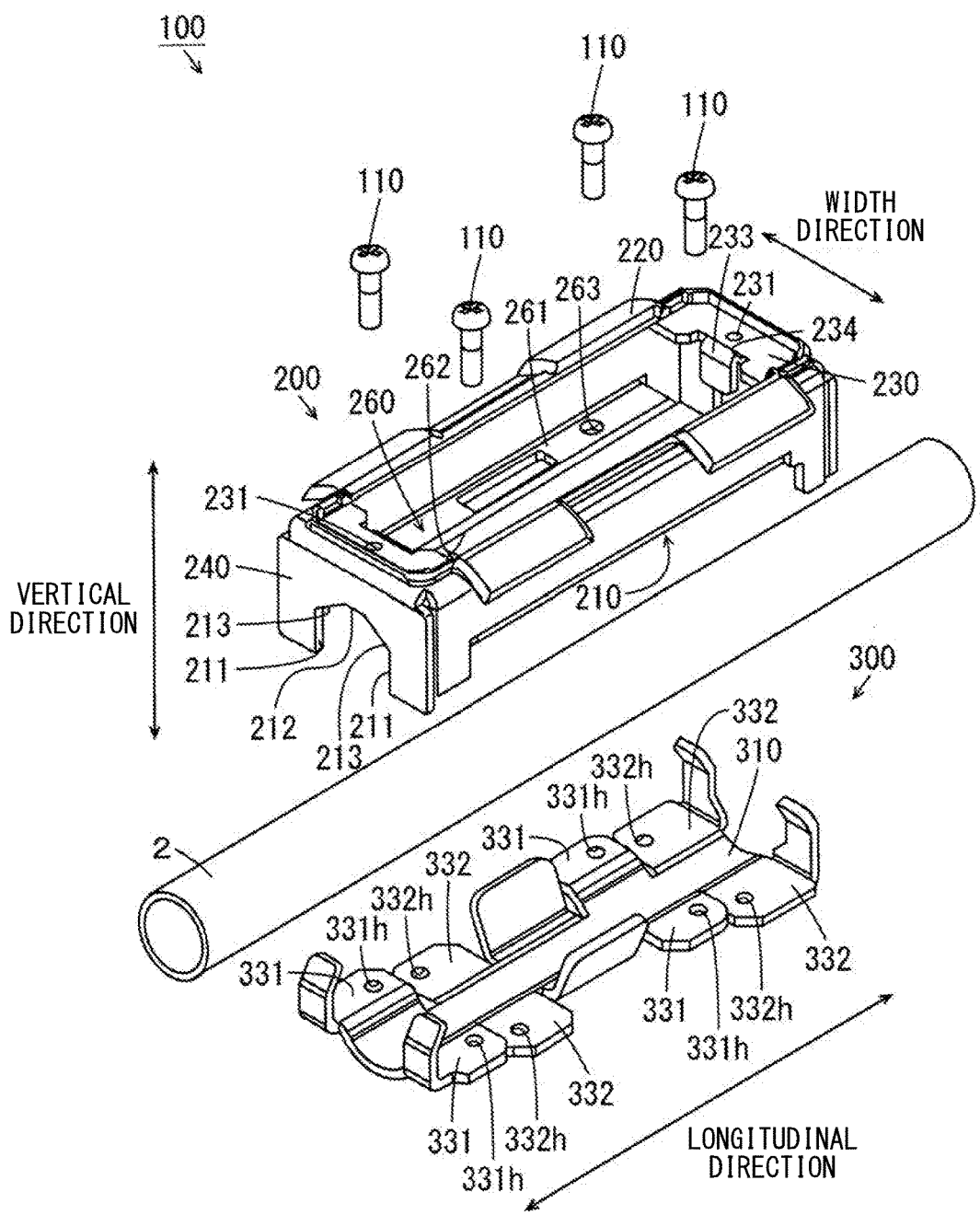
FIG. 21 is an exploded perspective view of a clamp part before the clamp part is mounted on a pipe.
Figure 22:
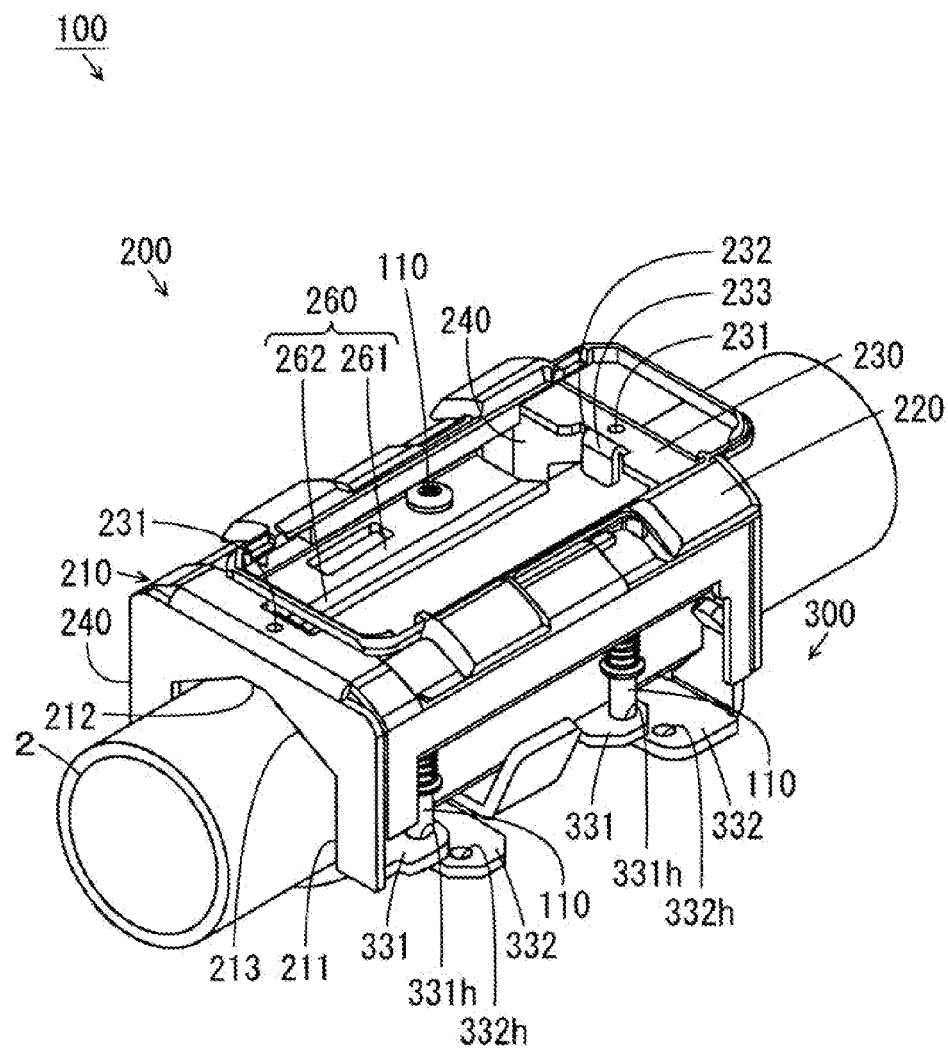
FIG. 22 is a perspective view of the clamp part after the clamp part is mounted on the pipe.
Figure 23A:
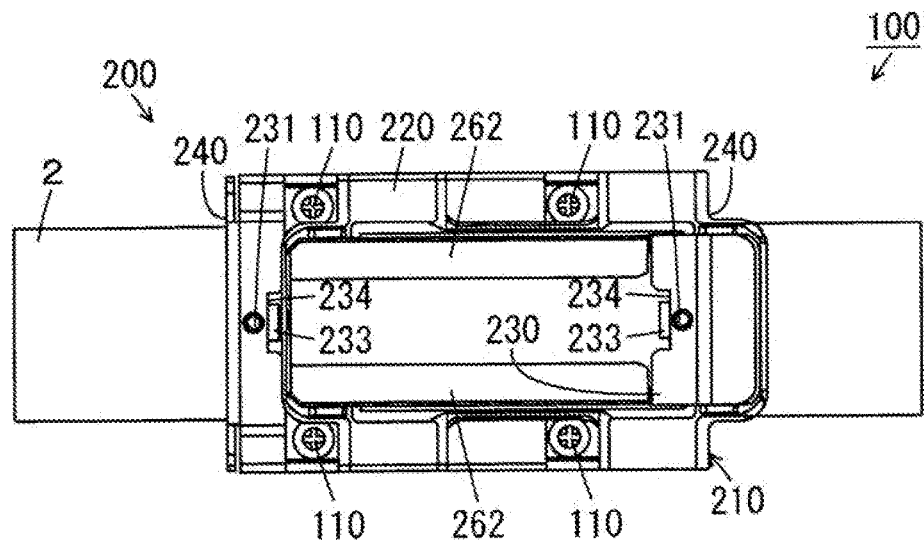
FIGS. 23A and 23B are a plan view and a side view of the clamp part shown in FIG. 22.
Figure 23B:
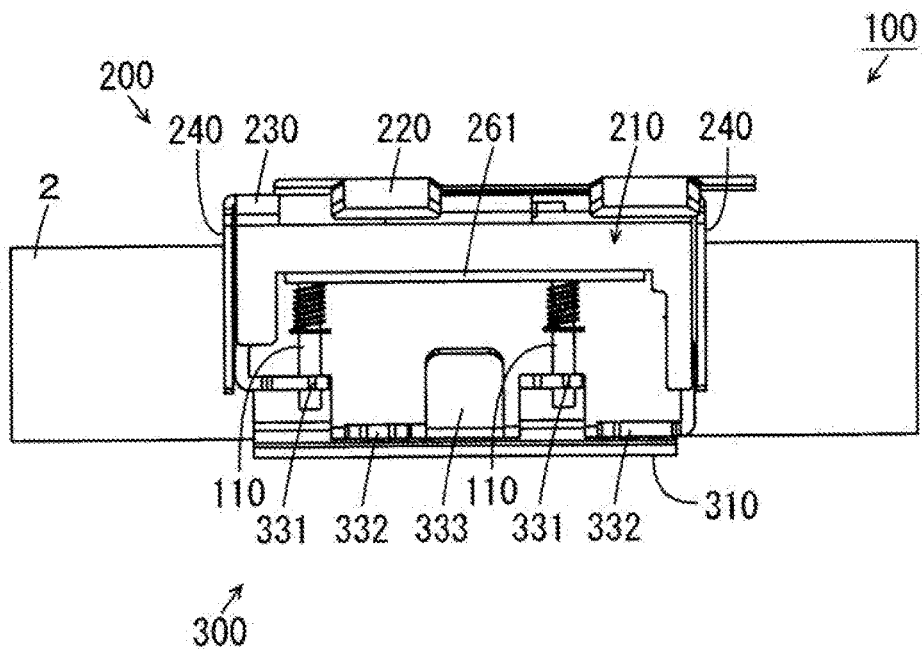

FIG. 21 is an exploded perspective view of the clamp part 100 before the clamp part 100 is mounted on the pipe 2. FIG. 22 is a perspective view of the clamp part 100 after the clamp part 100 is mounted on the pipe 2. FIGS. 23A and 23B are a plan view and a side view of the clamp part 100 shown in FIG. 22. Hereinafter, mounting of the clamp part 100 on the pipe 2 will be described with reference to FIGS. 21 to 23B. In the example shown in FIGS. 21 to 23B, a lower clamp member 300 is arranged in the first direction.

Firstly, as shown in FIGS. 22, 23A and 23B, the movable part 220 of the upper clamp member 200 is slid to the first position. In this case, as shown in FIG. 23A, a plurality of clamp fixing screws 110 can be viewed from above. Accordingly, the plurality of clamp fixing screws 110 can be operated from above. In this embodiment, the plurality of clamp fixing screws 110 are rotatably fixed in a state where the clamp fixing screws 110 are passed through a plurality of through holes 263 (FIG. 21).

Next, as shown in FIG. 21, the upper clamp member 200 and the lower clamp member 300 are arranged so as to face each other in the vertical direction with the pipe 2 sandwiched therebetween. As described above, lower surfaces of the inclined parts 262 of the contact part 260 of the upper clamp member 200 project slightly inwardly and downwardly than inclined cut surfaces 213 of the end surface part 240. Accordingly, an outer peripheral surface of an upper portion of the pipe 2 is brought into contact with the lower surfaces of the inclined parts 262 of the contact part 260 of the upper clamp member 200. An outer peripheral surface of a lower portion of the pipe 2 is brought into contact with upper surfaces of the bottom surface part 310 of the lower clamp member 300.

In this state, a plurality of clamp fixing screws 110 are operated from above by a tool such as a screwdriver. Accordingly, the plurality of clamp fixing screws 110 are respectively threadedly engaged with the threaded holes 331h formed in a plurality of projecting pieces 331 of the lower clamp member 300. When the lower clamp member 300 is arranged in the second direction, a plurality of clamp fixing screws 110 are respectively threadedly engaged with the threaded holes 332h formed in a plurality of projecting pieces 332 of the lower clamp member 300.

By making the plurality of clamp fixing screws 110 respectively threadedly engage with the plurality of threaded holes 331h, a pressure between the lower surfaces of the inclined parts 262 of the contact part 260 and the outer peripheral surface of the pipe 2 is increased. In this case, the inclined parts 262 of the contact part 260 are deformed such that the inclined parts 262 are bent toward a more outer and upper side than an initial position. Accordingly, the outer peripheral surface of the upper portion of the pipe 2 is brought into contact with the inclined cut surfaces 213 of the end surface part 240 of the upper clamp member 200. Further, the outer peripheral surface of the lower portion of the pipe 2 is brought into contact with the upper surface of the bottom surface part 310 of the lower clamp member 300.

With such a configuration, in a cross section perpendicular to the pipe 2, the pipe 2 is brought into contact with at least two portions of the upper clamp member 200 and, at the same time, is brought into contact with at least one portion of the lower clamp member 300. That is, in a cross section perpendicular to the pipe 2, the pipe 2 is brought into contact with at least three portions of the clamp part 100. Accordingly, the clamp part 100 is reliably fixed to the pipe 2.

Further, as described above, a length of the horizontal cut surface 212 in the width direction is smaller than an outer diameter of the pipe 2, and a distance between two vertical cut surfaces 211 in the width direction is larger than the outer diameter of the pipe 2. With such a configuration, within a range where the outer diameter of the pipe 2 is equal to or greater than a length of the horizontal cut surface 212 in the width direction and is equal to or less than the distance between two vertical cut surfaces 211 in the width direction, it is possible to mount the clamp part 100 on the pipe 2 having various diameters.

(2) Mounting of Sensor Part on Clamp Part

Figure 24:
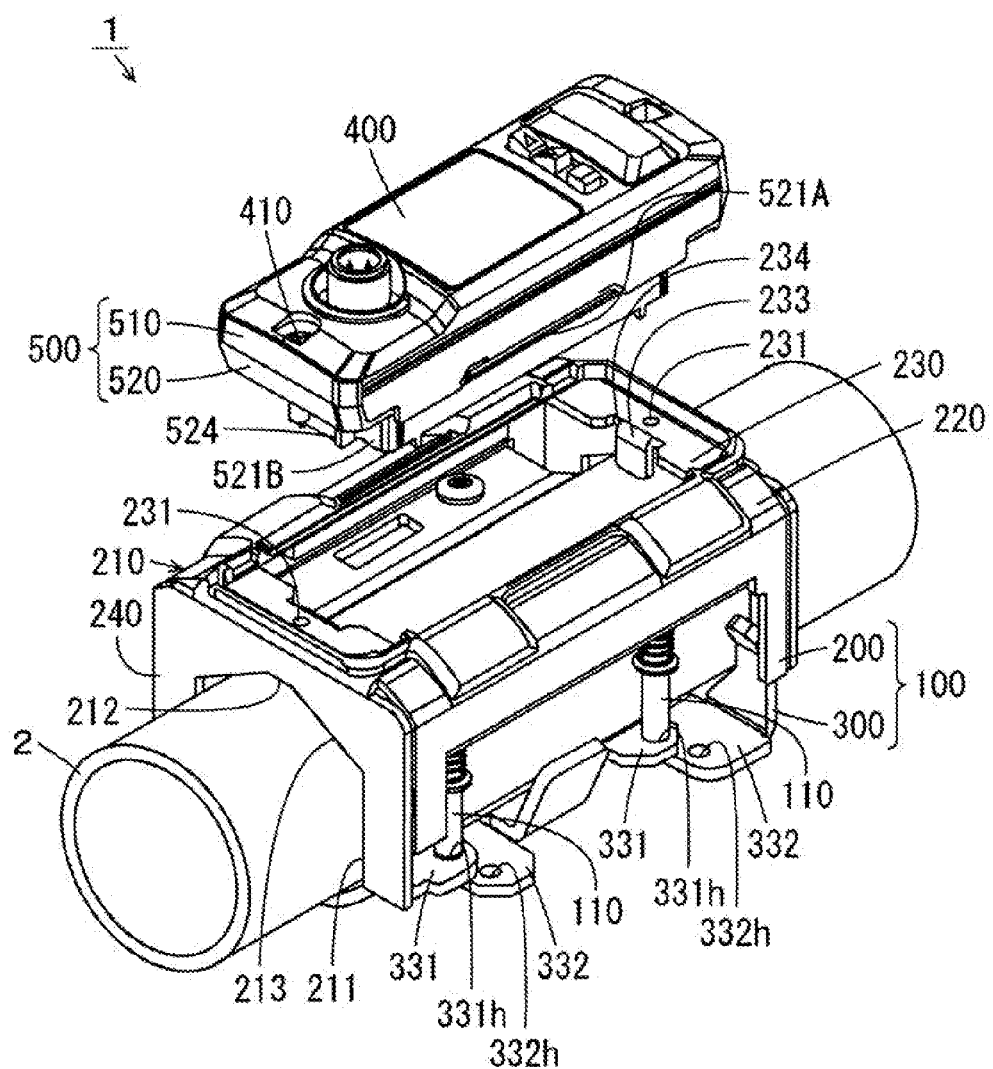
FIG. 24 is a perspective view of the clamp part before the sensor part is mounted on the clamp part.
Figure 25A:
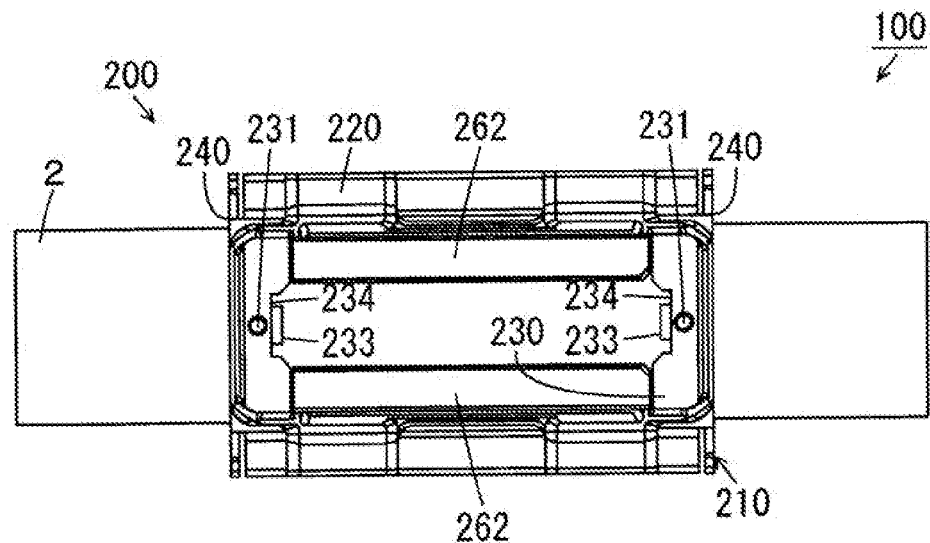
FIGS. 25A and 25B are a plan view and a side view of the clamp part shown in FIG. 24.
Figure 25B:
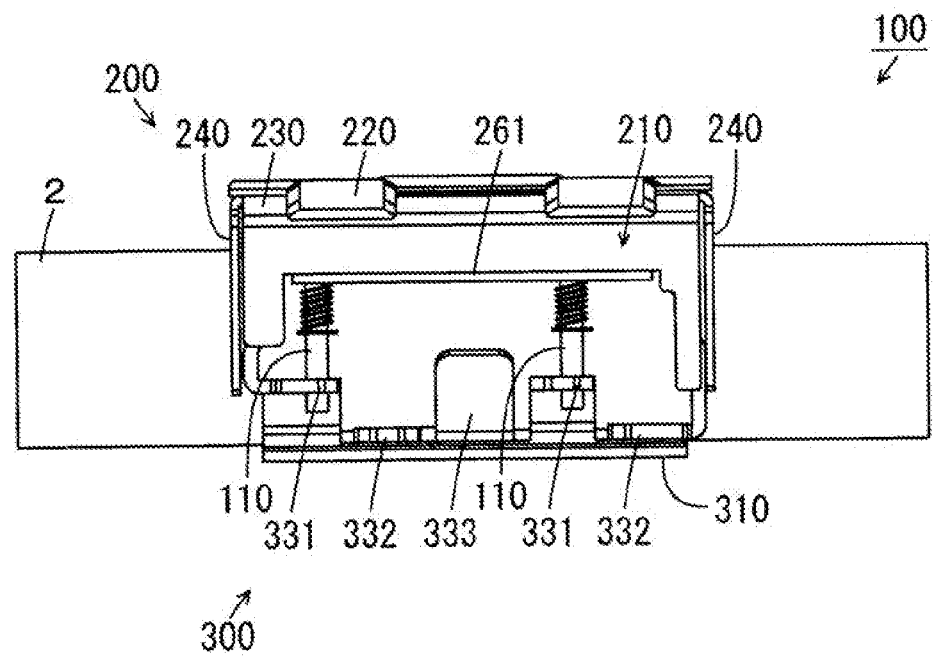

FIG. 24 is a perspective view of the clamp part 100 before the sensor part 400 is mounted on the clamp part 100. FIGS. 25A and 25B are a plan view and a side view of the clamp part 100 shown in FIG. 24. Hereinafter, mounting of the sensor part 400 on the clamp part 100 will be described with reference to FIGS. 24 to 25B.

After the clamp part 100 is mounted on the pipe 2, as shown in FIGS. 24, 25A and 25B, the movable part 220 is returned to the second position. Accordingly, the sensor part 400 can be mounted on the clamp part 100. The sensor part 400 is mounted on the clamp part 100 by making two sensor fixing screws 410 threadedly engage with two threaded holes 231 formed in the clamp part 100.

As described above, in this embodiment, in a state where the sensor part 400 is mounted on the clamp part 100, the clamp part 100 cannot be mounted on the pipe 2. Accordingly, the sensor part 400 is mounted on the clamp part 100 after the clamp part 100 is mounted on the pipe 2. Accordingly, steps of fixing the sensor part 400 with an appropriate fixing force can be reliably performed.

Two sensor fixing screws 410 are arranged with the ultrasonic wave elements 710, 720 sandwiched therebetween in the longitudinal direction. Accordingly, a fixing force is applied to the sensor part 400 in the radial direction toward the center of the pipe 2 without causing the sensor part 400 to be inclined with respect to the pipe 2. With such a configuration, the operator can perform an operation of mounting the sensor part 400 without being conscious of the adjustment of the inclination of the sensor part 400 with respect to the pipe 2.

The outer peripheral surface of the fitting part 521 of the lower casing part 520 of the casing part 500 is fitted on the inner peripheral surfaces of both end portions of the upper surface part 230 in the width direction. In this case, as described above, the respective fitting side surface parts 521A of the fitting part 521 are fitted on the inner peripheral surfaces of the upper surface part 230 in the width direction. Further, two recesses 234 are formed on the inner peripheral surface of each end portion of the upper surface part 230 in the longitudinal direction such that the two recesses 234 sandwich the projecting part 233 therebetween. On the respective fitting end surface parts 521B of the lower casing part 520 of the casing part 500, there are formed protrusions 524 which are respectively fitted in two recesses 234 formed on the inner peripheral surface of the upper surface part 230.

In this case, with the provision of the fitting part 521, the sensor part 400 can be displaced only in the radial direction of the pipe 2 without causing the sensor part 400 to be displaced in the axial direction of the pipe 2 and in the circumferential direction of the pipe 2 on the clamp part 100. By mounting the sensor part 400 on the clamp part 100 in this manner, the displacement of the sensor part 400 in the longitudinal direction and in the width direction is restricted. On the other hand, the displacement of the sensor part 400 in the vertical direction is allowed.

Figure 26A:
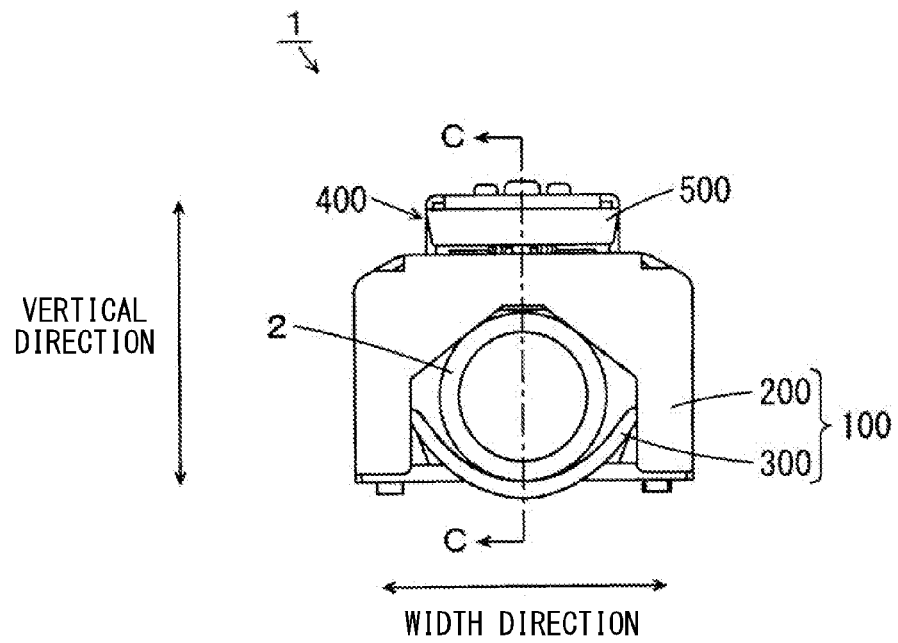
FIGS. 26A and 26B are an end face view and a cross-sectional view of a flow switch.
Figure 26B:
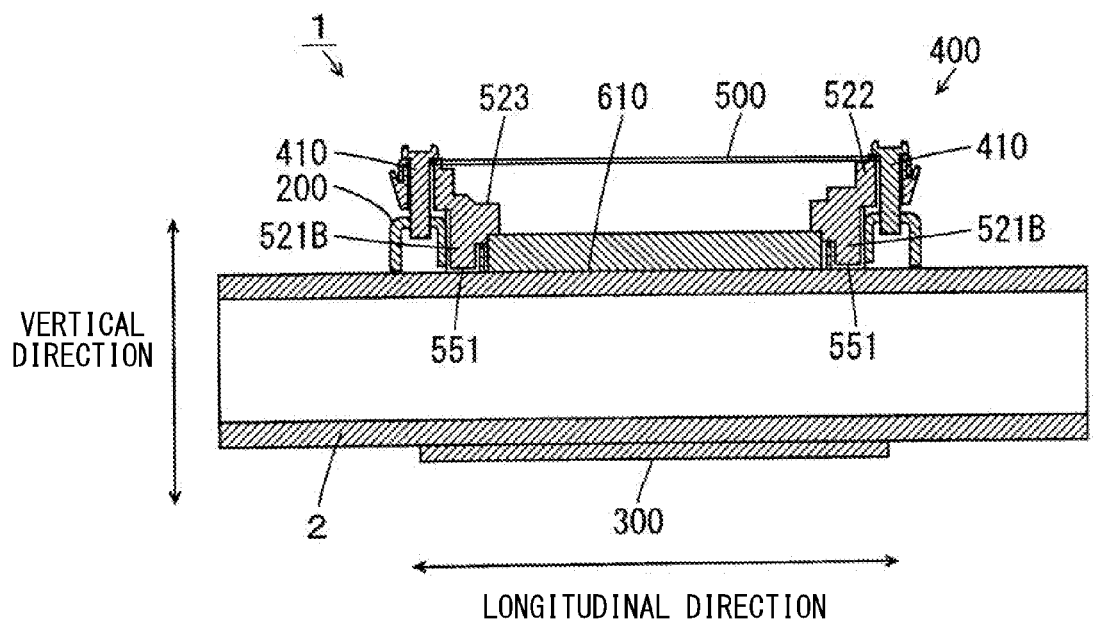
Figure 27A:
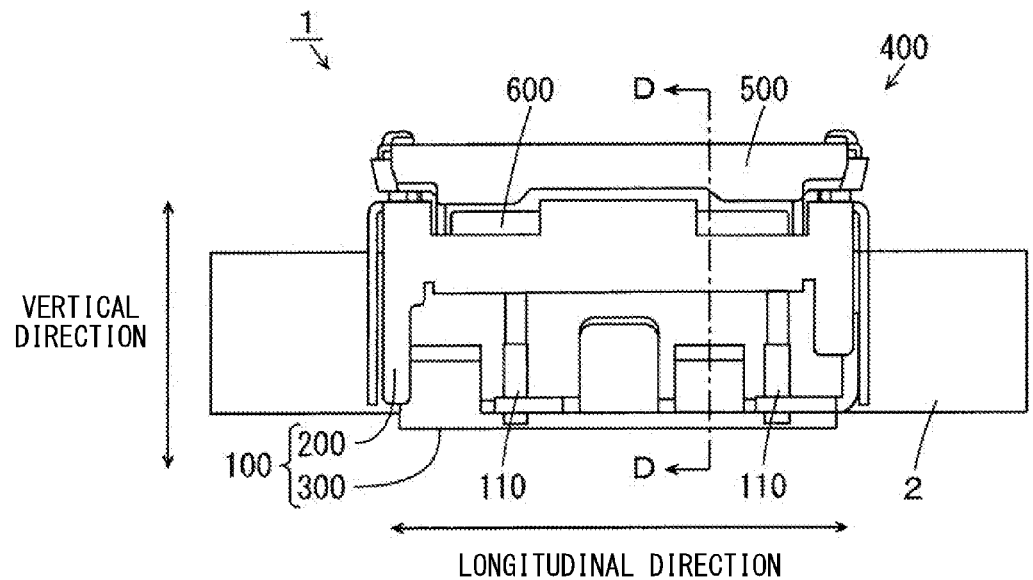
FIGS. 27A and 27B are a side view and a cross-sectional view of the flow switch.
Figure 27B:
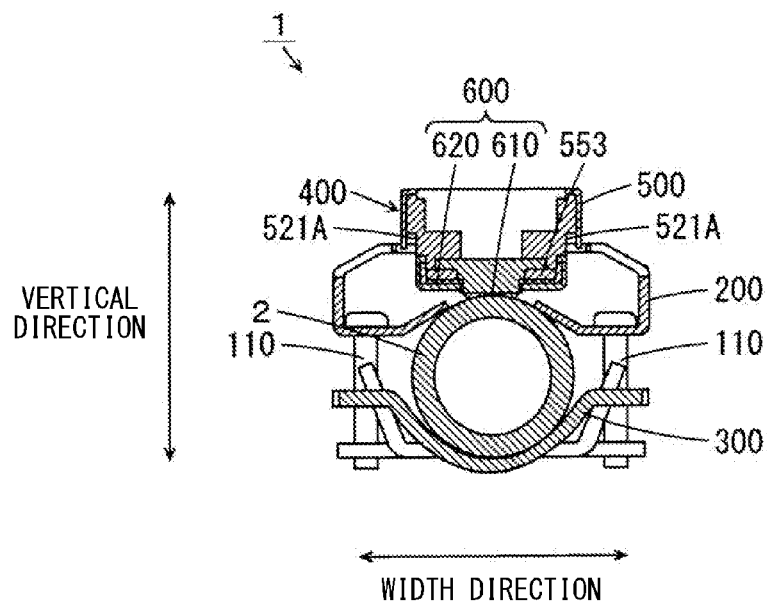

FIGS. 26A and 26B are an end face view and a cross-sectional view of the flow switch 1. FIGS. 27A and 27B are a side view and a cross-sectional view of the flow switch 1. FIG. 26B is a cross-sectional view of the flow switch 1 taken along line C-C in FIG. 26A, and FIG. 27B is a cross-sectional view of the flow switch 1 taken along line D-D in FIG. 27A.

By fastening the sensor fixing screws 410 shown in FIG. 26B, the sensor part 400 moves downward, that is, in the direction in which the sensor part 400 approaches the pipe 2. In this case, the acoustic couplant 610 shown in FIGS. 26B and 27B is collapsed by the casing part 500.

As described above, in this embodiment, a lower end surface of the fitting end surface part 521B projects more downward than a lower end surface of the fitting side surface parts 521A. Accordingly, a lower end surface of the fitting end surface part 521B (pipe contact surface reinforcing metal plate 551) is brought into contact with the pipe 2. Accordingly, the downward movement of the sensor part 400 is stopped and, at the same time, the collapse of the acoustic couplant 610 by the casing part 500 is stopped. In this manner, the fitting end surface part 521B has a function of restricting a collapse amount of the acoustic couplant 610. The fitting end surface part 521B restricts the collapse amount of the acoustic couplant 610 at a portion where the collapse amount of the acoustic couplant 610 is the largest.

In this embodiment, the collapse amount of the acoustic couplant 610 is restricted to a value which falls within a range of 10% or more to 50% or less of a thickness of the acoustic couplant 610 in a state where the acoustic couplant 610 is not collapsed. In this case, the pipe joining surface 530C of the path member 530 (FIG. 16) and the pipe 2 are brought into close contact with each other with a sufficient pressure. With such a configuration, an ultrasonic wave can be efficiently incident on a fluid in the pipe 2. On the other hand, it is possible to suppress application of an excessive pressure to the acoustic couplant 610. Accordingly, it is possible to prevent the acoustic couplant 610 from being damaged.

(3) Direction of Lower Clamp Member

Figure 28A:
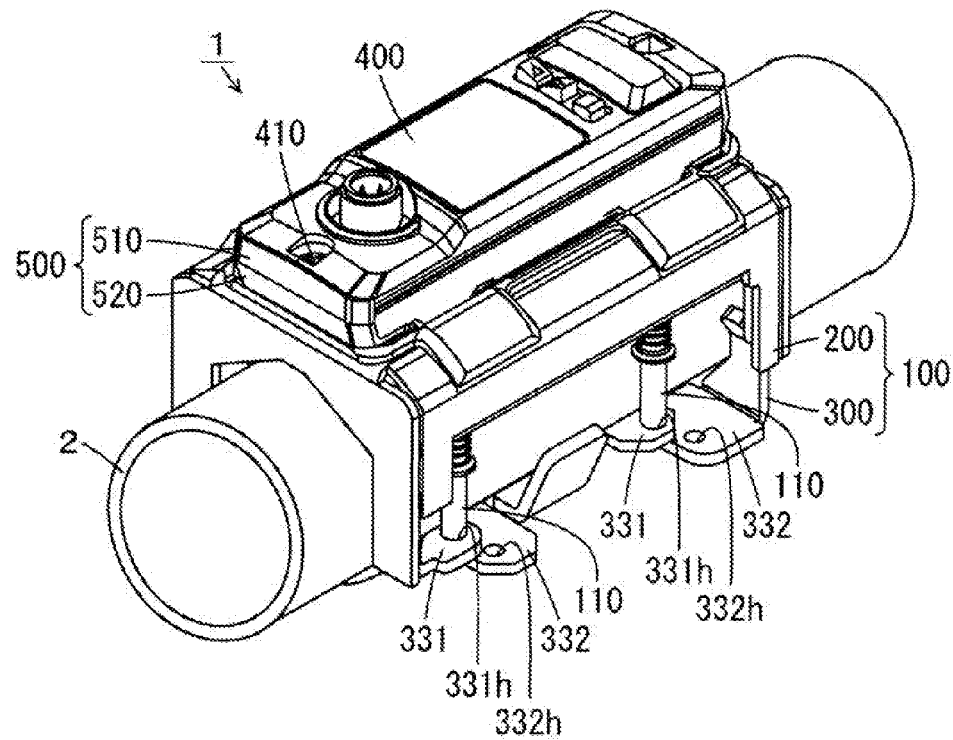
FIGS. 28A and 28B are a perspective view and a side view of the flow switch in a state where the lower clamp member is arranged in the first direction.
Figure 28B:
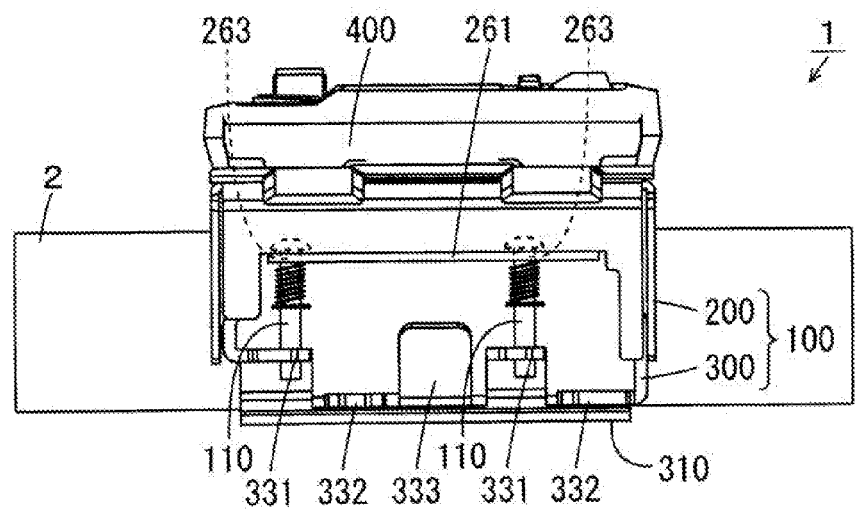
Figure 29A:
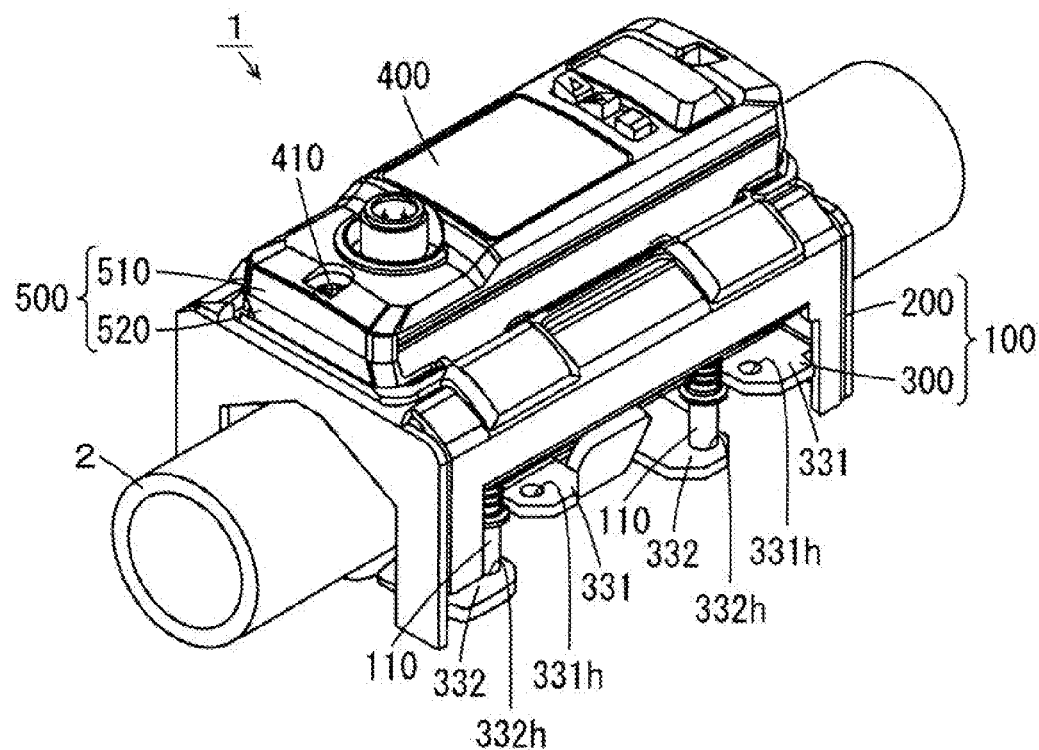
FIGS. 29A and 29B are a perspective view and a side view of the flow switch in a state where the lower clamp member is arranged in the second direction.
Figure 29B:
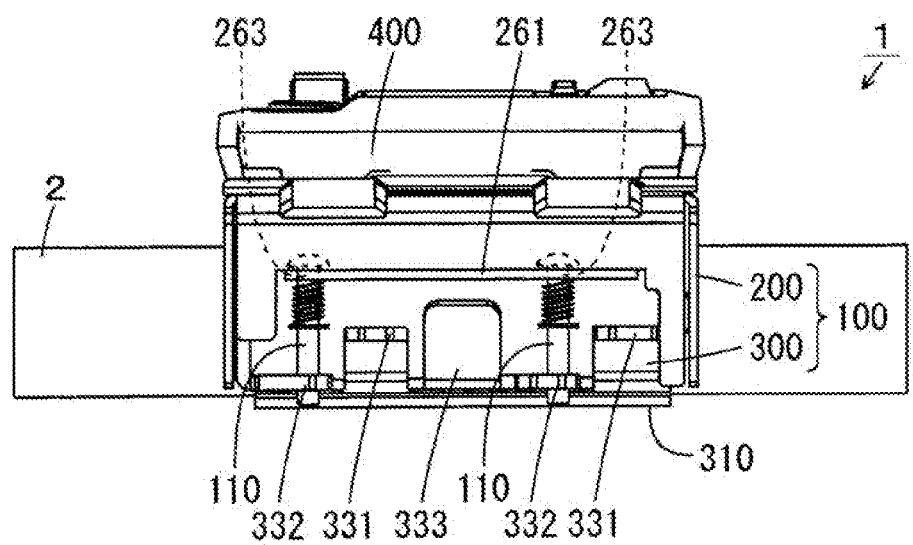

In the above-mentioned mounting of the clamp part 100 on the pipe 2, the lower clamp member 300 is arranged in the first direction. However, the lower clamp member 300 may be arranged in the second direction. FIGS. 28A and 28B are a perspective view and a side view of the flow switch 1 in a state where the lower clamp member 300 is arranged in the first direction. FIGS. 29A and 29B are a perspective view and a side view of the flow switch 1 in a state where the lower clamp member 300 is arranged in the second direction.

As shown in FIG. 28A, when the lower clamp member 300 is arranged in the first direction, a plurality of clamp fixing screws 110 respectively threadedly engage with the threaded holes 331h formed in a plurality of projecting pieces 331. On the other hand, as shown in FIG. 29A, when the lower clamp member 300 is arranged in the second direction, a plurality of clamp fixing screws 110 respectively threadedly engage with the threaded holes 332h formed in a plurality of projecting pieces 332.

The projecting pieces 331 are positioned above the projecting pieces 332. That is, a distance in the vertical direction from the through hole 263 formed in the horizontal part 261 to the threaded hole 332h formed in the projecting piece 332 is larger than a distance in the vertical direction from the through hole 263 formed in the horizontal part 261 to the threaded hole 331h formed in the projecting piece 331.

When the lower clamp member 300 is arranged in the second direction in the case where an outer diameter of the pipe 2 is relatively large, a distance in the vertical direction from the through hole 263 to the threaded hole 332h may become larger than a length of the clamp fixing screw 110. In this case, the clamp part 100 cannot be mounted on the pipe 2. Accordingly, as shown in FIG. 28B, in the case where the outer diameter of the pipe 2 is relatively large, the lower clamp member 300 is arranged in the first direction. By adopting such an arrangement, the clamp part 100 can be properly mounted on the pipe 2.

On the other hand, when the lower clamp member 300 is arranged in the first direction in the case where an outer diameter of the pipe 2 is relatively small, a distance in the vertical direction from the through hole 263 to the threaded hole 331h may become excessively smaller than a length of the clamp fixing screw 110. In this case, an operation amount (the number of times of fastening) of the clamp fixing screws 110 for fixing the clamp part 100 to the pipe 2 is increased and hence, the operator's burden is increased. Accordingly, as shown in FIG. 29B, in the case where the outer diameter of the pipe 2 is relatively small, the lower clamp member 300 is arranged in the second direction. By adopting such an arrangement, the clamp part 100 can be mounted on the pipe 2 with a small burden.

[5] Modification (1) Method of Mounting Acoustic Couplant

In this embodiment, the acoustic couplant 610 is held by the holding member 620, and the plurality of latching portions 625 of the holding member 620 and the plurality of latching portions 529 of the lower casing parts 520 are joined to each other. The acoustic couplant 610 is mounted on the casing part 500 by this method. However, the present invention is not limited to this method, and the acoustic couplant 610 may be mounted on the casing part 500 by other methods.

Figure 30A:
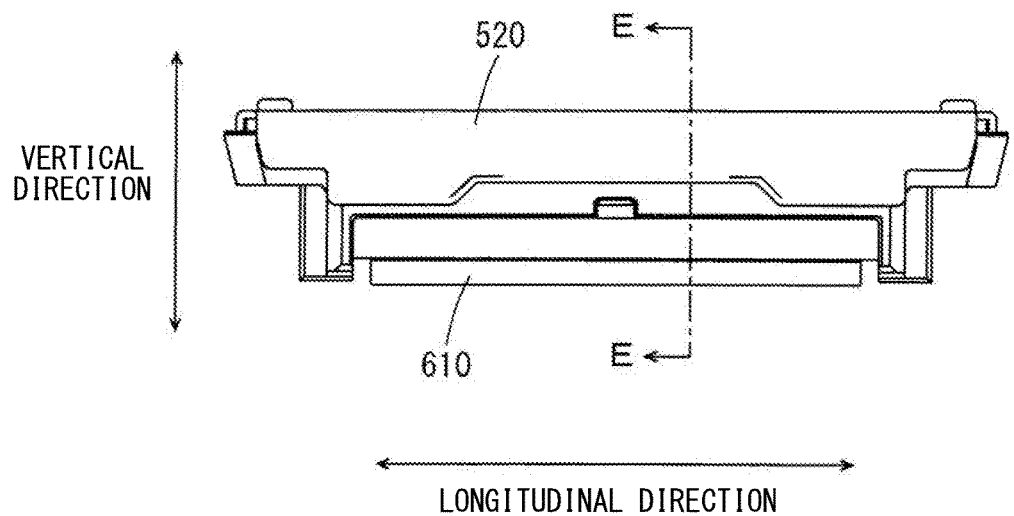
FIGS. 30A and 30B are a side view and a cross-sectional view of a sensor part according to a first modification of a method of mounting an acoustic couplant.
Figure 30B:
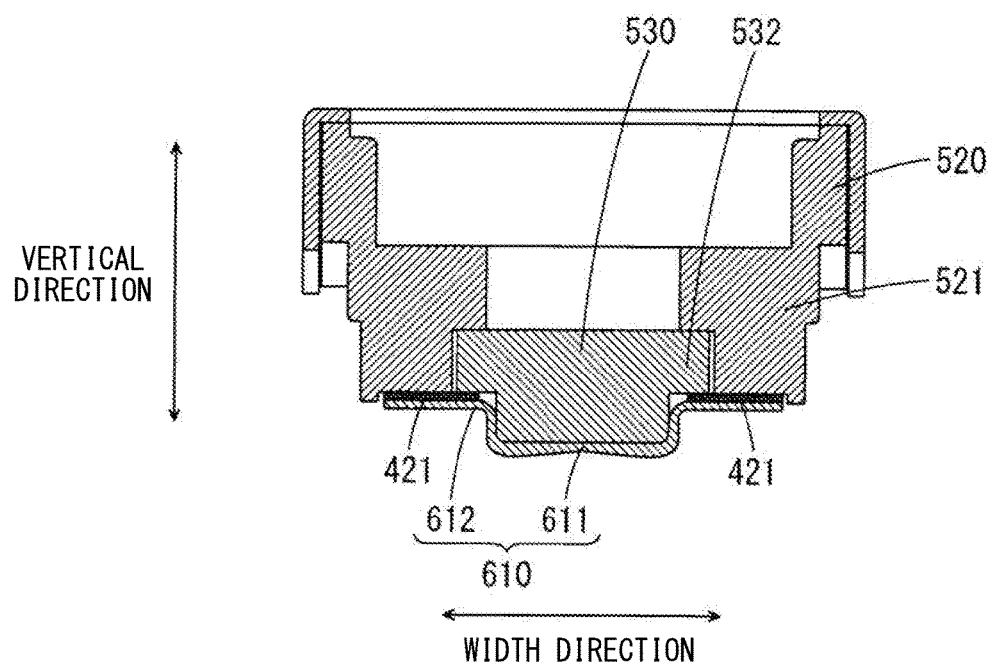

FIGS. 30A and 30B are a side view and a cross-sectional view of the lower casing part 520 according to a first modification of the method of mounting the acoustic couplant 610. FIG. 30B is a cross-sectional view of the sensor part 400 taken along line E-E in FIG. 30A. In the example shown in FIGS. 30A and 30B, an upper surface of the bottom surface part 611 of the acoustic couplant 610 is adhered to a lower surface of a fitting part 521 of the lower casing part 520 and a lower surface of the outer flange part 532 of the path member 530 by an adhesive member 421. With such a configuration, the acoustic couplant 610 is mounted on the casing part 500. In this modification, the acoustic couplant 610 can be integrally formed with the casing part 500 with a simple configuration.

Figure 31A:
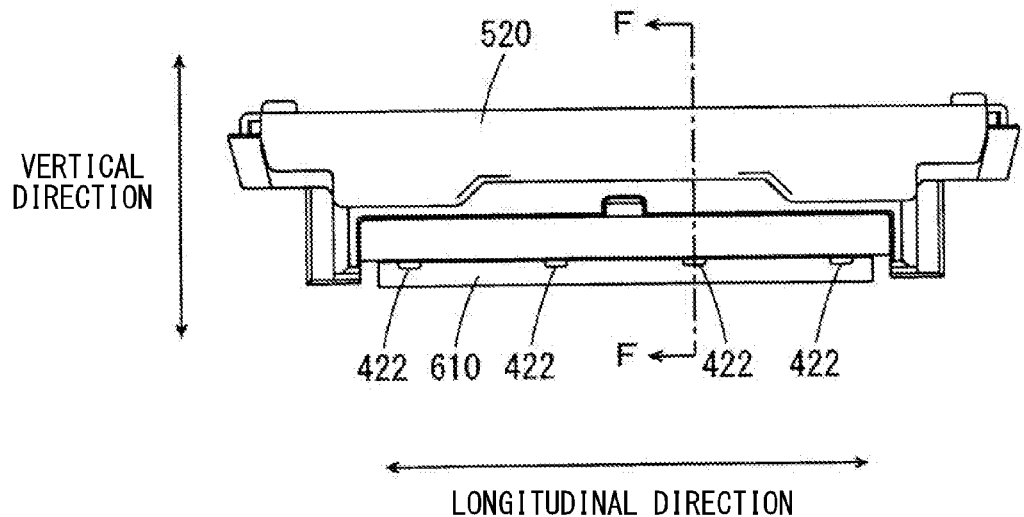
FIGS. 31A and 31B are a side view and a cross-sectional view of a sensor part according to a second modification of the method of mounting an acoustic couplant.
Figure 31B:
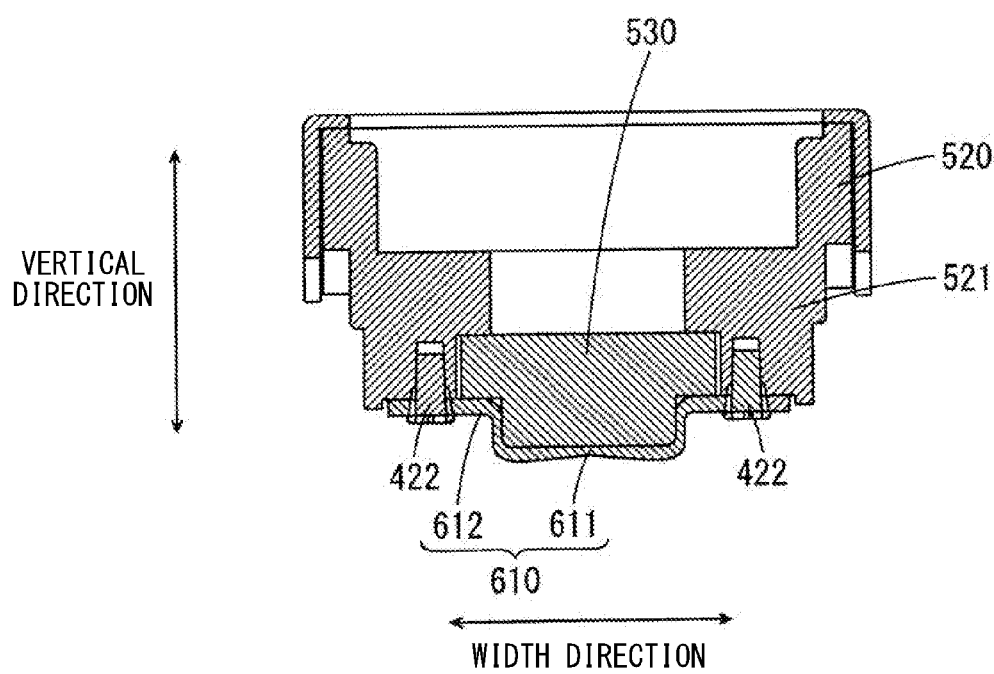

FIGS. 31A and 31B are a side view and a cross-sectional view of the lower casing part 520 according to a second modification of the method of mounting an acoustic couplant 610. FIG. 31B is a cross-sectional view of the sensor part 400 taken along line F-F in FIG. 31A. In the example shown in FIGS. 31A and 31B, an upper surface of the bottom surface part 611 of the acoustic couplant 610 is fixed to the lower surface of the fitting part 521 of the lower casing part 520 by a plurality of screw members 422. With such a configuration, the acoustic couplant 610 is mounted on the casing part 500.

Figure 32A:
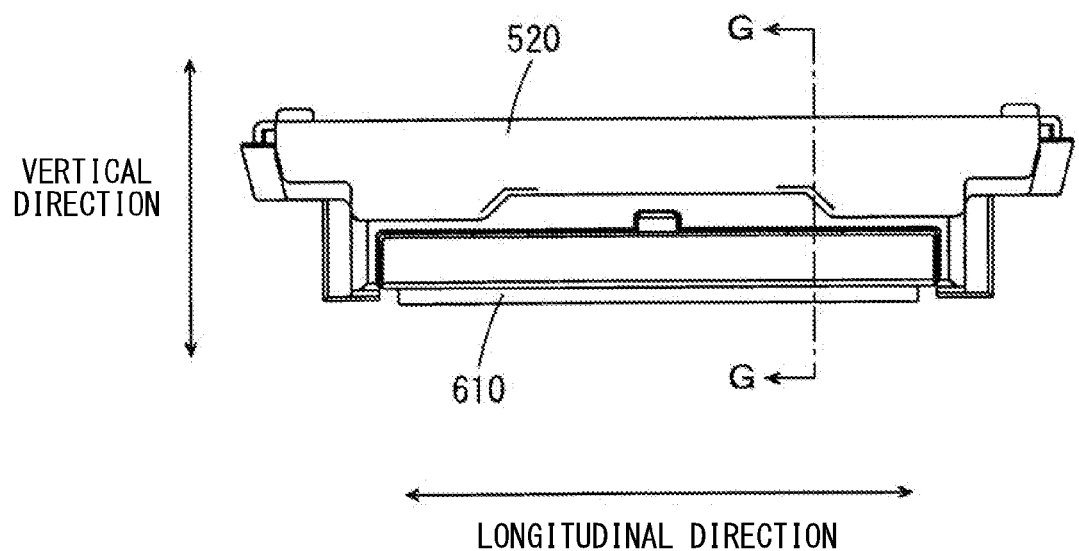
FIGS. 32A and 32B are a side view and a cross-sectional view of a lower casing part according to a third modification of the method of mounting an acoustic couplant.
Figure 32B:
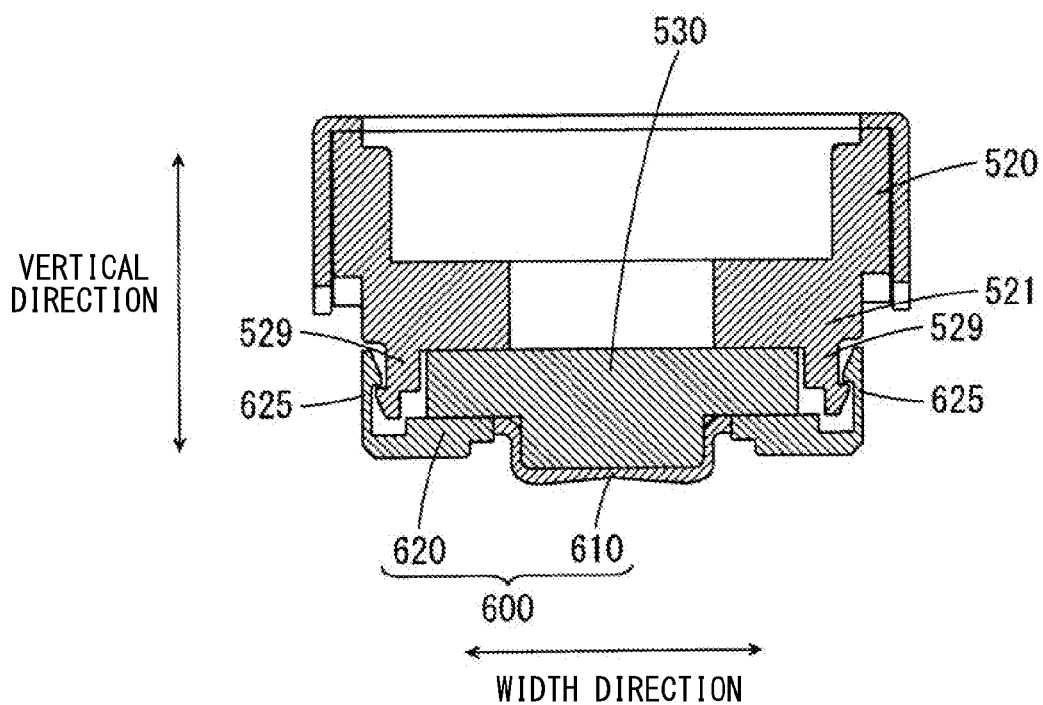

FIGS. 32A and 32B are a side view and a cross-sectional view of the lower casing part 520 according to a third modification of the method of mounting the acoustic couplant 610. FIG. 32B is a cross-sectional view of the sensor part 400 taken along line G-G in FIG. 32A. In the example shown in FIGS. 32A and 32B, the acoustic couplant 610 and the holding member 620 are integrally formed. In this state, a plurality of latching portions 625 of the holding member 620 and a plurality of latching portions 529 of the lower casing part 520 are respectively joined to each other. With such a configuration, the acoustic couplant 610 is mounted on the casing part 500.

In the examples shown in FIGS. 30A, 30B, 31A and 31B, the joining part 600 is not provided with the holding member 620. In the example shown in FIGS. 30A and 30B or in the example shown in FIGS. 31A and 31B, in place of using the adhesive member 421 or the plurality of screw members 422, the acoustic couplant 610 may be mounted on the casing part 500 by integrally forming the acoustic couplant 610 and the lower casing part 520. In the example shown in FIGS. 32A and 32B, in place of using the plurality of latching portions 625, the acoustic couplant 610 may be mounted on the casing part 500 using an adhesive member or a plurality of screw members.

(2) Method of Restricting Collapsing Amount

In this embodiment, the fitting end surface part 521B functions as a collapsing amount restricting part of the acoustic couplant 610. In this method, a collapsing amount of the acoustic couplant 610 is restricted due to contact of a lower end surface of the fitting end surface part 521B with the pipe 2. However, the present invention is not limited to such a method. A collapsing amount of the acoustic couplant 610 may be restricted by other methods.

Figure 33A:
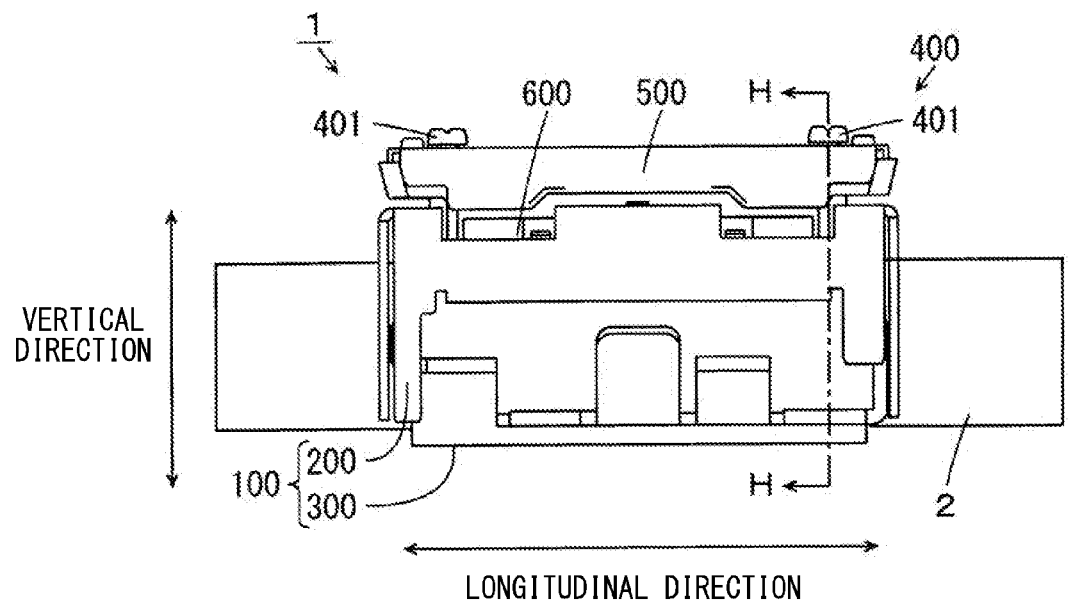
FIGS. 33A and 33B are a side view and a cross-sectional view of a flow switch according to a first modification of a method of restricting a collapsing amount of an acoustic couplant.
Figure 33B:
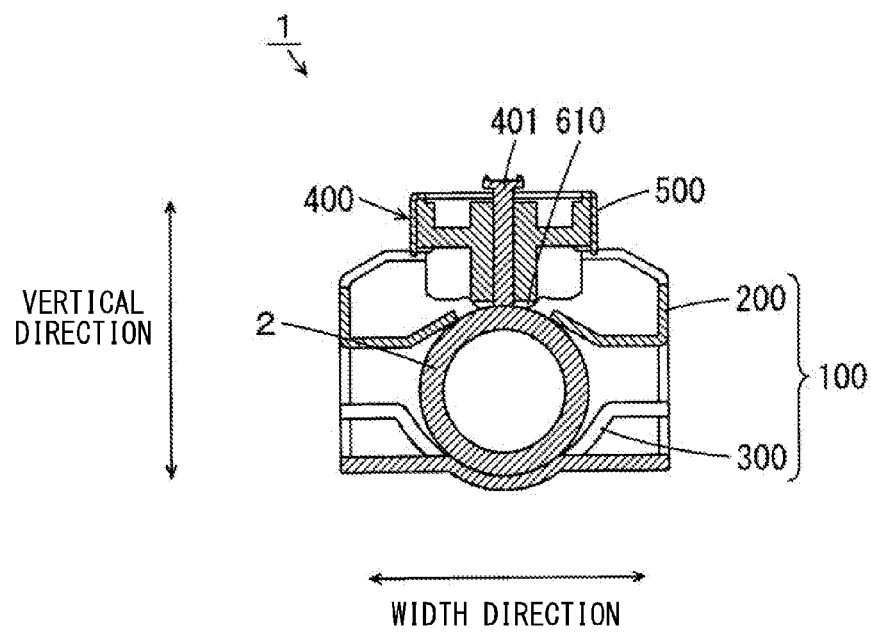

FIGS. 33A and 33B are a side view and a cross-sectional view of the flow switch 1 according to a first modification of the method of restricting a collapsing amount of the acoustic couplant 610. FIG. 33B is a cross-sectional view of the flow switch 1 taken along line H-H in FIG. 33A. In the example shown in FIGS. 33A and 33B, collapsing amount restricting screws 401 are mounted on both end portions of the casing part 500 in the longitudinal direction such that the collapsing amount restricting screws 401 penetrate the casing part 500 in the vertical direction. Each collapsing amount restricting screw 401 is arranged at a substantially center portion of the casing part 500 in the width direction.

A distal end of each collapsing amount restricting screw 401 projects downward from the lower surface of the casing part 500. By operating each collapsing amount restricting screw 401 from above by a tool such as a screwdriver, projecting amounts of the distal ends of the collapsing amount restricting screws 401 from the lower surface of the casing part 500 can be adjusted.

When the flow switch 1 is mounted on the pipe 2, the acoustic couplant 610 is collapsed by the lower surface of the casing part 500. In this state, the distal ends of the collapsing amount restricting screws 401 are brought into contact with the pipe 2. Accordingly, the downward movement of the sensor part 400 above the clamp part 100 is stopped and, at the same time, the collapse of the acoustic couplant 610 by the casing part 500 is also stopped. A collapsing amount of the acoustic couplant 610 is restricted in this manner.

Figure 34A:
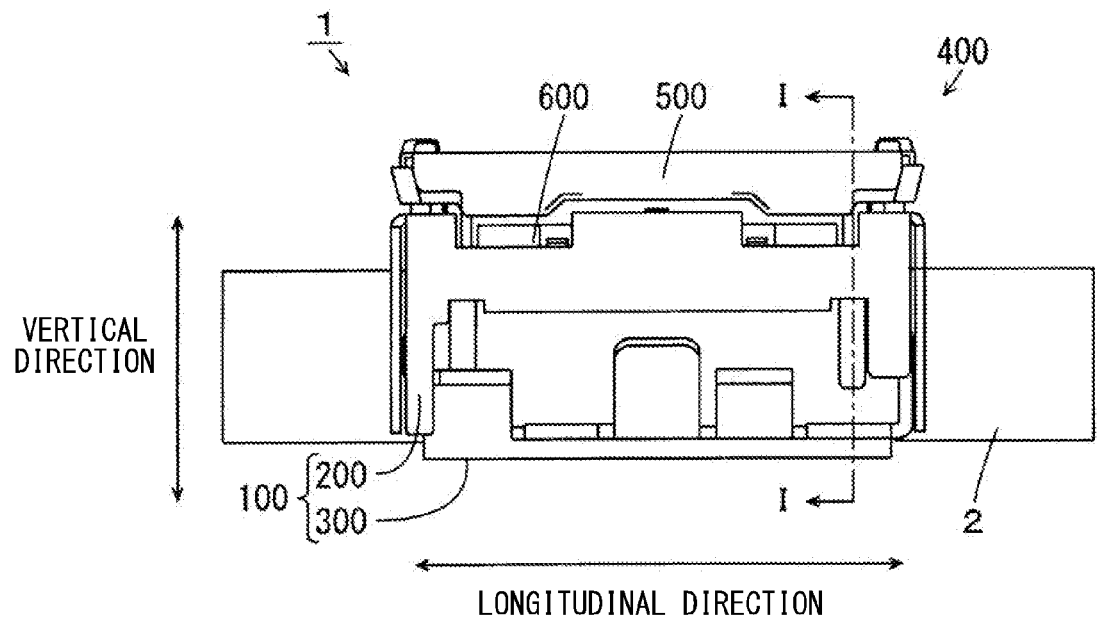
FIGS. 34A and 34B are a side view and a cross-sectional view of a flow switch according to a second modification of the method of restricting a collapsing amount of an acoustic couplant.
Figure 34B:
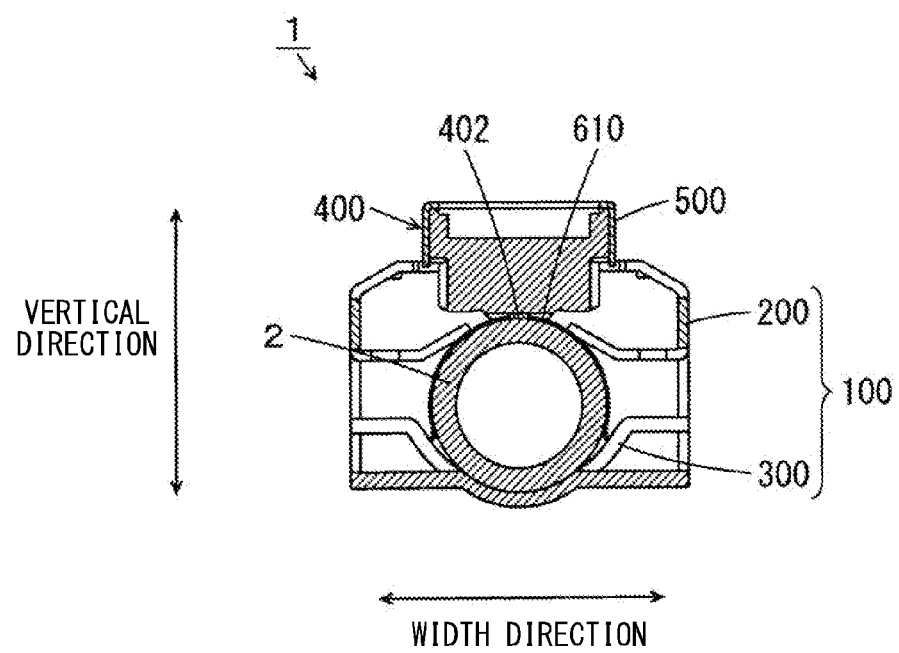

FIGS. 34A and 34B are a side view and a cross-sectional view of the flow switch 1 according to a second modification of the method of restricting a collapsing amount of the acoustic couplant 610. FIG. 34B is a cross-sectional view of the flow switch 1 taken along line I-I in FIG. 34A. In the example shown in FIGS. 34A and 34B, plate-shaped collapsing amount restricting members 402 are arranged on an outer peripheral surface of the pipe 2 such that the collapsing amount restricting members 402 respectively correspond to lower surfaces of both end portions of the casing part 500 in the longitudinal direction. A thickness of each collapsing amount restricting member 402 in the vertical direction is set smaller than a thickness of the bottom surface part 611 of the acoustic couplant 610 (FIG. 20) in the vertical direction.

When the flow switch 1 is mounted on the pipe 2, the acoustic couplant 610 is collapsed by the lower surface of the casing part 500. In this state, lower surfaces of both end portions of the casing part 500 in the longitudinal direction are brought into contact with upper surfaces of the collapsing amount restricting members 402. Accordingly, the downward movement of the sensor part 400 above the clamp part 100 is stopped and, at the same time, the collapse of the acoustic couplant 610 by the casing part 500 is also stopped. A collapsing amount of the acoustic couplant 610 is restricted in this manner.

In this modification, the collapsing amount restricting members 402 may be arranged at desired positions between the casing part 500 and an outer surface of the pipe 2. Accordingly, the degree of freedom in the arrangement of the collapsing amount restricting members 402 is enhanced.

Figure 35A:
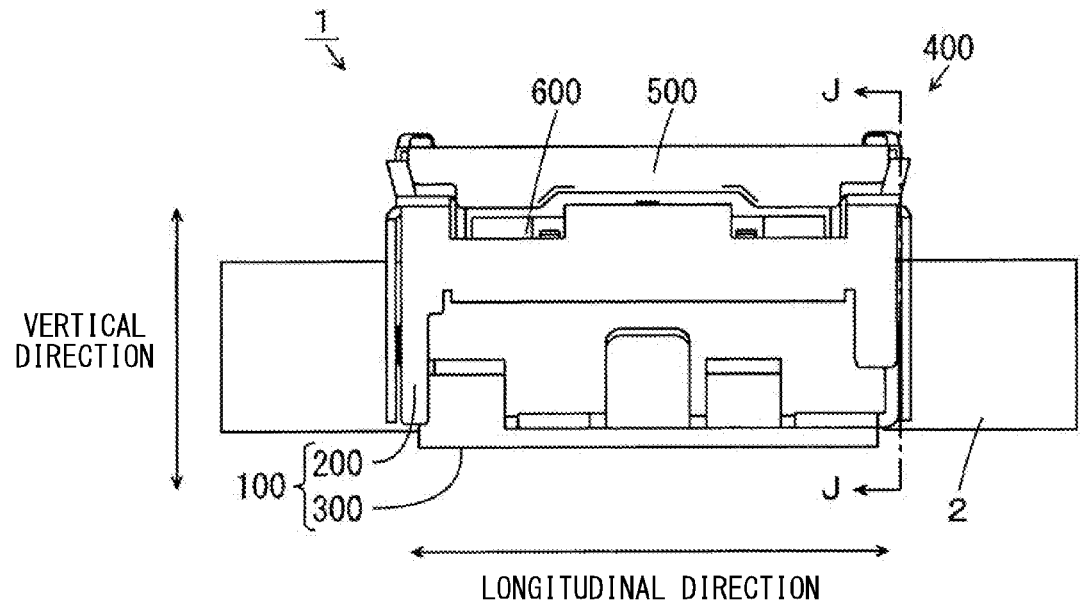
FIGS. 35A and 35B are a side view and a cross-sectional view of a flow switch according to a third modification of the method of restricting a collapsing amount of an acoustic couplant.
Figure 35B:
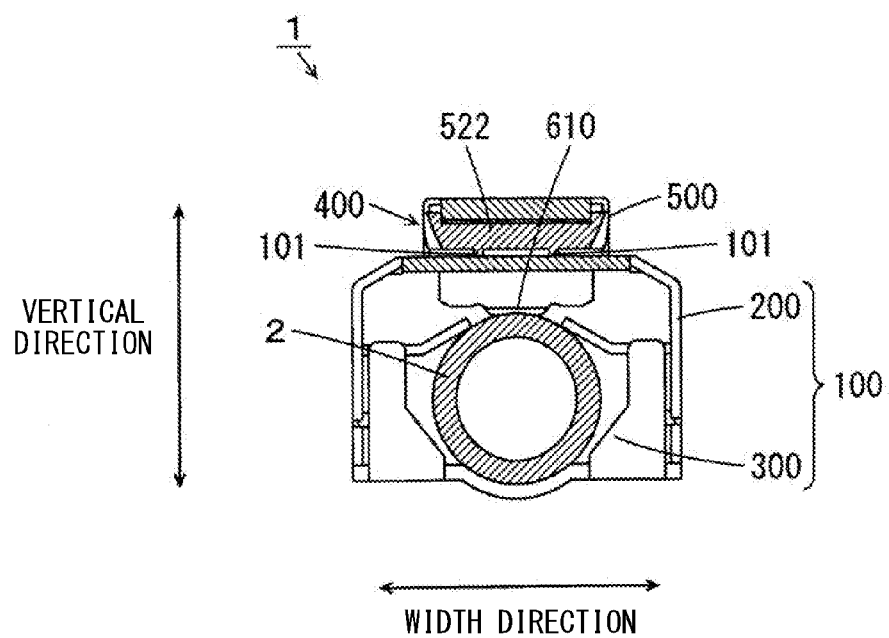

FIGS. 35A and 35B are a side view and a cross-sectional view of the flow switch 1 according to a third modification of the method of restricting a collapsing amount of the acoustic couplant 610. FIG. 35B is a cross-sectional view of the flow switch 1 taken along line J-J in FIG. 35A. In the example shown in FIGS. 35A and 35B, a plurality of (two in this modification) collapsing amount restricting projections 101 are formed on an upper surface of the upper clamp member 200 such that the collapsing amount restricting projections 101 respectively correspond to the lower surfaces of both end portions of the outer flange part 522 of the casing part 500 in the longitudinal direction.

Distal ends of the collapsing amount restricting projections 101 project upward from an upper surface of the clamp part 100. A projecting amount of the distal end of each collapsing amount restricting projection 101 from the upper surface of the clamp part 100 is set smaller than a thickness of the bottom surface part 611 of the acoustic couplant 610 (FIG. 20) in the vertical direction.

When the flow switch 1 is mounted on the pipe 2, the acoustic couplant 610 is collapsed by the lower surface of the casing part 500. In this state, the lower surfaces of both end portions of the outer flange part 522 of the casing part 500 in the longitudinal direction are brought into contact with the distal ends of the plurality of collapsing amount restricting projection 101. Accordingly, the downward movement of the sensor part 400 above the clamp part 100 is stopped and, at the same time, the collapse of the acoustic couplant 610 by the casing part 500 is also stopped. A collapsing amount of the acoustic couplant 610 is restricted in this manner.

In the third modification of the method of restricting a collapsing amount of the acoustic couplant 610, instead of forming the collapsing amount restricting projections 101 on the upper surface of the upper clamp member 200, the collapsing amount restricting projections 101 may be formed on the lower surface of the casing part 500 such that the collapsing amount restricting projections 101 are brought into contact with the upper clamp member 200. In this modification, the operator can handle the collapsing amount restricting projections 101 together with one of the casing part 500 and the clamp part 100 and hence, the handling of the flow switch 1 is enhanced. Further, operational efficiency in mounting the flow switch 1 is also enhanced.

Figure 36A:
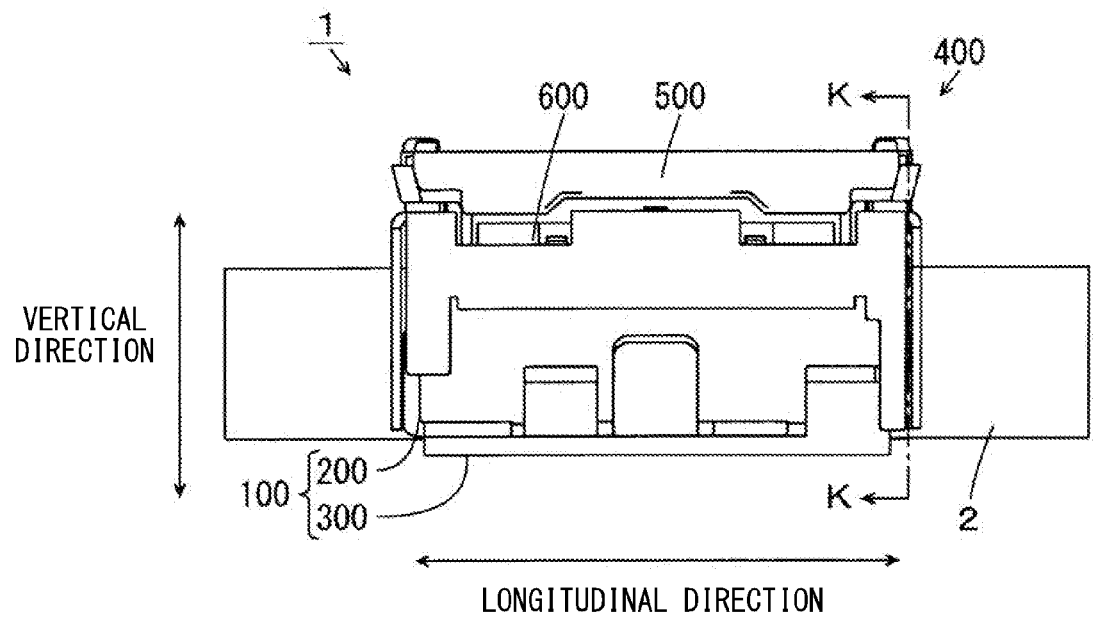
FIGS. 36A and 36B are a side view and a cross-sectional view of a flow switch according to a fourth modification of the method of restricting a collapsing amount of an acoustic couplant.
Figure 36B:
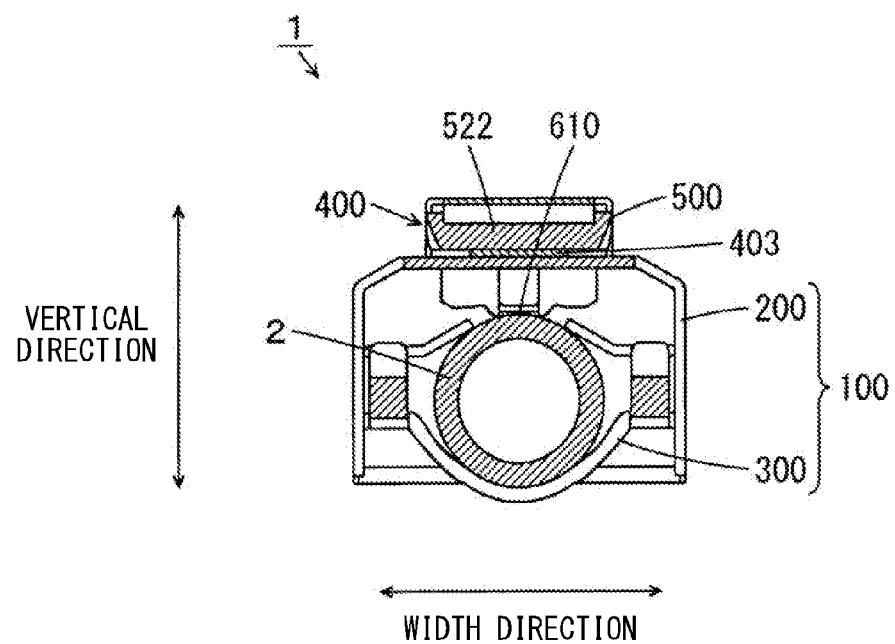

FIGS. 36A and 36B are a side view and a cross-sectional view of the flow switch 1 according to a fourth modification of the method of restricting a collapsing amount of the acoustic couplant 610. FIG. 36B is a cross-sectional view of the flow switch 1 taken along line K-K in FIG. 36A. In the example shown in FIGS. 36A and 36B, plate-shaped collapsing amount restricting members 403 are arranged on an upper surface of the upper clamp member 200 such that the collapsing amount restricting members 403 respectively correspond to lower surfaces of both end portions of the outer flange part 522 of the casing part 500 in the longitudinal direction. A thickness of each collapsing amount restricting member 403 in the vertical direction is set smaller than a thickness of the bottom surface part 611 of the acoustic couplant 610 (FIG. 20) in the vertical direction.

When the flow switch 1 is mounted on the pipe 2, the acoustic couplant 610 is collapsed by the lower surface of the casing part 500. In this state, the lower surfaces of both end portions of the outer flange part 522 of the casing part 500 in the longitudinal direction are brought into contact with upper surfaces of the collapsing amount restricting member 403. Accordingly, the downward movement of the sensor part 400 above the clamp part 100 is stopped and, at the same time, the collapse of the acoustic couplant 610 by the casing part 500 is also stopped. A collapsing amount of the acoustic couplant 610 is restricted in this manner.

In this modification, the collapsing amount restricting members 403 may be arranged at desired positions between the casing part 500 and the upper clamp member 200. Accordingly, the degree of freedom in the arrangement of the collapsing amount restricting members 403 is enhanced.

Figure 37A:
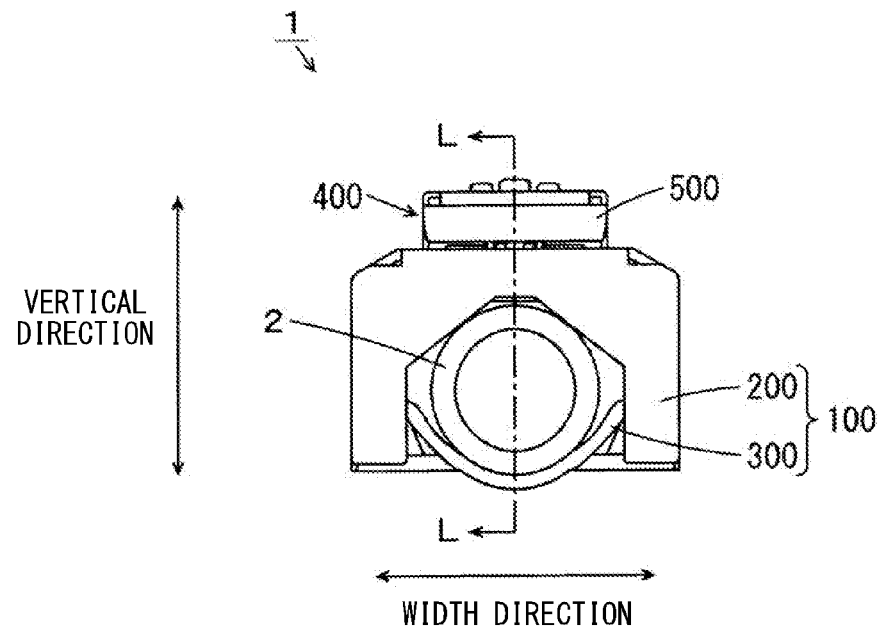
FIGS. 37A and 37B are an end face view and a cross-sectional view of a flow switch according to a fifth modification of the method of restricting a collapsing amount of an acoustic couplant.
Figure 37B:
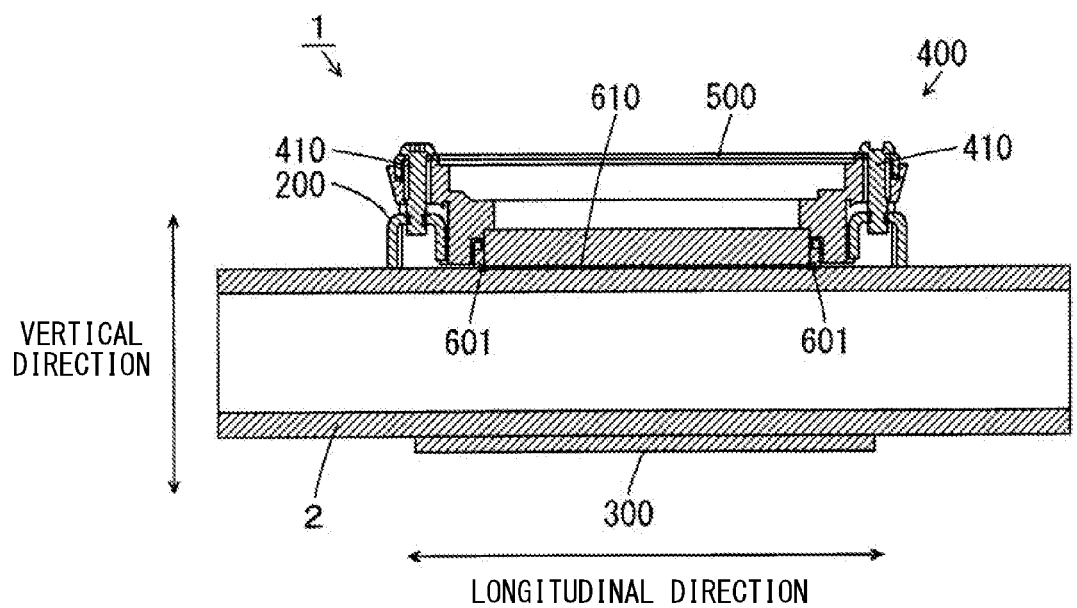

FIGS. 37A and 37B are an end face view and a cross-sectional view of the flow switch 1 according to a fifth modification of the method of restricting a collapsing amount of the acoustic couplant 610. FIG. 37B is a cross-sectional view of the flow switch 1 taken along line L-L in FIG. 37A. In the example shown in FIGS. 37A and 37B, plate-shaped collapsing amount restricting members 601 are arranged on both end surfaces of the acoustic couplant 610 such that the collapsing amount restricting members 601 respectively correspond to lower surfaces of both end portions of the outer flange part 522 of the casing part 500 in the longitudinal direction.

A thickness of each collapsing amount restricting member 601 in the vertical direction is set smaller than a thickness of the bottom surface part 611 of the acoustic couplant 610 (FIG. 20) in the vertical direction. The collapsing amount restricting members 601 may be adhered to the acoustic couplant 610 by adhesive members, or may be integrally formed with the acoustic couplant 610.

When the flow switch 1 is mounted on the pipe 2, the acoustic couplant 610 is collapsed by the lower surface of the casing part 500. In this state, the acoustic couplant 610 is collapsed until a thickness of the bottom surface part 611 of the acoustic couplant 610 is substantially equal to a thickness of each collapsing amount restricting member 601. Accordingly, the lower end surfaces of the collapsing amount restricting members 601 are brought into contact with the pipe 2. In this state, the downward movement of the sensor part 400 above the clamp part 100 is stopped and, at the same time, the collapse of the acoustic couplant 610 by the casing part 500 is also stopped. A collapsing amount of the acoustic couplant 610 is restricted in this manner.

In this case, the operator can handle the collapsing amount restricting members 601 together with the acoustic couplant 610 and hence, the handling of the flow switch 1 is enhanced. Further, operational efficiency in mounting the flow switch 1 is also enhanced.

(3) Shape of Notched Part

In this embodiment, the notched part 241 of each end surface part 240 of the upper clamp member 200 has a polygonal shape having two vertical cut surfaces 211, one horizontal cut surface 212 and two inclined cut surfaces 213. However, the present invention is not limited to such a shape. The notched part 241 of each end surface part 240 of the upper clamp member 200 may have any shapes of the following first to fourth modifications. The notched part 241 may have a shape formed by combining the first to fourth modifications. The notched part 241 may also have other shapes.

Figure 38:
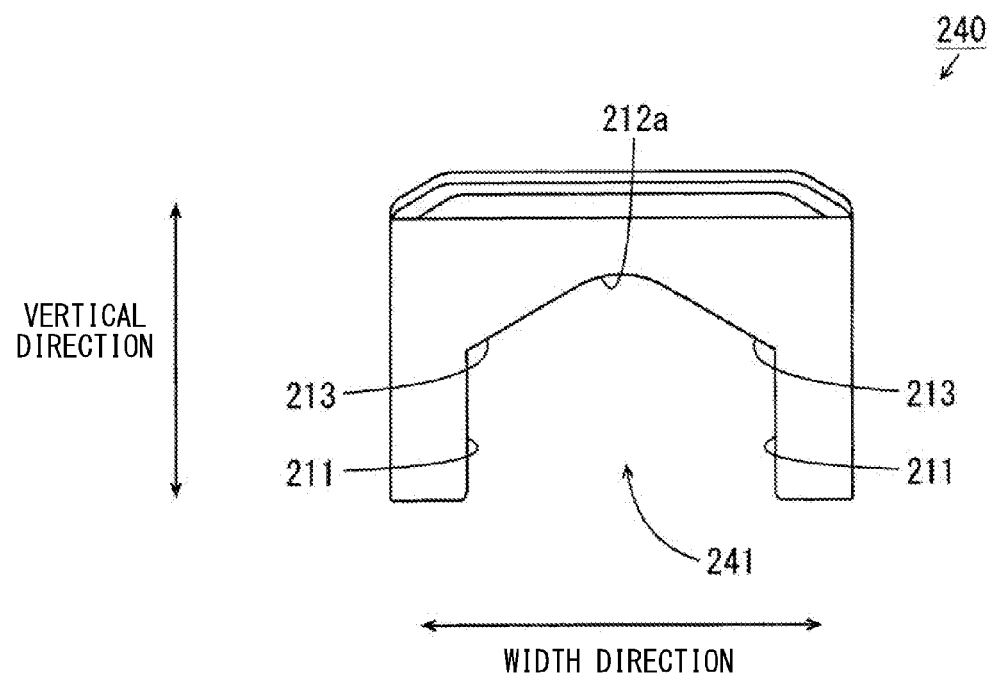
FIG. 38 is a view showing a first modification of a shape of a notched part.

FIG. 38 is a view showing the first modification of the shape of the notched part 241. As shown in FIG. 38, in the first modification of the shape of the notched part 241, the notched part 241 has a curved cut surface 212a in place of the horizontal cut surface 212 shown in FIG. 4A. The curved cut surface 212a connects an upper portion of one inclined cut surface 213 and an upper portion of the other inclined cut surface 213 in a curved manner.

Figure 39:
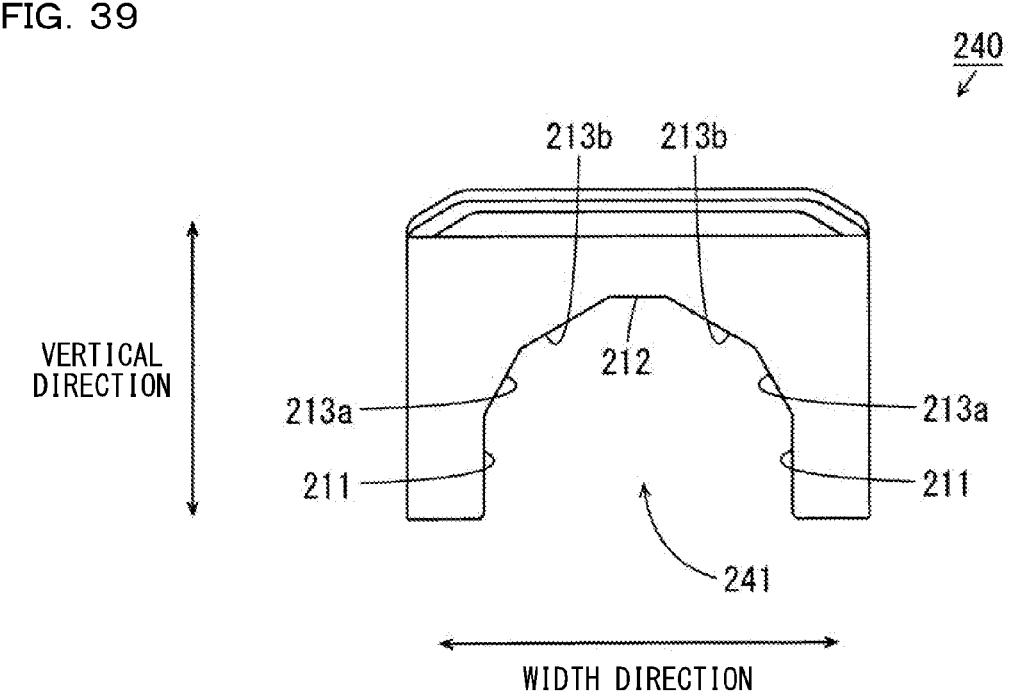
FIG. 39 is a view showing a second modification of the shape of the notched part.

FIG. 39 is a view showing the second modification of the shape of the notched part 241. As shown in FIG. 39, in the second modification of the shape of the notched part 241, the notched part 241 has two steeply inclined cut surfaces 213a and two gently inclined cut surfaces 213b in place of two inclined cut surfaces 213 shown in FIG. 4A.

One steeply inclined cut surface 213a extends inwardly in an inclined manner from an upper portion of one vertical cut surface 211. One gently inclined cut surface 213b extends inwardly in an inclined manner from an upper portion of one steeply inclined cut surface 213a. The other steeply inclined cut surface 213a extends inwardly in an inclined manner from an upper portion of the other vertical cut surface 211. The other gently inclined cut surface 213b extends inwardly in an inclined manner from an upper portion of the other steeply inclined cut surface 213a. The horizontal cut surface 212 connects inner end portions of two gently inclined cut surfaces 213b while extending horizontally.

An inclination of the steeply inclined cut surface 213a with respect to the horizontal direction is set larger than an inclination of the gently inclined cut surface 213b. In the example shown in FIG. 39, two gently inclined cut surfaces 213b are brought into contact with an outer peripheral surface of an upper portion of the pipe 2. The notched part 241 may be also configured such that two steeply inclined cut surfaces 213a are brought into contact with the outer peripheral surface of the upper portion of the pipe 2 in place of the two gently inclined cut surfaces 213b.

Figure 40:
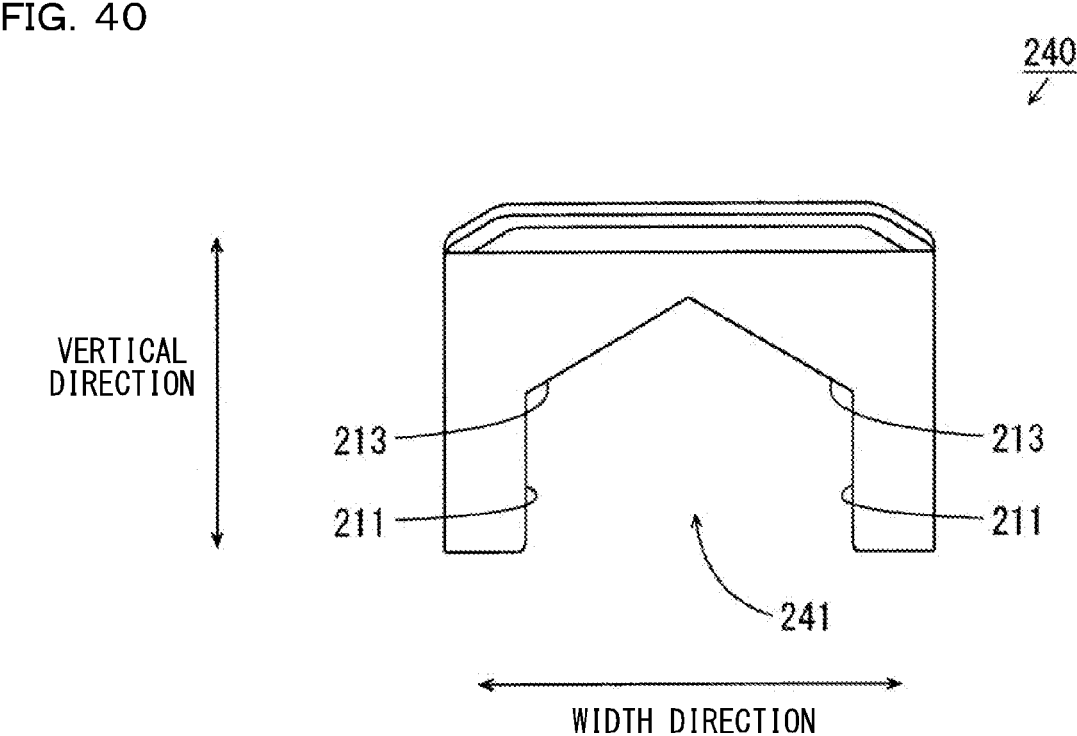
FIG. 40 is a view showing a third modification of the shape of the notched part.

FIG. 40 is a view showing the third modification of the shape of the notched part 241. As shown in FIG. 40, in the third modification of the shape of the notched part 241, the notched part 241 does not have the horizontal cut surface 212 shown in FIG. 4A, and inner end portions of two inclined cut surfaces 213 are connected to each other at the substantially center of the end surface part 240 in the width direction.

Figure 41:
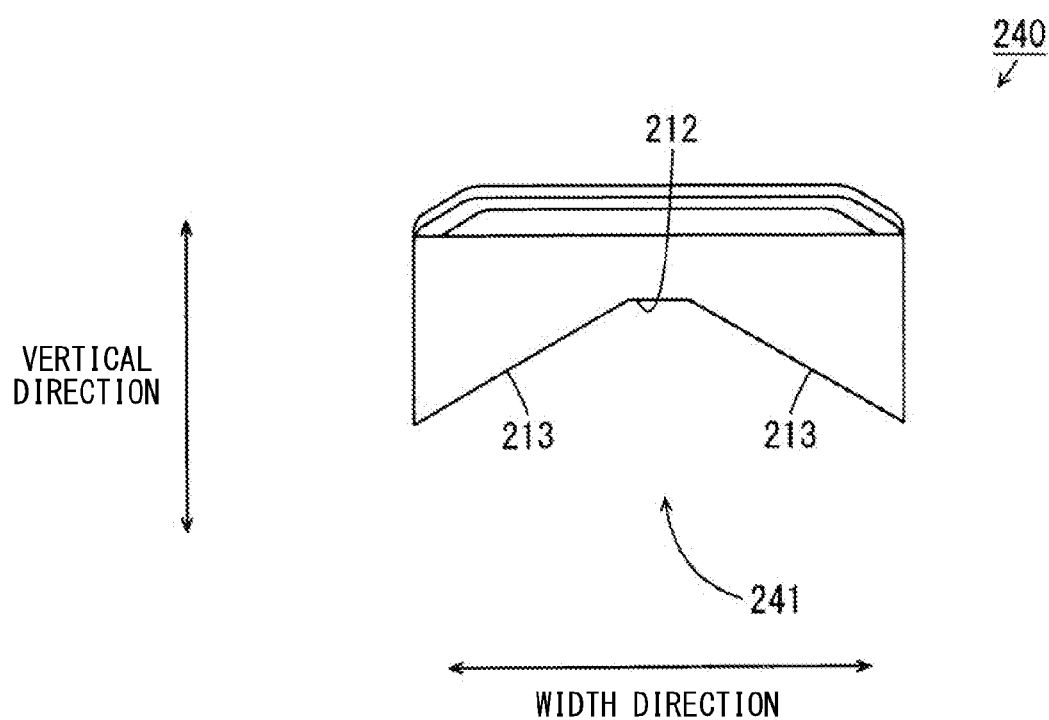
FIG. 41 is a view showing a fourth modification of the shape of the notched part.

FIG. 41 is a view showing the fourth modification of the shape of the notched part 241. As shown in FIG. 41, in the fourth modification of the shape of the notched part 241, the notched part 241 does not have two vertical cut surfaces 211 shown in FIG. 4A, and outer end portions of the inclined cut surfaces 213 extend to end portions of the end surface part 240 in the width direction. The outer end portions of the inclined cut surfaces 213 may extend to end portions of the end surface part 240 in the vertical direction instead of extending to the end portions of the end surface part 240 in the width direction.

(4) Arrangement of Ultrasonic Wave Elements

In this embodiment, two ultrasonic wave elements 710, 720 are bonded to the common path member 530, and are integrally held by the common casing part 500. However, the present invention is not limited to such a configuration. Two ultrasonic wave elements 710, 720 may be bonded to independent path members 530. In this case, two ultrasonic wave elements 710, 720 may be held by the common casing part 500, or may be independently held by independent casing parts 500. By adopting such configurations, the degree of freedom in the arrangement of the ultrasonic wave elements 710, 720 is enhanced. The electronic circuit part 800 may be held by one casing part 500, or may be held by both casing parts 500.

Figure 42:
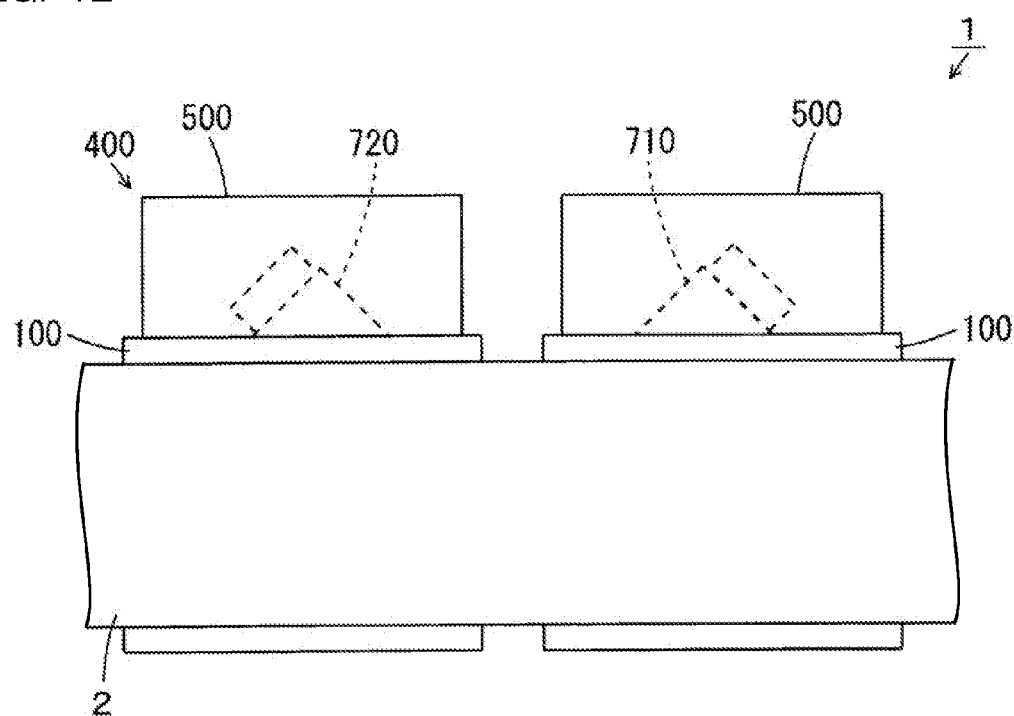
FIG. 42 is a side view of a flow switch according to a first modification of arrangement of ultrasonic wave elements.

FIG. 42 is a side view of the flow switch 1 according to a first modification of arrangement of the ultrasonic wave elements 710, 720. In the example shown in FIG. 42, two casing parts 500 and two clamp parts 100 are prepared. The ultrasonic wave element 710 is held by one casing part 500, and is mounted on the pipe 2 by one clamp part 100. The ultrasonic wave element 720 is held by the other casing part 500, and is mounted on the pipe 2 by the other clamp part 100. Two casing parts 500 may be arranged so as to face each other with the pipe 2 interposed therebetween.

Figure 43:
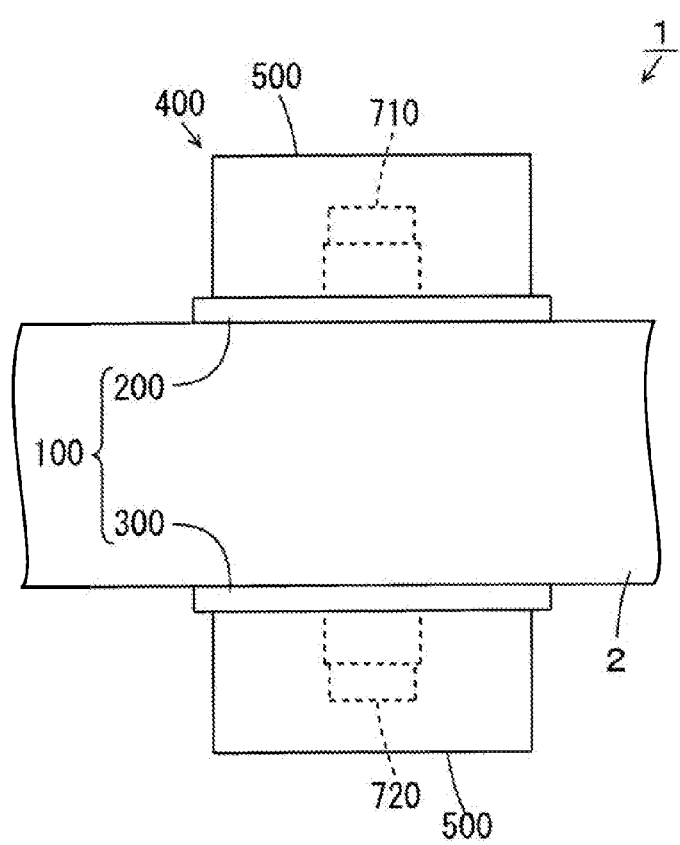
FIG. 43 is a side view of a flow switch according to a second modification of arrangement of ultrasonic wave elements.

FIG. 43 is a side view of the flow switch 1 according to a second modification of arrangement of the ultrasonic wave elements 710, 720. In the example shown in FIG. 43, two casing parts 500 are prepared. The lower clamp member 300 of the clamp part 100 allows the casing part 500 to be mounted on the pipe 2. The ultrasonic wave element 710 is held by one casing part 500, and is mounted on the pipe 2 by the upper clamp member 200. The ultrasonic wave element 720 is held by the other casing part 500, and is mounted on the pipe 2 by the lower clamp member 300.

In this case, the ultrasonic wave element 710 and the ultrasonic wave element 720 are arranged so as to face each other with the pipe 2 interposed therebetween. With such a configuration, a flow rate of a fluid in the pipe 2 can be calculated using the transmissive type configuration without requiring an additional member.

(5) Configuration of Clamp Part

In this embodiment, the upper clamp member 200 and the lower clamp member 300 of the clamp part 100 are configured to be separable. However, the present invention is not limited to such a configuration. The upper clamp member 200 and the lower clamp member 300 of the clamp part 100 may be formed integrally. Alternatively, the clamp part 100 may not include the lower clamp member 300.

Figure 44:
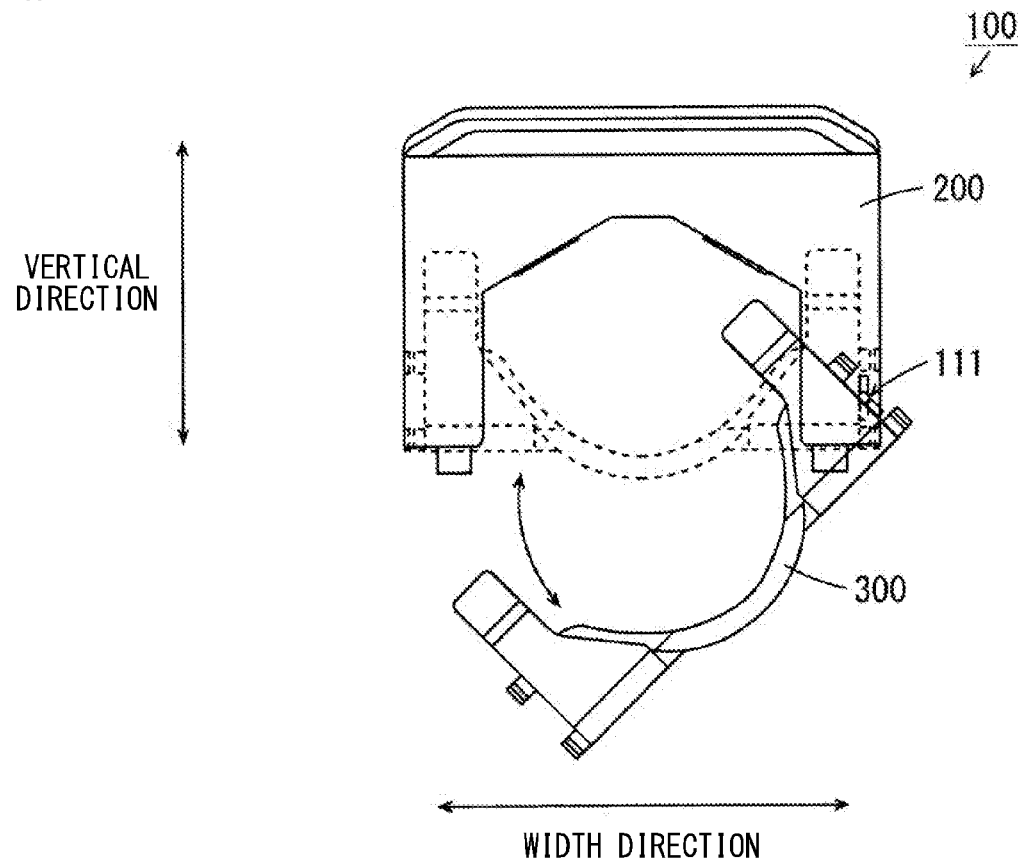
FIG. 44 is an end face view of a flow switch according to a first modification of configuration of a clamp part.

FIG. 44 is an end face view of the flow switch 1 according to a first modification of the configuration of the clamp part 100. In the example shown in FIG. 44, a portion of the upper clamp member 200 of the clamp part 100 and a portion of the lower clamp member 300 of the clamp part 100 are joined by a hinge part 111. With such a configuration, the upper clamp member 200 and the lower clamp member 300 can sandwich the pipe 2 therebetween in a state where the portion of the upper clamp member 200 and the portion of the lower clamp member 300 are fixed to each other. In this modification, the upper clamp member 200 and the lower clamp member 300 of the clamp part 100 are formed integrally and hence, handling of the clamp part 100 is enhanced.

Figure 45:
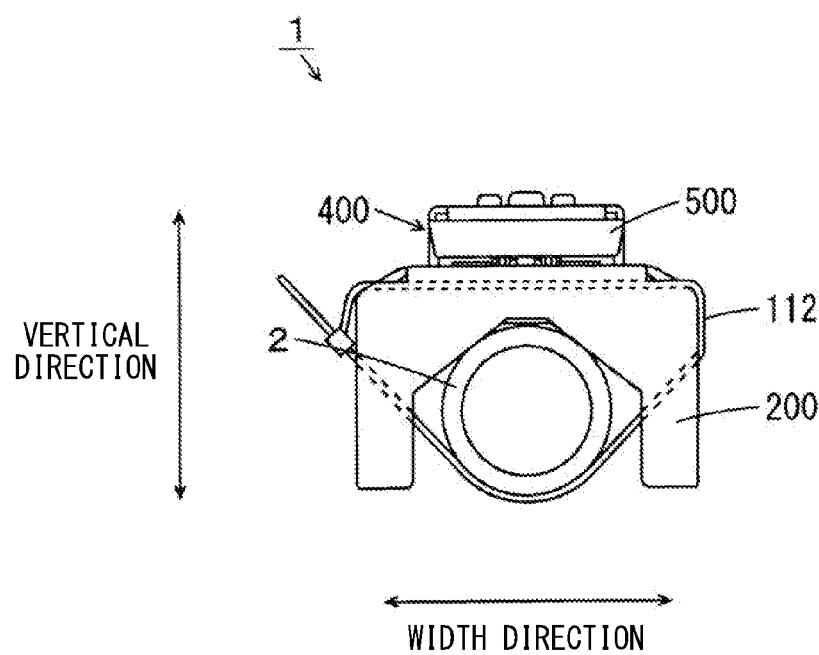
FIG. 45 is an end face view of a flow switch according to a second modification of configuration of a clamp part.

FIG. 45 is an end face view of the flow switch 1 according to a second modification of the configuration of the clamp part 100. In the example shown in FIG. 45, the clamp part 100 does not include the lower clamp member 300 but includes a binding band 112. The upper clamp member 200 is fixed to the pipe 2 by the binding band 112. In this case, the sensor part 400 is mounted on the pipe 2 by the upper clamp member 200 and the binding band 112.

[6] Advantageous Effects (1) Advantageous Effects Brought about by Joining Part

In the flow switch 1 according to this embodiment, when the clamp part 100 is mounted on the outer surface of the pipe 2 and the sensor part 400 is held by the clamp part 100, the acoustic couplant 610 is pressed to the outer surface of the pipe 2 such that the ultrasonic wave elements 710, 720 are acoustically coupled to the pipe 2. Here, a collapsing amount of the acoustic couplant 610 at a portion where the collapsing amount of the acoustic couplant 610 by the pipe 2 is the largest is restricted by the fitting end surface parts 521B of the casing part 500.

With such a configuration, even when the sensor part 400 is mounted on the pipe 2 having a relatively large outer diameter, the acoustic couplant 610 is pressed to the pipe 2 such that the ultrasonic wave elements 710, 720 and the pipe 2 are reliably coupled to each other acoustically. On the other hand, even when the sensor part 400 is mounted on the pipe 2 having a relatively small outer diameter, a maximum collapsing amount of the acoustic couplant 610 is reliably restricted and hence, it is possible to prevent the acoustic couplant 610 from being damaged due to excessive collapse caused by the pipe 2.

In these cases, regardless of the outer diameter of the pipe 2 and the operator, a maximum collapsing amount of the acoustic couplant 610 is restricted to a fixed value and, at the same time, the acoustic couplant 610 has a fixed thickness at a portion thereof having a minimum thickness. Accordingly, acoustic coupling between the ultrasonic wave elements 710, 720 and the pipe 2 can be determined uniformly. As a result, the flow switch 1 can be stably mounted on the pipes 2 having various sizes without impairing uniformity of the performance of the flow switch 1.

In this embodiment, the fitting end surface parts 521B are integrally mounted on the casing part 500 as the collapsing amount restricting parts. The fitting end surface parts 521B are brought into contact with the outer surface of the pipe 2 so that a distance between the outer surface of the pipe 2 and the lower surface of the path member 530 is restricted. Accordingly, the collapsing amount of the acoustic couplant 610 is restricted.

In this case, it is not necessary to prepare the collapsing amount restricting part additionally and hence, the number of parts for forming the flow switch 1 can be reduced. Further, the operator can handle the collapsing amount restricting part together with the casing part 500 and hence, the handling of the flow switch 1 is enhanced. Further, efficiency of operation for mounting the flow switch 1 is enhanced.

The acoustic couplant 610 is detachably mounted on the casing part 500 by the holding member 620. Accordingly, the acoustic couplant 610 can be easily mounted on and removed from the casing part 500. With such a configuration, the operator can easily perform an operation of exchanging the acoustic couplant 610. As a result, a maintenance cost of the flow switch 1 can be reduced.

(2) Advantageous Effects Brought about by Clamp Part

In the flow switch 1 according to this embodiment, the clamp part 100 is mounted on the outer surface of the pipe 2. The sensor part 400 is fixed to the clamp part 100 by the sensor fixing screws 410. In such a configuration, in a state where the sensor part 400 is not fixed to the clamp part 100, although displacement of the sensor part 400 in the axial direction of the pipe 2 and in the circumferential direction of the pipe 2 is restricted, displacement of the sensor part 400 in the radial direction of the pipe 2 is allowed. In this case, the mounting position of the sensor part 400 in the axial direction and in the circumferential direction of the pipe 2 is determined corresponding to the mounting position of the clamp part 100. Further, the position of the sensor part 400 in the radial direction of the pipe 2 can be adjusted on the clamp part 100.

With such a configuration, a fixing force for fixing the clamp part 100 to the pipe 2 and a fixing force for fixing the sensor part 400 to the clamp part 100 can be adjusted independently. Accordingly, the position of the sensor part 400 in the axial direction of the pipe 2 and in the circumferential direction of the pipe 2 can be determined by firmly fixing the clamp part 100 to the pipe 2. Then, by operating the sensor fixing screws 410, the position of the sensor part 400 in the radial direction of the pipe 2 can be determined such that the sensor part 400 is brought into sufficient contact with the pipe 2.

Accordingly, even in the case where the sensor part 400 is mounted on the pipes 2 having various sizes, it is not necessary to bring the sensor part 400 into contact with the pipe 2 with an excessively large force and hence, the position of an ultrasonic wave emitting portion can be accurately determined without damaging the sensor part 400. With such accurate determination of the position of the ultrasonic wave emitting portion, reception sensitivity of an ultrasonic wave can be easily adjusted to a desired value. As a result, the flow switch 1 can be stably mounted on the pipe 2 having various sizes.

The end surface part 240 of the upper clamp member 200 has two inclined cut surfaces 213. Two inclined cut surfaces 213 are positioned on one side and the other side of a plane of symmetry so as to be symmetrically inclined with each other with respect to the plane of symmetry, the plane of symmetry intersecting ultrasonic wave transmission/reception surfaces of the sensor part 400 and including the radial direction and the axial direction.

With such a configuration, even when the clamp part 100 is mounted on the pipes 2 having various sizes, two inclined cut surfaces 213 of the clamp part 100 are brought into contact with the pipe 2. Accordingly, a fixing force for fixing the clamp part 100 to the pipe 2 can be increased. Further, the transmission/reception surfaces of the sensor part 400 are positioned between two inclined cut surfaces 213. Accordingly, even when the clamp part 100 is mounted on the pipes 2 having various sizes, the sensor part 400 can be displaced only in the radial direction of the pipe 2 without causing displacement of the sensor part 400 in the axial direction of the pipe 2 and in the circumferential direction of the pipe 2 on the clamp part 100.

Further, at least one portion of the bottom surface part 310 of the lower clamp member 300 of the clamp part 100 is brought into contact with the pipe 2. Accordingly, a fixing force for fixing the clamp part 100 to the pipe 2 can be increased regardless of an outer diameter of the pipe 2. Further, even when the clamp part 100 is firmly fixed to the pipe 2, it is possible to prevent the pipe 2 from being deformed into an elliptical shape.

(3) Advantageous Effects Brought about by Casing Part

In the flow switch 1 according to this embodiment, the ultrasonic wave elements 710, 720 are acoustically coupled to the element joining surfaces 530A, 530B of the path member 530 of the casing part 500, respectively. The pipe joining surface 530C of the path member 530 of the casing part 500 is acoustically coupled to the pipe 2. With such a configuration, the ultrasonic wave elements 710, 720 are supported by the path member 530 at desired positions and in desired postures. Accordingly, it is possible to easily arrange the ultrasonic wave element 710 such that an ultrasonic wave is transmitted to a fluid in the pipe 2, and it is also possible to easily arrange the ultrasonic wave element 720 such that the ultrasonic wave element 720 receives an ultrasonic wave propagated in a fluid in the pipe 2.

An ultrasonic wave transmitted by the ultrasonic wave element 710 is guided to the pipe 2 through the path member 530 and, at the same time, an ultrasonic wave propagated through a fluid in the pipe 2 is guided to the ultrasonic wave element 720 through the path member 530. Here, the path member 530 is formed of a material which allows an ultrasonic wave to pass therethrough and hence, acoustic transmissivity of the path member 530 is enhanced.

As described above, it is not necessary to provide a member for supporting the ultrasonic wave elements 710, 720 and a member for forming a path for an ultrasonic wave independently. Accordingly, a cost for parts, a manufacturing cost and an assembling cost can be reduced. Further, the member for supporting the ultrasonic wave elements 710, 720 and the member for forming the path for an ultrasonic wave are integrally joined and hence, even when a temperature changes or a mechanical load is applied to the members, there is no possibility that transmission efficiency and reception efficiency of an ultrasonic wave are lowered at the joining portion. Further, there is no possibility that a liquid such as water or oil intrudes into the members through the joining portion. Further, assembling steps of the flow switch 1 can be simplified. As a result, it is possible to easily manufacture the flow switch 1 at a low cost without lowering transmission efficiency and reception efficiency of an ultrasonic wave.

Parts of the ultrasonic wave control mechanism 700 and parts of the electronic circuit part 800 are housed in the casing part 500 which is formed of the upper casing part 510, the lower casing part 520 and the path member 530. The casing part 500 includes the waterproof structures such as the display part seal member 541, the connecting part seal member 542, the operating part seal member 543, the lamp seal member 544, the inter-casing seal member 545 and the casing inter-path seal member 546. With such a configuration, durability such as heat resistance, water resistance or oil resistance of the flow switch 1 is enhanced.

(4) Advantageous Effects Brought about by Other Sensor Parts

In the flow switch 1 according to this embodiment, the operation of the clamp fixing screws 110 and the operation of the sensor fixing screws 410 can be performed from a common direction (the vertical direction in this embodiment). Further, the display part 821 is provided so as to be viewable from the common direction. The connecting part 830 is provided such that the cable 3 can be connected to the connecting part 830 from the common direction.

In this case, the operator can efficiently perform the operation of mounting the clamp part 100 on the pipe 2 and the operation of fixing the sensor part 400 to the clamp part 100 by the sensor fixing screws 410 from the common direction. A user can also easily observe the display part 821 from the common direction. Further, the cable 3 can be easily connected to the connecting part 830 without causing interference with the pipe 2.

[7] Other Embodiments (1) In the above-mentioned embodiment, the sensor part 400 calculates a flow rate Q of a fluid which flows in the pipe 2 by the equation (2) based on a propagation time difference system. However, the present invention is not limited thereto. The sensor part 400 may calculate a flow rate Q of a fluid which flows in the pipe 2 based on a Doppler system. In this case, one of the ultrasonic wave elements 710, 720 may be formed by an ultrasonic wave transmission element, and the other of the ultrasonic wave elements 710, 720 may be formed by an ultrasonic wave reception element.

(2) In the above-mentioned embodiment, the electronic circuit part 800 includes the display part 821 and the display lamp 850. However, the present invention is not limited to such a configuration. The electronic circuit part 800 may not include the display part 821, or may not include the display lamp 850.

(3) In the above-mentioned embodiment, the lower casing part 520 and the path member 530 are formed as independent members. However, the present invention is not limited to such a configuration. The lower casing part 520 and the path member 530 may be formed integrally. In this case, it is possible to easily acquire waterproof between the lower casing part 520 and the path member 530.

(4) In the above-mentioned embodiment, the waterproof structure is not provided to the joining part between the lower casing part 520 and the joining part 600. However, the present invention is not limited to such a configuration. The waterproof structure may be provided to the joining part between the lower casing part 520 and the joining part 600.

(5) In the above-mentioned embodiment, the casing part 500 includes one path member 530, and the element joining surfaces 530A, 530B and the common pipe joining surface 530C are formed on the path member 530. However, the present invention is not limited to such a configuration. The casing part 500 may include two path members 530 which are formed as separate bodies. In this configuration, the element joining surface 530A and the pipe joining surface 530C are formed on one path member 530, and the element joining surface 530B and the pipe joining surface 530C are formed on the other path member 530.

(6) In the above-mentioned embodiment, in the upper clamp member 200 of the casing part 500, the movable part 220 is mounted on the fixed part 210. However, the present invention is not limited to such a configuration. In the upper clamp member 200, the movable part 220 may not be mounted on the fixed part 210. Particularly, in a state where the sensor part 400 is mounted on the clamp part 100, if the plurality of clamp fixing screws 110 are positioned below the sensor part 400, the operator cannot operate the plurality of clamp fixing screws 110 from above. In such a case, it is not necessary to mount the movable part 220 on the fixed part 210.

(7) In the above-mentioned embodiment, the posture maintaining mechanism 120 is provided to each clamp fixing screw 110. However, the present invention is not limited to such a configuration. The posture maintaining mechanism 120 may not be provided to each clamp fixing screw 110. Particularly, in the case where the clamp part 100 is mounted on the pipe 2 extending horizontally, each clamp fixing screw 110 is maintained in a substantially vertical posture and hence, it is not necessary to provide the posture maintaining mechanism 120 to each clamp fixing screw 110.

Further, in the case where a size of the clamp part 100 is small and a length of the clamp fixing screw 110 is short, even when the clamp part 100 is arranged such that the longitudinal direction or the width direction of the clamp part 100 is directed in the vertical direction, each clamp fixing screw 110 is maintained in a substantially vertical position. Also in this case, it is not necessary to provide the posture maintaining mechanism 120 to each clamp fixing screw 110.

(8) In the above-mentioned embodiment, the threaded hole with which the clamp fixing screw 110 is threadedly engaged is selected between the threaded hole 331h and the threaded hole 332h based on which of the first direction and the second direction the lower clamp member 300 is directed to. However, the present invention is not limited to such a configuration. The threaded hole with which the clamp fixing screw 110 is threadedly engaged may be selected between the threaded hole 331h and the threaded hole 332h using other methods.

For example, the threaded holes 331h or the threaded holes 332h may be further formed in the lower clamp member 300 such that the threaded holes 331h or the threaded holes 332h are arranged side by side in the longitudinal direction. In this case, by selecting the position of the upper clamp member 200 with respect to the lower clamp member 300 in the longitudinal direction, the threaded holes with which the clamp fixing screws 110 are threadedly engaged can be selected between the threaded holes 331h and the threaded holes 332h.

(9) In the above-mentioned embodiment, the clamp fixing screws 110 and the sensor fixing screws 410 are provided so as to be operable from the common direction. The display part 821 is provided so as to be viewable from the common direction. The connecting part 830 is provided such that the cable 3 can be connected to the connecting part 830 from the common direction. However, the present invention is not limited to such a configuration. The clamp fixing screws 110 and sensor fixing screws 410 may be provided so as to be operable from other directions. The display part 821 may be provided so as to be viewable from other directions. The connecting part 830 may be provided such that the cable 3 can be connected to the connecting part 830 from other directions. Alternatively, the display part 821 or the connecting part 830 may be provided rotatably with respect to the casing part 500 such that the display part 821 or the connecting part 830 is directed in the desired direction.

(10) In the above-mentioned embodiment, it is preferable that the acoustic couplant 610 be arranged such that the acoustic couplant 610 acoustically couples both ultrasonic wave elements 710, 720 and the pipe 2. However, the present invention is not limited to such a configuration. The acoustic couplant 610 may be arranged such that the acoustic couplant 610 acoustically couples at least one ultrasonic wave element of the ultrasonic wave elements 710, 720 and the pipe 2.

(11) In the above-mentioned embodiment, it is preferable that the sensor part 400 be mounted on the pipe 2 by the clamp part 100. However, the present invention is not limited to such a configuration. The sensor part 400 may be mounted on the pipe 2 by a binding band in the same manner as the binding band 112 shown in FIG. 45.

(12) In the above-mentioned embodiment, the path member 530 which supports the ultrasonic wave elements 710, 720 and also forms a path for an ultrasonic wave is provided as a portion of the casing part 500. However, the present invention is not limited to such a configuration. In place of the path member 530, a member which supports the ultrasonic wave elements 710, 720 and a member which forms a path for an ultrasonic wave may be independently provided to the casing part 500.

[8] Correspondence Relationship Between Constitutional Elements in the Claims and Parts Employed in Embodiment Hereinafter, an example of the correspondence between the constitutional elements in the claims and the parts employed in the embodiment will be described. However, the present invention is not limited to the following examples.

In the above-mentioned embodiment, the pipe 2 is an example of the pipe, the flow switch 1 is an example of the ultrasonic flow switch, and the ultrasonic wave elements 710, 720 are examples of the first and second ultrasonic wave elements, respectively. The control part 811 is an example of the calculator and the output part, the casing part 500 is an example of the element holder, the clamp part 100 is an example of the mounting member, and the acoustic couplant 610 is an example of the acoustic contact medium.

The collapsing amount restricting projection 101, the collapsing amount restricting members 402, 403, 601 or fitting end surface part 521B are examples of the collapsing amount restricting part, and the collapsing amount restricting screw 401 is an example of the collapsing amount restricting part and the screw member. The holding member 620 is an example of the medium holding member, the adhesive member 421 is an example of the adhesive member, the sensor fixing screw 410 is an example of the fixing member, the display part 821 is an example of the display part, the cable 3 is an example of the connecting line, and the connecting part 830 is an example of the connecting part.

Other various elements which have the configurations and functions described in the claims can be also used as the constitutional elements described in the claims.

The present invention is effectively applicable to various types of ultrasonic flow switches.

What is claimed is:

1. An ultrasonic flow switch to output an ON/OFF signal based on a flow rate of a fluid in a pipe, the ultrasonic flow switch comprising:
    a first ultrasonic wave element configured to transmit an ultrasonic wave to a fluid in a pipe;
    a second ultrasonic wave element configured to receive the ultrasonic wave from the fluid in the pipe;
    a calculator configured to calculate a flow rate of the fluid in the pipe based on an output signal from the second ultrasonic wave element;
    an output part configured to output the ON/OFF signal based on the flow rate calculated by the calculator and a preset flow rate threshold value;
    an element holder integrally or independently holding the first ultrasonic wave element and the second ultrasonic wave element;
    a mounting member detachably mounted on an outer surface of the pipe, configured to hold the element holder; and
    an acoustic contact medium formed of a soft elastic body, and arranged between at least one of the first and second ultrasonic wave elements and the pipe,
    wherein the acoustic contact medium is pressed to the outer surface of the pipe such that the at least one ultrasonic wave element is acoustically coupled to the pipe in a state where the mounting member is mounted on the outer surface of the pipe and the element holder is held by the mounting member, and
    the ultrasonic flow switch further comprises a collapsing amount restricting part which restricts a collapsing amount of the acoustic contact medium at a portion where the collapsing amount of the acoustic contact medium caused by the pipe is the largest.

2. The ultrasonic flow switch according to claim 1, wherein the soft elastic body includes polymer rubber or a gel-like substance.

3. The ultrasonic flow switch according to claim 1, wherein the collapsing amount restricting part restricts the collapsing amount of the acoustic contact medium caused by the pipe to 10% or more and 50% or less of a thickness of the acoustic contact medium in a state where the acoustic contact medium is not brought into contact with the outer surface of the pipe.

4. The ultrasonic flow switch according to claim 1, wherein the collapsing amount restricting part is provided between the element holder and the pipe, and restricts the collapsing amount of the acoustic contact medium by restricting a distance between the outer surface of the pipe and a portion of the element holder.

5. The ultrasonic flow switch according to claim 4, wherein the collapsing amount restricting part is detachably or integrally mounted on the element holder, and restricts the collapsing amount of the acoustic contact medium by being brought into contact with the outer surface of the pipe.

6. The ultrasonic flow switch according to claim 5, wherein the collapsing amount restricting part includes a screw member mounted on the element holder, and the screw member restricts the collapsing amount of the acoustic contact medium by being brought into contact with the outer surface of the pipe.

7. The ultrasonic flow switch according to claim 4, wherein the collapsing amount restricting part is arranged between the element holder and the outer surface of the pipe, and restricts the collapsing amount of the acoustic contact medium by being brought into contact with the element holder and the outer surface of the pipe.

8. The ultrasonic flow switch according to claim 1, wherein the collapsing amount restricting part is provided between the element holder and the mounting member, and restricts the collapsing amount of the acoustic contact medium by restricting a distance between a portion of the element holder and a portion of the mounting member.

9. The ultrasonic flow switch according to claim 8, wherein the collapsing amount restricting part is detachably or integrally mounted on one of the element holder and the mounting member, and restricts the collapsing amount of the acoustic contact medium by being brought into contact with the other of the element holder and the mounting member.

10. The ultrasonic flow switch according to claim 9, wherein the collapsing amount restricting part is integrally mounted on the mounting member.

11. The ultrasonic flow switch according to claim 8, wherein the collapsing amount restricting part is arranged between the element holder and the mounting member, and restricts the collapsing amount of the acoustic contact medium by being brought into contact with the element holder and the mounting member.

12. The ultrasonic flow switch according to claim 1, wherein the collapsing amount restricting part is mounted on the acoustic contact medium, and restricts the collapsing amount of the acoustic contact medium by restricting a distance between the outer surface of the pipe and a portion of the element holder.

13. The ultrasonic flow switch according to claim 1, wherein the acoustic contact medium is detachably or integrally mounted on the element holder.

14. The ultrasonic flow switch according to claim 13, further including a medium holding member which holds the acoustic contact medium in the element holder.

15. The ultrasonic flow switch according to claim 13, wherein the acoustic contact medium is bonded to the element holder by an adhesive member.

16. The ultrasonic flow switch according to claim 1, further including a fixing member which fixes the element holder to the mounting member, and
    the mounting member and the element holder are configured such that an operation for mounting the mounting member on the pipe and an operation for fixing the element holder to the mounting member by the fixing member are performed from a common direction.

17. The ultrasonic flow switch according to claim 16, further including a display part which displays the flow rate calculated by the calculator and the threshold value,
    wherein the display part is provided on the element holder such that the display part is viewable from the common direction.

18. The ultrasonic flow switch according to claim 16, further including a connecting part to which a connecting line for transmitting the ON/OFF signal outputted from the output part is connectable,
    wherein the connecting part is provided to the element holder such that the connecting line is connectable to the connecting part from the common direction.

19. The ultrasonic flow switch according to claim 18, wherein the first and second ultrasonic wave elements acquire electric power through the connecting part.

20. The ultrasonic flow switch according to claim 1, wherein
    the second ultrasonic wave element is further configured to transmit an ultrasonic wave to the fluid in the pipe;
    the first ultrasonic wave element is further configured to receive the ultrasonic wave from the fluid in the pipe;
    a calculator is configured to calculate a flow rate of the fluid in the pipe based on an output signal from the first ultrasonic wave element and the second ultrasonic wave element.

\* \* \* \* \*